US011729050B2

(12) United States Patent
Abdelghaffar et al.

(10) Patent No.: US 11,729,050 B2
(45) Date of Patent: Aug. 15, 2023

(54) CONFIGURATIONS FOR FULL-DUPLEX COMMUNICATION SYSTEMS

(71) Applicant: QUALCOMM Incorporated, San Diego, CA (US)

(72) Inventors: Muhammad Sayed Khairy Abdelghaffar, San Jose, CA (US); Hung Dinh Ly, San Diego, CA (US); June Namgoong, San Diego, CA (US); Huilin Xu, San Diego, CA (US); Peter Pui Lok Ang, San Diego, CA (US); Shimman Arvind Patel, San Diego, CA (US); Krishna Kiran Mukkavilli, San Diego, CA (US); Joseph Patrick Burke, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/063,517

(22) Filed: Oct. 5, 2020

(65) Prior Publication Data
US 2021/0152418 A1 May 20, 2021

Related U.S. Application Data

(60) Provisional application No. 62/935,389, filed on Nov. 14, 2019.

(51) Int. Cl.
*H04L 41/0803* (2022.01)
*H04L 5/14* (2006.01)
(Continued)

(52) U.S. Cl.
CPC ....... *H04L 41/0803* (2013.01); *H04B 7/0602* (2013.01); *H04L 5/14* (2013.01);
(Continued)

(58) Field of Classification Search
CPC ..... H04B 7/0602; H04L 41/0803; H04L 5/14; H04W 72/0413; H04W 72/0446; H04W 72/0453
See application file for complete search history.

(56) References Cited

U.S. PATENT DOCUMENTS 10,070,422 B2  9/2018  Yu et al.
2002/0158801 A1  10/2002  Crilly, Jr. et al.
(Continued)

FOREIGN PATENT DOCUMENTS

CN    104981985 A    10/2015
WO    WO-2018031807 A1    2/2018

OTHER PUBLICATIONS

Kim et al. "A Survey of In-Band Full-Duplex Transmission: From the Perspective of PHY and MAC Layers" IEEE Comm Surveys & Tutorials 4Q 2015 (Year: 2015).*
(Continued)

*Primary Examiner* — Basil Ma
(74) *Attorney, Agent, or Firm* — Qualcomm Incorporated

(57) ABSTRACT

Methods, systems, and devices for wireless communications are described. A user equipment (UE) may identify one or more radio frequency (RF) spectrum bands for full-duplex communications, and may signal an indication of the UE's capability to support full-duplex communications for each RF spectrum band. The UE may further receive one or more configurations for full-duplex communications, which, in some examples, may be based on the UE's indicated capabilities. As an example, the UE may identify a guard band configuration for full-duplex communications, where the guard band configuration may be based on one or more aspects of resources used for the full-duplex communications. In other cases, the UE may identify a transmission hopping or antenna switching configuration for full-duplex communications. In any case, the UE may communicate
(Continued)

with a base station in accordance with the one or more configurations and the UE's capabilities.

29 Claims, 25 Drawing Sheets

(51) Int. Cl.
*H04B 7/06* (2006.01)
*H04W 72/21* (2023.01)
*H04W 72/0446* (2023.01)
*H04W 72/0453* (2023.01)

(52) U.S. Cl.
CPC ........ *H04W 72/21* (2023.01); *H04W 72/0446* (2013.01); *H04W 72/0453* (2013.01)

(56) References Cited

U.S. PATENT DOCUMENTS

| | | |
|---|---|---|
| 2011/0019634 A1 | 1/2011 | Fujii et al. |
| 2012/0099558 A1 | 4/2012 | Skov et al. |
| 2012/0263117 A1 | 10/2012 | Love et al. |
| 2016/0308662 A1* | 10/2016 | Li ............................. H04L 5/16 |
| 2016/0316422 A1 | 10/2016 | Regan |
| 2017/0048741 A1* | 2/2017 | Lee ........................ H04W 76/10 |
| 2017/0163404 A1* | 6/2017 | Liu ..................... H04W 72/0413 |
| 2018/0048511 A1* | 2/2018 | Hakola ................. H04L 5/0064 |
| 2018/0076924 A1 | 3/2018 | Lee et al. |
| 2018/0159656 A1 | 6/2018 | Papasakellariou |
| 2018/0206127 A1 | 7/2018 | Zhang et al. |
| 2018/0248612 A1 | 8/2018 | Graham, III et al. |
| 2018/0348340 A1 | 12/2018 | Lien et al. |
| 2018/0359127 A9 | 12/2018 | Hakola et al. |
| 2019/0089502 A1* | 3/2019 | Yi ..................... H04W 72/0453 |
| 2019/0238174 A1 | 8/2019 | Bengtsson |
| 2020/0107202 A1* | 4/2020 | Teng ........................ H04L 5/14 |
| 2020/0235980 A1 | 7/2020 | John Wilson et al. |
| 2021/0051660 A1* | 2/2021 | Askar ................ H04W 72/0453 |

OTHER PUBLICATIONS

Partial International Search Report—PCT/US2020/054376—ISA/EPO—dated Dec. 18, 2020.
U.S. Appl. No. 62/935,389, filed Nov. 14, 2019, 149 Pages.
International Search Report and Written Opinion—PCT/US2020/054376—ISA/EPO—dated Jan. 28, 2021.

* cited by examiner

CONFIGURATIONS FOR FULL-DUPLEX COMMUNICATION SYSTEMS

CROSS REFERENCE

The present Application for Patent claims the benefit of U.S. Provisional Patent Application No. 62/935,389 by ABDELGHAFFAR et al., entitled "CONFIGURATIONS FOR FULL-DUPLEX COMMUNICATION SYSTEMS," filed Nov. 14, 2019, assigned to the assignee hereof, and expressly incorporated by reference herein.

FIELD OF TECHNOLOGY

The following relates generally to wireless communications and more specifically to configurations for full-duplex communication systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support UEs or base stations that are capable of full-duplex communications (e.g., simultaneously transmitting and receiving). In some cases, a full-duplex wireless device may be affected by interference from the device's own transmission and reception of signals, which may sometimes be referred to as self-interference. In particular, while a UE is receiving on a downlink, the receive antennas of the UE may be affected by interference from signals sent on an uplink by the same UE. In other cases, a full-duplex base station may transmit on the downlink to one or more UEs, which may contribute some level of interference to uplink signals received at the base station while it is transmitting. As such, improved techniques may be desirable to enhance communications efficiency and reduce self-interference affecting full-duplex wireless devices.

SUMMARY

The described techniques relate to improved methods, systems, devices, and apparatuses that support configurations for full-duplex communication systems. Generally, the described techniques provide for configuring full-duplex communications such that interference (e.g., self-interference) is reduced or minimized at one or more full-duplex capable devices. In some aspects, a UE may identify one or more radio frequency (RF) spectrum bands configured for full-duplex communications. The UE may signal its full-duplex capabilities to a base station, where the full-duplex capabilities may indicate one or more types of full-duplex capabilities supported by the UE (such as in-band full-duplex, in which simultaneous uplink and downlink communication may use overlapping frequency resources, or sub-band full-duplex, in which simultaneous uplink and downlink communication may use separate frequency resources, among other examples). In addition, the full-duplex capabilities may indicate the UE's capability per RF spectrum band for the one or more RF spectrum bands. The UE may then communicate with the base station based on the type(s) of full-duplex communications supported by the UE. In some cases, the base station may also signal, to the UE, the full-duplex capabilities supported by the base station, which may enable the UE to update or adjust one or more transmission parameters to enhance reception of signals at the base station and generally improve full-duplex communications efficiency.

In some cases, various aspects of full-duplex communications may be configured to improve interference cancellation and performance by full-duplex-capable devices. As an example, a guard band (e.g., used for sub-band full-duplex communications) may be configured in various ways for self-interference cancellation efficiency. As an example, the guard band may be configured based on a frequency range used for the sub-band full-duplex communications, where different frequency ranges may utilize different guard bands. In other examples, the configuration of the guard band may be based on a numerology of uplink or downlink resources, or both, that are allocated for the full-duplex communications, and the frequency allocation for the guard band may be further based on various parameters associated with the uplink and downlink resources (e.g., the bandwidth parts (BWPs) for uplink and downlink). Additionally or alternatively, the guard band, or the location of the uplink and downlink resources, may be configured based on the RF spectrum bands or component carriers associated with different operators.

Aspects of the disclosure further provide for the configuration of transmission hopping and antenna switching configurations for enhancing full-duplex communications. In such cases, a UE may identify a transmission hopping configuration (e.g., via signaling from a base station), and may accordingly modify a location of uplink resources, downlink resources, or a guard band, or a combination thereof, between respective transmission time intervals (TTIs) (e.g., symbols, sets of symbols, slots, subframes, etc.). Further, the UE may also modify a size of resources used for uplink and downlink full-duplex communications between different TTIs based on the transmission hopping configuration. In other examples, an antenna switching configuration may enable a UE (or a base station) to switch between different antenna arrays for uplink and downlink transmissions at different TTIs. In such examples, the UE or base station may identify a pattern for switching antenna arrays or panels used to receive respective types of signaling at different times. In some aspects, one or more of the described configurations may be based on the UE's capability to support different types of full-duplex communications.

A method of wireless communication at a UE is described. The method may include identifying one or more RF spectrum bands for full-duplex communications with a base station, transmitting an indication of a full-duplex capability to the base station, the full-duplex capability indicating that the UE supports one or more types of the full-duplex communications for each RF spectrum band of the one or more RF spectrum bands, and transmitting, while simultaneously receiving, one or more messages to the base station using the one or more RF spectrum bands in accordance with the one or more types of full-duplex communications.

An apparatus for wireless communication at a UE is described. The apparatus may include a processor, a memory coupled with the processor, and instructions stored in the memory. The instructions may be executable by the processor to cause the apparatus to identify one or more RF spectrum bands for full-duplex communications with a base station, transmit an indication of a full-duplex capability to the base station, the full-duplex capability indicating that the UE supports one or more types of the full-duplex communications for each RF spectrum band of the one or more RF spectrum bands, and transmit, while simultaneously receiving, one or more messages to the base station using the one or more RF spectrum bands in accordance with the one or more types of full-duplex communications.

Another apparatus for wireless communication at a UE is described. The apparatus may include means for identifying one or more RF spectrum bands for full-duplex communications with a base station, transmitting an indication of a full-duplex capability to the base station, the full-duplex capability indicating that the UE supports one or more types of the full-duplex communications for each RF spectrum band of the one or more RF spectrum bands, and transmitting, while simultaneously receiving, one or more messages to the base station using the one or more RF spectrum bands in accordance with the one or more types of full-duplex communications.

A non-transitory computer-readable medium storing code for wireless communication at a UE is described. The code may include instructions executable by a processor to identify one or more RF spectrum bands for full-duplex communications with a base station, transmit an indication of a full-duplex capability to the base station, the full-duplex capability indicating that the UE supports one or more types of the full-duplex communications for each RF spectrum band of the one or more RF spectrum bands, and transmit, while simultaneously receiving, one or more messages to the base station using the one or more RF spectrum bands in accordance with the one or more types of full-duplex communications.

Some examples of the method, apparatuses, and non-transitory computer-readable medium described herein may further include operations, features, means, or instructions for receiving, from the base station, an indication of a base station full-duplex capability, the base station full-duplex capability indicating that the base station supports the one or more types of full-duplex communications for each RF spectrum band of the one or more RF spectrum bands.

Some examples of the method, apparatuses, and non-transitory computer-readable medium described herein may further include operations, features, means, or instructions for adjusting transmission parameters based on the base station full-duplex capability, where the one or more messages may be transmitted to the base station based on the adjusted transmission parameters.

In some examples of the method, apparatuses, and non-transitory computer-readable medium described herein, the transmission parameters include a transmission power, a number of repetitions, an aggregation level, or a combination thereof.

In some examples of the method, apparatuses, and non-transitory computer-readable medium described herein, transmitting the indication of the full-duplex capability may include operations, features, means, or instructions for transmitting the indication to the base station using radio resource control (RRC) messaging.

In some examples of the method, apparatuses, and non-transitory computer-readable medium described herein, the one or more types of full-duplex communications includes at least a first type associated with uplink resources that at least partially overlap in time and frequency with downlink resources or a second type associated with the uplink resources overlapping in time with the downlink resources and separated from the downlink resources by a guard band.

A method of wireless communication at a UE is described. The method may include identifying, by the UE, support for full-duplex communications using one or more RF spectrum bands, the full-duplex communications being associated with uplink resources that overlap in time with downlink resources and separated from the downlink resources by a guard band, identifying a guard band configuration based on the support for the full-duplex communications, and transmitting, while simultaneously receiving, one or more messages to a base station using the one or more RF spectrum bands based on the guard band configuration.

An apparatus for wireless communication at a UE is described. The apparatus may include a processor, a memory coupled with the processor, and instructions stored in the memory. The instructions may be executable by the processor to cause the apparatus to identify, by the UE, support for full-duplex communications using one or more RF spectrum bands, the full-duplex communications being associated with uplink resources that overlap in time with downlink resources and separated from the downlink resources by a guard band, identify a guard band configuration based on the support for the full-duplex communications, and transmit, while simultaneously receiving, one or more messages to a base station using the one or more RF spectrum bands based on the guard band configuration.

Another apparatus for wireless communication at a UE is described. The apparatus may include means for identifying, by the UE, support for full-duplex communications using one or more RF spectrum bands, the full-duplex communications being associated with uplink resources that overlap in time with downlink resources and separated from the downlink resources by a guard band, identifying a guard band configuration based on the support for the full-duplex communications, and transmitting, while simultaneously receiving, one or more messages to a base station using the one or more RF spectrum bands based on the guard band configuration.

A non-transitory computer-readable medium storing code for wireless communication at a UE is described. The code may include instructions executable by a processor to identify, by the UE, support for full-duplex communications using one or more RF spectrum bands, the full-duplex communications being associated with uplink resources that overlap in time with downlink resources and separated from the downlink resources by a guard band, identify a guard band configuration based on the support for the full-duplex communications, and transmit, while simultaneously receiving, one or more messages to a base station using the one or more RF spectrum bands based on the guard band configuration.

In some examples of the method, apparatuses, and non-transitory computer-readable medium described herein, identifying the guard band configuration may include operations, features, means, or instructions for identifying a first frequency range for the one or more RF spectrum bands, and identifying a first guard band configuration corresponding to the first frequency range, the first guard band configuration being different from a second guard band configuration corresponding to a second frequency range.

In some examples of the method, apparatuses, and non-transitory computer-readable medium described herein, the first guard band configuration includes a first guard band size different from a second guard band size associated with the second guard band configuration.

In some examples of the method, apparatuses, and non-transitory computer-readable medium described herein, identifying the guard band configuration may include operations, features, means, or instructions for identifying a beam configuration for communicating with the base station, where the guard band configuration may be based on the beam configuration.

In some examples of the method, apparatuses, and non-transitory computer-readable medium described herein, identifying the guard band configuration may include operations, features, means, or instructions for identifying an antenna array configuration for communicating with the base station, where the guard band configuration may be based on the antenna array configuration.

In some examples of the method, apparatuses, and non-transitory computer-readable medium described herein, identifying the guard band configuration may include operations, features, means, or instructions for identifying a downlink numerology for the downlink resources and an uplink numerology for the uplink resources, and identifying a guard band subcarrier spacing based on the downlink numerology, the uplink numerology, or a combination thereof.

In some examples of the method, apparatuses, and non-transitory computer-readable medium described herein, identifying the guard band configuration may include operations, features, means, or instructions for identifying a predetermined subcarrier spacing value, and identifying a guard band subcarrier spacing based on the predetermined subcarrier spacing value.

In some examples of the method, apparatuses, and non-transitory computer-readable medium described herein, identifying the guard band configuration may include operations, features, means, or instructions for identifying a frequency allocation for the guard band, where the frequency allocation may be based on an allocation of the uplink resources, an allocation of the downlink resources, a frequency location, an offset from the frequency location, an uplink BWP, a downlink BWP, a separation of the uplink BWP and the downlink BWP, or a combination thereof.

In some examples of the method, apparatuses, and non-transitory computer-readable medium described herein, identifying the guard band configuration may include operations, features, means, or instructions for identifying a frequency range for the one or more RF spectrum bands, and selecting the guard band configuration from a set of guard band configurations associated with the identified frequency range.

Some examples of the method, apparatuses, and non-transitory computer-readable medium described herein may further include operations, features, means, or instructions for transmitting, to the base station, an indication of a full-duplex capability, the full-duplex capability indicating that the UE supports the full-duplex communications using the one or more RF spectrum bands, and receiving, from the base station, an indication of the guard band configuration, where the guard band configuration may be based on the full-duplex capability.

In some examples of the method, apparatuses, and non-transitory computer-readable medium described herein, the guard band configuration indicates a number of resource blocks, a number of resource elements, or a combination thereof.

A method of wireless communication at a UE is described. The method may include identifying a transmission hopping configuration for full-duplex communications using one or more RF spectrum bands and transmitting, while simultaneously receiving, one or more messages using the one or more RF spectrum bands based on the transmission hopping configuration.

An apparatus for wireless communication at a UE is described. The apparatus may include a processor, a memory coupled with the processor, and instructions stored in the memory. The instructions may be executable by the processor to cause the apparatus to identify a transmission hopping configuration for full-duplex communications using one or more RF spectrum bands and transmit, while simultaneously receiving, one or more messages using the one or more RF spectrum bands based on the transmission hopping configuration.

Another apparatus for wireless communication at a UE is described. The apparatus may include means for identifying a transmission hopping configuration for full-duplex communications using one or more RF spectrum bands and transmitting, while simultaneously receiving, one or more messages using the one or more RF spectrum bands based on the transmission hopping configuration.

A non-transitory computer-readable medium storing code for wireless communication at a UE is described. The code may include instructions executable by a processor to identify a transmission hopping configuration for full-duplex communications using one or more RF spectrum bands and transmit, while simultaneously receiving, one or more messages using the one or more RF spectrum bands based on the transmission hopping configuration.

In some examples of the method, apparatuses, and non-transitory computer-readable medium described herein, identifying the transmission hopping configuration may include operations, features, means, or instructions for identifying an uplink sub-band, a downlink sub-band, and a guard band for the full-duplex communications, identifying respective frequency locations of the uplink sub-band, the downlink sub-band, and the guard band, during a first TTI, and adjusting, during a second TTI, the respective frequency location of the uplink sub-band, the downlink sub-band, the guard band, or a combination thereof, based on the transmission hopping configuration.

Some examples of the method, apparatuses, and non-transitory computer-readable medium described herein may further include operations, features, means, or instructions for adjusting a first size of the uplink sub-band in the first TTI to a second size of the uplink sub-band in the second TTI based on the transmission hopping configuration, the first size being different from the second size.

Some examples of the method, apparatuses, and non-transitory computer-readable medium described herein may further include operations, features, means, or instructions for adjusting a first size of the downlink sub-band in the first TTI to a second size of the downlink sub-band in the second TTI based on the transmission hopping configuration, the first size being different from the second size.

In some examples of the method, apparatuses, and non-transitory computer-readable medium described herein, identifying the transmission hopping configuration may include operations, features, means, or instructions for identifying uplink resources and downlink resources for the full-duplex communications, where the uplink resources at least partially overlap with the downlink resources in time and frequency, and where the overlap of the uplink resources with the downlink resources is based on a capability of the UE, identifying a frequency location of the uplink resources during a first TTI, and adjusting, during a second TTI, the frequency location of the uplink resources based on the transmission hopping configuration.

Some examples of the method, apparatuses, and non-transitory computer-readable medium described herein may further include operations, features, means, or instructions for adjusting a first size of the uplink resources in the first TTI to a second size of the uplink resources in the second TTI based on the transmission hopping configuration, the first size being different from the second size.

Some examples of the method, apparatuses, and non-transitory computer-readable medium described herein may further include operations, features, means, or instructions for adjusting a first size of the downlink resources in the first TTI to a second size of the downlink resources in the second TTI based on the transmission hopping configuration, the first size being different from the second size.

In some examples of the method, apparatuses, and non-transitory computer-readable medium described herein, the first TTI and the second TTI include a symbol, a set of symbols, a mini slot, a slot, or a subframe.

Some examples of the method, apparatuses, and non-transitory computer-readable medium described herein may further include operations, features, means, or instructions for receiving an indication of the transmission hopping configuration, where the indication may be received via RRC messaging, a medium access control (MAC) control element (MAC-CE), downlink control information (DCI), or a combination thereof.

A method of wireless communication is described. The method may include identifying an antenna switching configuration for full-duplex communications using one or more RF spectrum bands and transmitting, while simultaneously receiving, one or more messages using the one or more RF spectrum bands based on the antenna switching configuration.

An apparatus for wireless communication is described. The apparatus may include a processor, a memory coupled with the processor, and instructions stored in the memory. The instructions may be executable by the processor to cause the apparatus to identify an antenna switching configuration for full-duplex communications using one or more RF spectrum bands and transmit, while simultaneously receiving, one or more messages using the one or more RF spectrum bands based on the antenna switching configuration.

Another apparatus for wireless communication is described. The apparatus may include means for identifying an antenna switching configuration for full-duplex communications using one or more RF spectrum bands and transmitting, while simultaneously receiving, one or more messages using the one or more RF spectrum bands based on the antenna switching configuration.

A non-transitory computer-readable medium storing code for wireless communication is described. The code may include instructions executable by a processor to identify an antenna switching configuration for full-duplex communications using one or more RF spectrum bands and transmit, while simultaneously receiving, one or more messages using the one or more RF spectrum bands based on the antenna switching configuration.

In some examples of the method, apparatuses, and non-transitory computer-readable medium described herein, identifying the antenna switching configuration may include operations, features, means, or instructions for identifying a first antenna array and a second antenna array, transmitting using the first antenna array while receiving using the second antenna array during a first TTI, and receiving using the first antenna array while transmitting using the second antenna array during a second TTI based on the antenna switching configuration.

Some examples of the method, apparatuses, and non-transitory computer-readable medium described herein may further include operations, features, means, or instructions for transmitting using the first antenna array, or the second antenna array, or a combination thereof, during a third TTI, and receiving using the first antenna array, or the second antenna array, or a combination thereof, during a fourth TTI.

In some examples of the method, apparatuses, and non-transitory computer-readable medium described herein, the first TTI and the second TTI include a symbol, a set of symbols, a mini slot, a slot, or a subframe.

In some examples of the method, apparatuses, and non-transitory computer-readable medium described herein, identifying the antenna switching configuration may include operations, features, means, or instructions for selecting an antenna switching pattern from a set of antenna switching patterns.

Some examples of the method, apparatuses, and non-transitory computer-readable medium described herein may further include operations, features, means, or instructions for receiving an indication of one or more spatial filters or a transmission configuration indicator (TCI) for uplink transmissions, where transmitting the one or more messages may be based on the one or more spatial filters or the TCI.

In some examples of the method, apparatuses, and non-transitory computer-readable medium described herein, a spatial filter of the one or more spatial filters includes a common spatial filter for a set of antenna arrays.

In some examples of the method, apparatuses, and non-transitory computer-readable medium described herein, each spatial filter of the one or more spatial filters may be associated with a respective antenna array.

Some examples of the method, apparatuses, and non-transitory computer-readable medium described herein may further include operations, features, means, or instructions for identifying one or more transmission configuration indicator states, and selecting respective antenna arrays for receiving downlink transmissions based on the one or more transmission configuration indicator states.

Some examples of the method, apparatuses, and non-transitory computer-readable medium described herein may further include operations, features, means, or instructions for receiving, from a base station, an indication of the antenna switching configuration.

Some examples of the method, apparatuses, and non-transitory computer-readable medium described herein may further include operations, features, means, or instructions for transmitting, to a UE, an indication of the antenna switching configuration.

A method of wireless communication at a base station is described. The method may include receiving, from a UE, an indication of a full-duplex capability, the full-duplex capability indicating that the UE supports one or more types of full-duplex communications for each RF spectrum band of one or more RF spectrum bands and receiving, while simultaneously transmitting, one or more messages from the UE over the one or more RF spectrum bands in accordance with the one or more types of full-duplex communications.

An apparatus for wireless communication at a base station is described. The apparatus may include a processor, a memory coupled with the processor, and instructions stored in the memory. The instructions may be executable by the processor to cause the apparatus to receive, from a UE, an indication of a full-duplex capability, the full-duplex capability indicating that the UE supports one or more types of full-duplex communications for each RF spectrum band of one or more RF spectrum bands and receive, while simultaneously transmitting, one or more messages from the UE over the one or more RF spectrum bands in accordance with the one or more types of full-duplex communications.

Another apparatus for wireless communication at a base station is described. The apparatus may include means for receiving, from a UE, an indication of a full-duplex capability, the full-duplex capability indicating that the UE supports one or more types of full-duplex communications for each RF spectrum band of one or more RF spectrum bands and receiving, while simultaneously transmitting, one or more messages from the UE over the one or more RF spectrum bands in accordance with the one or more types of full-duplex communications.

A non-transitory computer-readable medium storing code for wireless communication at a base station is described. The code may include instructions executable by a processor to receive, from a UE, an indication of a full-duplex capability, the full-duplex capability indicating that the UE supports one or more types of full-duplex communications for each RF spectrum band of one or more RF spectrum bands and receive, while simultaneously transmitting, one or more messages from the UE over the one or more RF spectrum bands in accordance with the one or more types of full-duplex communications.

Some examples of the method, apparatuses, and non-transitory computer-readable medium described herein may further include operations, features, means, or instructions for identifying a base station full-duplex capability for supporting the one or more types of full-duplex communications for each RF spectrum band of the one or more RF spectrum bands, and transmitting, to the UE, an indication of the base station full-duplex capability.

In some examples of the method, apparatuses, and non-transitory computer-readable medium described herein, the received one or more messages may have transmission parameters that may be based on the base station full-duplex capability.

In some examples of the method, apparatuses, and non-transitory computer-readable medium described herein, the transmission parameters include a transmission power, a number of repetitions, an aggregation level, or a combination thereof.

In some examples of the method, apparatuses, and non-transitory computer-readable medium described herein, receiving the indication of the full-duplex capability may include operations, features, means, or instructions for receiving the indication from the UE via RRC messaging.

In some examples of the method, apparatuses, and non-transitory computer-readable medium described herein, the one or more types of full-duplex communications includes at least a first type associated with uplink resources that at least partially overlap in time and frequency with downlink resources or a second type associated with uplink resources that overlap in time with the downlink resources and separated from the downlink resources by a guard band.

A method of wireless communication at a base station is described. The method may include identifying one or more RF spectrum bands for full-duplex communications, the full-duplex communications being associated with uplink resources that overlap in time with downlink resources and separated from the downlink resources by a guard band, identifying a guard band configuration based on the full-duplex communications, and receiving, while simultaneously transmitting, messages to one or more UEs using the one or more RF spectrum bands based on the guard band configuration.

An apparatus for wireless communication at a base station is described. The apparatus may include a processor, a memory coupled with the processor, and instructions stored in the memory. The instructions may be executable by the processor to cause the apparatus to identify one or more RF spectrum bands for full-duplex communications, the full-duplex communications being associated with uplink resources that overlap in time with downlink resources and separated from the downlink resources by a guard band, identify a guard band configuration based on the full-duplex communications, and receive, while simultaneously transmitting, messages to one or more UEs using the one or more RF spectrum bands based on the guard band configuration.

Another apparatus for wireless communication at a base station is described. The apparatus may include means for identifying one or more RF spectrum bands for full-duplex communications, the full-duplex communications being associated with uplink resources that overlap in time with downlink resources and separated from the downlink resources by a guard band, identifying a guard band configuration based on the full-duplex communications, and receiving, while simultaneously transmitting, messages to one or more UEs using the one or more RF spectrum bands based on the guard band configuration.

A non-transitory computer-readable medium storing code for wireless communication at a base station is described. The code may include instructions executable by a processor to identify one or more RF spectrum bands for full-duplex communications, the full-duplex communications being associated with uplink resources that overlap in time with downlink resources and separated from the downlink resources by a guard band, identify a guard band configuration based on the full-duplex communications, and receive, while simultaneously transmitting, messages to one or more UEs using the one or more RF spectrum bands based on the guard band configuration.

In some examples of the method, apparatuses, and non-transitory computer-readable medium described herein, identifying the guard band configuration may include operations, features, means, or instructions for identifying a first frequency range for the one or more RF spectrum bands, and identifying a first guard band configuration corresponding to the first frequency range, the first guard band configuration being different from a second guard band configuration corresponding to a second frequency range.

In some examples of the method, apparatuses, and non-transitory computer-readable medium described herein, the first guard band configuration includes a first guard band size different from a second guard band size associated with the second guard band configuration.

In some examples of the method, apparatuses, and non-transitory computer-readable medium described herein, identifying the guard band configuration may include operations, features, means, or instructions for identifying a beam configuration for communicating with the UE, where the guard band configuration may be based on the beam configuration.

In some examples of the method, apparatuses, and non-transitory computer-readable medium described herein, identifying the guard band configuration may include operations, features, means, or instructions for identifying an antenna array configuration for communicating with the UE, where the guard band configuration may be based on the antenna array configuration.

In some examples of the method, apparatuses, and non-transitory computer-readable medium described herein, identifying the guard band configuration may include operations, features, means, or instructions for identifying a downlink numerology for the downlink resources and an uplink numerology for the uplink resources, and identifying a guard band subcarrier spacing based on the downlink numerology, the uplink numerology, or a combination thereof.

In some examples of the method, apparatuses, and non-transitory computer-readable medium described herein, identifying the guard band configuration may include operations, features, means, or instructions for identifying a predetermined subcarrier spacing value, and identifying a guard band subcarrier spacing based on the predetermined subcarrier spacing value.

In some examples of the method, apparatuses, and non-transitory computer-readable medium described herein, identifying the guard band configuration may include operations, features, means, or instructions for identifying a frequency allocation for the guard band, where the frequency allocation may be based on an allocation of the uplink resources, an allocation of the downlink resources, a frequency location, an offset from the frequency location, an uplink BWP, a downlink BWP, a separation of the uplink BWP and the downlink BWP, or a combination thereof.

In some examples of the method, apparatuses, and non-transitory computer-readable medium described herein, identifying the guard band configuration may include operations, features, means, or instructions for identifying a frequency range for the one or more RF spectrum bands, and selecting the guard band configuration from a set of guard band configurations associated with the identified frequency range.

Some examples of the method, apparatuses, and non-transitory computer-readable medium described herein may further include operations, features, means, or instructions for identifying a set of downlink resources associated with a first operator and a set of uplink resources associated with a second operator, and configuring a frequency pattern for separating the set of downlink resources and the set of uplink resources based on the full-duplex communications.

In some examples of the method, apparatuses, and non-transitory computer-readable medium described herein, identifying the guard band configuration may include operations, features, means, or instructions for identifying a set of downlink resources associated with a first operator and a set of uplink resources associated with a second operator, and adjusting the guard band between the set of downlink resources and the set of uplink resources based on the full-duplex communications.

Some examples of the method, apparatuses, and non-transitory computer-readable medium described herein may further include operations, features, means, or instructions for receiving, from the UE, an indication of a full-duplex capability, the full-duplex capability indicating that the UE supports the full-duplex communications using the one or more RF spectrum bands, and transmitting, to the UE, an indication of the guard band configuration, where the guard band configuration may be based on the full-duplex capability.

In some examples of the method, apparatuses, and non-transitory computer-readable medium described herein, the guard band configuration indicates a number of resource blocks, a number of resource elements, or a combination thereof.

A method of wireless communication is described. The method may include identifying an antenna switching configuration for full-duplex communications using one or more RF spectrum bands, the antenna switching configuration associated with switching between at least a first antenna panel and a second antenna panel, identifying, based on the antenna switching configuration, a first RF spectrum band and a second RF spectrum band of the one or more RF spectrum bands, transmitting a first message over the first RF spectrum band using the first antenna panel during a first TTI based on the antenna switching configuration, and receiving a second message over the second RF spectrum band using the second antenna panel during the first TTI based on the antenna switching configuration.

An apparatus for wireless communication is described. The apparatus may include a processor, a memory coupled with the processor, and instructions stored in the memory. The instructions may be executable by the processor to cause the apparatus to identify an antenna switching configuration for full-duplex communications using one or more RF spectrum bands, the antenna switching configuration associated with switching between at least a first antenna panel and a second antenna panel, identify, based on the antenna switching configuration, a first RF spectrum band and a second RF spectrum band of the one or more RF spectrum bands, transmit a first message over the first RF spectrum band using the first antenna panel during a first TTI based on the antenna switching configuration, and receive a second message over the second RF spectrum band using the second antenna panel during the first TTI based on the antenna switching configuration.

Another apparatus for wireless communication is described. The apparatus may include means for identifying an antenna switching configuration for full-duplex communications using one or more RF spectrum bands, the antenna switching configuration associated with switching between at least a first antenna panel and a second antenna panel, identifying, based on the antenna switching configuration, a first RF spectrum band and a second RF spectrum band of the one or more RF spectrum bands, transmitting a first message over the first RF spectrum band using the first antenna panel during a first TTI based on the antenna switching configuration, and receiving a second message over the second RF spectrum band using the second antenna panel during the first TTI based on the antenna switching configuration.

A non-transitory computer-readable medium storing code for wireless communication is described. The code may include instructions executable by a processor to identify an antenna switching configuration for full-duplex communications using one or more RF spectrum bands, the antenna switching configuration associated with switching between at least a first antenna panel and a second antenna panel, identify, based on the antenna switching configuration, a first RF spectrum band and a second RF spectrum band of the one or more RF spectrum bands, transmit a first message over the first RF spectrum band using the first antenna panel during a first TTI based on the antenna switching configuration, and receive a second message over the second RF spectrum band using the second antenna panel during the first TTI based on the antenna switching configuration.

Some examples of the method, apparatuses, and non-transitory computer-readable medium described herein may further include operations, features, means, or instructions for receiving a third message over the first RF spectrum band using the first antenna panel during a second TTI based on the antenna switching configuration, and transmitting a fourth message over the second RF spectrum band using the second antenna panel during the second TTI based on the antenna switching configuration.

Some examples of the method, apparatuses, and non-transitory computer-readable medium described herein may further include operations, features, means, or instructions for transmitting a third message over the second RF spectrum band using the first antenna panel during a second TTI based on the antenna switching configuration, and receiving a fourth message over the first RF spectrum band using the second antenna panel during the second TTI based on the antenna switching configuration.

Some examples of the method, apparatuses, and non-transitory computer-readable medium described herein may further include operations, features, means, or instructions for transmitting a third message over the first RF spectrum band, or the second RF spectrum band, or a combination thereof, using the first antenna panel, or the second antenna panel, or a combination thereof, during a second TTI, and receiving a fourth message over the first RF spectrum band, or the second RF spectrum band, or a combination thereof, using the first antenna panel, or the second antenna panel, or a combination thereof, during a third TTI.

In some examples of the method, apparatuses, and non-transitory computer-readable medium described herein, the first TTI includes a symbol, a set of symbols, a mini slot, a slot, or a subframe.

In some examples of the method, apparatuses, and non-transitory computer-readable medium described herein, identifying the antenna switching configuration may include operations, features, means, or instructions for selecting an antenna switching pattern from a set of antenna switching patterns.

Some examples of the method, apparatuses, and non-transitory computer-readable medium described herein may further include operations, features, means, or instructions for receiving an indication of one or more spatial filters or a TCI for uplink transmissions, where transmitting the first message using the first antenna panel may be based on the one or more spatial filters or the TCI.

Some examples of the method, apparatuses, and non-transitory computer-readable medium described herein may further include operations, features, means, or instructions for identifying one or more transmission configuration indicator states, and selecting respective antenna panels for receiving downlink transmissions based on the one or more transmission configuration indicator states.

Some examples of the method, apparatuses, and non-transitory computer-readable medium described herein may further include operations, features, means, or instructions for receiving, from a base station, an indication of the antenna switching configuration.

Some examples of the method, apparatuses, and non-transitory computer-readable medium described herein may further include operations, features, means, or instructions for transmitting, to a UE, an indication of the antenna switching configuration.

A method of wireless communication at a UE is described. The method may include identifying, by the UE, support for full-duplex communications using one or more RF spectrum bands, the full-duplex communications being associated with uplink resources that overlap in time with downlink resources and separated from the downlink resources by a guard band, identifying a guard band configuration for separating first control signaling and first data signaling over the uplink resources from second control signaling and second data signaling over the downlink resources based on the support for the full-duplex communications, where the guard band configuration indicates a variable guard band configuration based on one or more communication parameters, one or more configurations, or a combination thereof, and transmitting, while simultaneously receiving, one or more messages to a base station using the one or more RF spectrum bands based on the guard band configuration.

An apparatus for wireless communication at a UE is described. The apparatus may include a processor, a memory coupled with the processor, and instructions stored in the memory. The instructions may be executable by the processor to cause the apparatus to identify, by the UE, support for full-duplex communications using one or more RF spectrum bands, the full-duplex communications being associated with uplink resources that overlap in time with downlink resources and separated from the downlink resources by a guard band, identify a guard band configuration for separating first control signaling and first data signaling over the uplink resources from second control signaling and second data signaling over the downlink resources based on the support for the full-duplex communications, where the guard band configuration indicates a variable guard band configuration based on one or more communication parameters, one or more configurations, or a combination thereof, and transmit, while simultaneously receiving, one or more messages to a base station using the one or more RF spectrum bands based on the guard band configuration.

Another apparatus for wireless communication at a UE is described. The apparatus may include means for identifying, by the UE, support for full-duplex communications using one or more RF spectrum bands, the full-duplex communications being associated with uplink resources that overlap in time with downlink resources and separated from the downlink resources by a guard band, identifying a guard band configuration for separating first control signaling and first data signaling over the uplink resources from second control signaling and second data signaling over the downlink resources based on the support for the full-duplex communications, where the guard band configuration indicates a variable guard band configuration based on one or more communication parameters, one or more configurations, or a combination thereof, and transmitting, while simultaneously receiving, one or more messages to a base station using the one or more RF spectrum bands based on the guard band configuration.

A non-transitory computer-readable medium storing code for wireless communication at a UE is described. The code may include instructions executable by a processor to identify, by the UE, support for full-duplex communications using one or more RF spectrum bands, the full-duplex communications being associated with uplink resources that overlap in time with downlink resources and separated from the downlink resources by a guard band, identify a guard band configuration for separating first control signaling and first data signaling over the uplink resources from second control signaling and second data signaling over the downlink resources based on the support for the full-duplex communications, where the guard band configuration indicates a variable guard band configuration based on one or more communication parameters, one or more configurations, or a combination thereof, and transmit, while simultaneously receiving, one or more messages to a base station using the one or more RF spectrum bands based on the guard band configuration.

Some examples of the method, apparatuses, and non-transitory computer-readable medium described herein may further include operations, features, means, or instructions for transmitting, to the base station, an indication of a full-duplex capability of the UE, the full-duplex capability indicating that the UE supports one or more types of full-duplex communications using the one or more RF spectrum bands, and receiving, from the base station, an indication of the guard band configuration, where the guard band configuration may be based on the full-duplex capability.

In some examples of the method, apparatuses, and non-transitory computer-readable medium described herein, identifying the guard band configuration may include operations, features, means, or instructions for identifying a first frequency range for the one or more RF spectrum bands, and identifying a first guard band configuration corresponding to the first frequency range, the first guard band configuration including a first guard band size different than a second guard band size associated with a second guard band configuration corresponding to a second frequency range.

In some examples of the method, apparatuses, and non-transitory computer-readable medium described herein, identifying the guard band configuration may include operations, features, means, or instructions for identifying a beam configuration for communicating with the base station, where the guard band configuration may be based on the beam configuration.

In some examples of the method, apparatuses, and non-transitory computer-readable medium described herein, identifying the guard band configuration may include operations, features, means, or instructions for identifying an antenna panel configuration for communicating with the base station, where the guard band configuration may be based on the antenna panel configuration.

In some examples of the method, apparatuses, and non-transitory computer-readable medium described herein, identifying the guard band configuration may include operations, features, means, or instructions for identifying a downlink numerology for the downlink resources and an uplink numerology for the uplink resources, and identifying a guard band subcarrier spacing based on the downlink numerology, the uplink numerology, or a combination thereof.

In some examples of the method, apparatuses, and non-transitory computer-readable medium described herein, identifying the guard band configuration may include operations, features, means, or instructions for identifying a predetermined subcarrier spacing value, and identifying a guard band subcarrier spacing based on the predetermined subcarrier spacing value.

In some examples of the method, apparatuses, and non-transitory computer-readable medium described herein, identifying the guard band configuration may include operations, features, means, or instructions for identifying a frequency allocation for the guard band, where the frequency allocation may be based on an allocation of the uplink resources, an allocation of the downlink resources, a frequency location, an offset from the frequency location, an uplink BWP, a downlink BWP, a separation of the uplink BWP and the downlink BWP, or a combination thereof.

In some examples of the method, apparatuses, and non-transitory computer-readable medium described herein, identifying the guard band configuration may include operations, features, means, or instructions for identifying a frequency range for the one or more RF spectrum bands, and selecting the guard band configuration from a set of guard band configurations associated with the identified frequency range.

A method of wireless communication at a base station is described. The method may include identifying one or more RF spectrum bands for full-duplex communications, the full-duplex communications being associated with uplink resources that overlap in time with downlink resources and separated from the downlink resources by a guard band, identifying that a downlink transmission associated with a first operator and an uplink transmission associated with a second operator overlap in time, the downlink transmission associated with a set of downlink resources, configuring a frequency allocation pattern for separating a set of uplink resources associated with the uplink transmission from the set of downlink resources associated with the downlink transmission based on the set of downlink resources and identifying that the downlink transmission associated with the first operator and the uplink transmission associated with the second operator overlap in time, and receiving the uplink transmission over the set of uplink resources while simultaneously transmitting the downlink transmission over the set of downlink resources using the one or more RF spectrum bands based on the frequency allocation pattern.

An apparatus for wireless communication at a base station is described. The apparatus may include a processor, a memory coupled with the processor, and instructions stored in the memory. The instructions may be executable by the processor to cause the apparatus to identify one or more RF spectrum bands for full-duplex communications, the full-duplex communications being associated with uplink resources that overlap in time with downlink resources and separated from the downlink resources by a guard band, identify that a downlink transmission associated with a first operator and an uplink transmission associated with a second operator overlap in time, the downlink transmission associated with a set of downlink resources, configure a frequency allocation pattern for separating a set of uplink resources associated with the uplink transmission from the set of downlink resources associated with the downlink transmission based on the set of downlink resources and identifying that the downlink transmission associated with the first operator and the uplink transmission associated with the second operator overlap in time, and receive the uplink transmission over the set of uplink resources while simultaneously transmitting the downlink transmission over the set of downlink resources using the one or more RF spectrum bands based on the frequency allocation pattern.

Another apparatus for wireless communication at a base station is described. The apparatus may include means for identifying one or more RF spectrum bands for full-duplex communications, the full-duplex communications being associated with uplink resources that overlap in time with downlink resources and separated from the downlink resources by a guard band, identifying that a downlink transmission associated with a first operator and an uplink transmission associated with a second operator overlap in time, the downlink transmission associated with a set of downlink resources, configuring a frequency allocation pattern for separating a set of uplink resources associated with the uplink transmission from the set of downlink resources associated with the downlink transmission based on the set of downlink resources and identifying that the downlink transmission associated with the first operator and the uplink transmission associated with the second operator overlap in time, and receiving the uplink transmission over the set of uplink resources while simultaneously transmitting the downlink transmission over the set of downlink resources using the one or more RF spectrum bands based on the frequency allocation pattern.

A non-transitory computer-readable medium storing code for wireless communication at a base station is described. The code may include instructions executable by a processor to identify one or more RF spectrum bands for full-duplex communications, the full-duplex communications being associated with uplink resources that overlap in time with downlink resources and separated from the downlink resources by a guard band, identify that a downlink transmission associated with a first operator and an uplink transmission associated with a second operator overlap in time, the downlink transmission associated with a set of downlink resources, configure a frequency allocation pattern for separating a set of uplink resources associated with the uplink transmission from the set of downlink resources associated with the downlink transmission based on the set of downlink resources and identifying that the downlink transmission associated with the first operator and the uplink transmission associated with the second operator overlap in time, and receive the uplink transmission over the set of uplink resources while simultaneously transmitting the downlink transmission over the set of downlink resources using the one or more RF spectrum bands based on the frequency allocation pattern.

In some examples of the method, apparatuses, and non-transitory computer-readable medium described herein, configuring the frequency allocation pattern for separating the set of uplink resources associated with the uplink transmission from the set of downlink resources associated with the downlink transmission may include operations, features, means, or instructions for separating the set of uplink resources from the set of downlink resources over the one or more RF spectrum bands.

In some examples of the method, apparatuses, and non-transitory computer-readable medium described herein, configuring the frequency allocation pattern for separating the set of uplink resources associated with the uplink transmission from the set of downlink resources associated with the downlink transmission may include operations, features, means, or instructions for adjusting the guard band between the set of downlink resources and the set of uplink resources based on interference arising at a first antenna panel associated with the second operator from a second antenna panel associated with the first operator.

DETAILED DESCRIPTION

Figure 1:
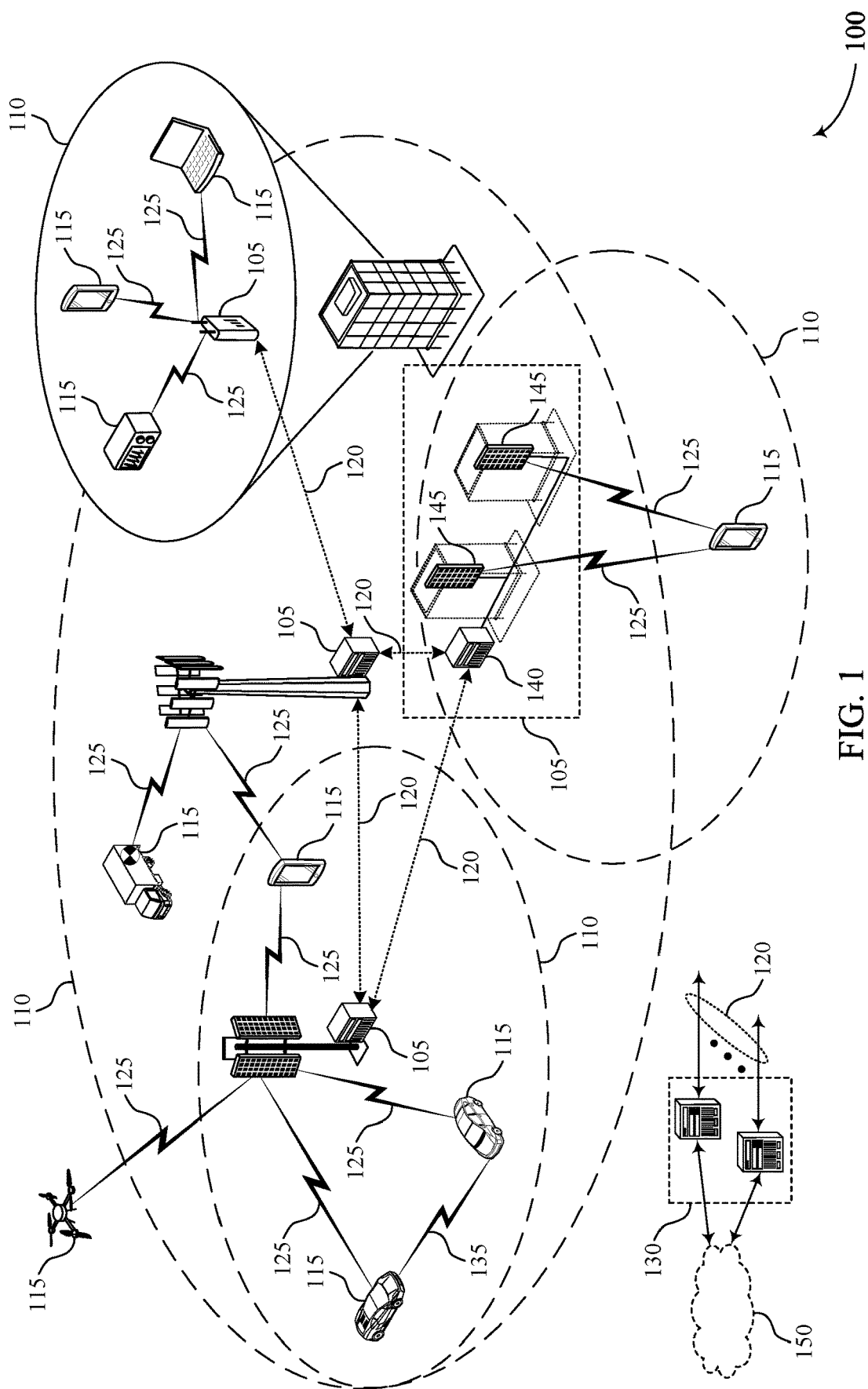
FIG. 1 illustrates an example of a wireless communications system that supports configurations for full-duplex communication systems in accordance with aspects of the present disclosure.

Some wireless communications systems may support full-duplex communications by various wireless devices in the systems. For example, both UEs and base stations may be capable of simultaneous transmission and reception. As such, RF spectrum bands may be configured to support full-duplex communications. For example, RF spectrum bands that are configured, for example, for time division duplexing (TDD) operation, may be configured for full-duplex operation. In addition, different types of full-duplex communications may be associated with respective resource configurations, which may include uplink and downlink resources that overlap in both the time domain and frequency domain (e.g., in-band full-duplex) or uplink and downlink resources that overlap in the time domain, but are separated in the frequency domain by a guard band (e.g., sub-band full-duplex). Wireless devices that support full-duplex may use one or more of these types of full-duplex communications and corresponding resource configurations based on the capabilities of the device (e.g., based on hardware components and capabilities of the device to detect simultaneous uplink and downlink signals despite the signals being carried on resources that at least partially overlap).

In some cases, wireless devices that support full-duplex communications may be affected by self-interference caused by signal leakage between transmit and receive antenna arrays. For example, a UE that supports full-duplex communications may experience interference at the receive antennas of the UE arising from uplink transmissions from transmit antennas of the UE (e.g., while simultaneously transmitting in the uplink and receiving in the downlink). Similarly, a full-duplex base station may experience self-interference when receiving uplink communications from one or more UEs while simultaneously communicating on the downlink to a UE, where the downlink signaling may generate the self-interference at the receive antennas of the base station. As such, it may be desirable to configure full-duplex communications in such a way to reduce or minimize the effects of self-interference at a wireless device.

As described herein, various techniques and configurations may enhance full-duplex communications in a network and further reduce the self-interference described above. As an example, a UE may signal its full-duplex capabilities to a base station, which may indicate one or more types of full-duplex communications that the UE supports (e.g., in-band full-duplex, sub-band full-duplex, etc.). For example, a UE may employ an indicator (e.g., one or more bits) per RF spectrum band to indicate which one of in-band full-duplex or sub-band full-duplex are supported for each RF spectrum band. Such capability signaling may enable the base station to identify configurations for full-duplex communications that are supported by the UE in a particularly efficient manner. Through the identification of full-duplex operational modes and configuration that align with the capabilities of the UE, the base station may accordingly configure resources for efficient full-duplex communications in the system.

In configuring full-duplex communications (e.g., for either the base station or UE, or both), a guard band between uplink and downlink resources (e.g., that overlap in the time domain) may be configured based on various factors, parameters, or configurations. For instance, the guard band may be based on a frequency range of the RF spectrum band(s) used for sub-band full-duplex communications, where the guard band may vary from one frequency band to another. Additionally or alternatively, the configuration for the guard band may be based on a numerology of the uplink or downlink resources, or both (e.g., BWPs), or may be some fixed value regardless of the numerologies of the uplink and downlink resources. Further, the guard band, and the location of the full-duplex uplink and downlink resources, may be configured based on the RF spectrum bands or component carriers that different operators utilize. Interference may accordingly be mitigated by coherently configuring the guard band and associated resources for sub-band full-duplex communications.

The described techniques may further include configuring transmission hopping and antenna switching for full-duplex operation. The full-duplex transmission hopping may be used to modify the frequency resources allocated (e.g., the size or location, or both) for uplink and downlink resources in full-duplex communications, where the uplink resources or the downlink resources (or the guard band) may change in respective slots (or subframes). For full-duplex antenna switching, both a UE and a base station may dynamically switch between different antenna arrays or antenna panels for transmission and reception during different slots, where a set of beam switching patterns may be defined.

Features of the subject matter described herein may be implemented to realize one or more potential advantages. The described techniques may generally support improvements in full-duplex communications, in addition to enhancements in reliability and interference cancellation, among other advantages. As such, the supported techniques may include improved network operations and, in some examples, may promote network efficiencies, improve spectrum efficiency, and enable low-latency reliable communication, among other benefits.

Aspects of the disclosure are initially described in the context of wireless communications systems. Further examples are provided that show resource configurations and resource allocations that enable efficient full-duplex communications. Aspects of the disclosure are further illustrated by and described with reference to apparatus diagrams, system diagrams, and flowcharts that relate to configurations for full-duplex communication systems.

FIG. 1 illustrates an example of a wireless communications system 100 that supports configurations for full-duplex communication systems in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of RF spectrum resources having a defined physical layer structure for supporting the communication links 125. For example, a carrier used for a communication link 125 may include a portion of an RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of an RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

As described herein, a UE 115 or a base station may be capable of supporting full-duplex communications. In such cases, different antennas, antenna arrays, or different portions of an antenna array may be used to simultaneously transmit and receive. An antenna configuration may be used for full-duplex OFDM symbols, where a transmit antenna may be spatially separated from a receive antenna, which may reduce leakage (e.g., self-interference) from the transmit antenna onto the receive antenna. In other examples (such as for non-full-duplex communications), a same antenna or antenna array may be used to receive and transmit, but not both.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 or a base station 105, or both, may be capable of full-duplex communication. For example, the UE 115 or the base station 105, or both, may simultaneously transmit and receive signals. In some cases, the UE 115 or the base station 105 may transmit signals to a device (e.g., another UE 115 or another base station 105) and simultaneously receive signals from the same device. In other cases, the UE 115 or the base station 105 may transmit signals to a first device and simultaneously receive signals from a second device.

In some examples, a UE 115 and a base station 105 may both support full-duplex communications over a communication link 125. In such examples, the UE 115 or the base station 105, or both, may identify resources (e.g., one or more RF spectrum bands or channels) to use for full-duplex communications. Further, the described resources may refer to resource elements (REs), RBs, resource element groups (REGs), or other sets of one or more physical resources used to transmit in a wireless communications system (such as the wireless communications system 100). In some examples, the UE 115 may identify the resources and may further identify one or more types of full-duplex communications that the UE 115 may support for each RF spectrum band (e.g., each frequency band) within the resources. For example, the UE 115 may support in-band full-duplex, sub-band full-duplex, or both, for each frequency band within a set of allocated resources. In some examples, the UE 115 may transmit a message to the base station 105 indicating the full-duplex capability of the UE 115. The full-duplex capability of the UE 115 may include the resources identified by the UE 115 as well as the one or more types of full-duplex communications the UE 115 may support for each frequency band. In some examples, the base station 105 may receive the full-duplex capability message and identify the frequency resources and the one or more types of full-duplex communications that may be used by the UE 115 for full-duplex communications. Accordingly, the base station 105 may configure such resources for full-duplex communications with the UE 115 based on the resources allocated for the full-duplex communications and the one or more types of full-duplex communications indicated in the message (e.g., based on the full-duplex capability of the UE 115). In some examples, the UE 115 and the base station 105 may communicate, in simultaneous uplink and downlink, using the resources configured by the base station 105.

Additionally, the UE 115 and the base station 105 may identify, independently or via an indication from the other device, one or more configurations for the full-duplex communications using the resources configured by the base station 105. In some examples, the base station 105 may transmit an indication of one or more configurations for the UE 115 to use based on the full-duplex capability of the UE 115. In some cases, the base station 105 may identify a configuration based on the full-duplex capability of the UE 115, transmit an indication of the configuration to the UE 115, and the UE 115 may identify the configuration based on receiving the indication.

In some cases, the UE 115 or the base station 105, or both, may identify a guard band configuration for full-duplex communication (e.g., in the case that the UE 115 supports sub-band full-duplex). In some examples, the UE 115 may receive an indication of the guard band configuration from the base station 105. Accordingly, the UE 115 and the base station 105 may communicate using full-duplex communications based on the guard band configuration.

Additionally or alternatively, the UE 115 or the base station 105 may identify a transmission hopping configuration to perform full-duplex communications over the resources configured by the base station 105. In some examples, the UE 115 may receive an indication of the transmission hopping configuration (e.g., from the base station 105). Accordingly, the UE 115 and the base station 105 may communicate using full-duplex communications based on a transmission hopping (e.g., frequency hopping) pattern corresponding to the transmission hopping configuration (e.g., a transmission hopping pattern indicated by the transmission hopping configuration).

The UE 115 or the base station 105, or both, may also identify an antenna switching configuration to use to perform the full-duplex communications over the resources configured by the base station 105. In some examples, the UE 115 may receive an indication of the antenna switching configuration from the base station 105. Accordingly, the UE 115 and the base station 105 may communicate using full-duplex communications based on the antenna switching configuration.

Figure 2:
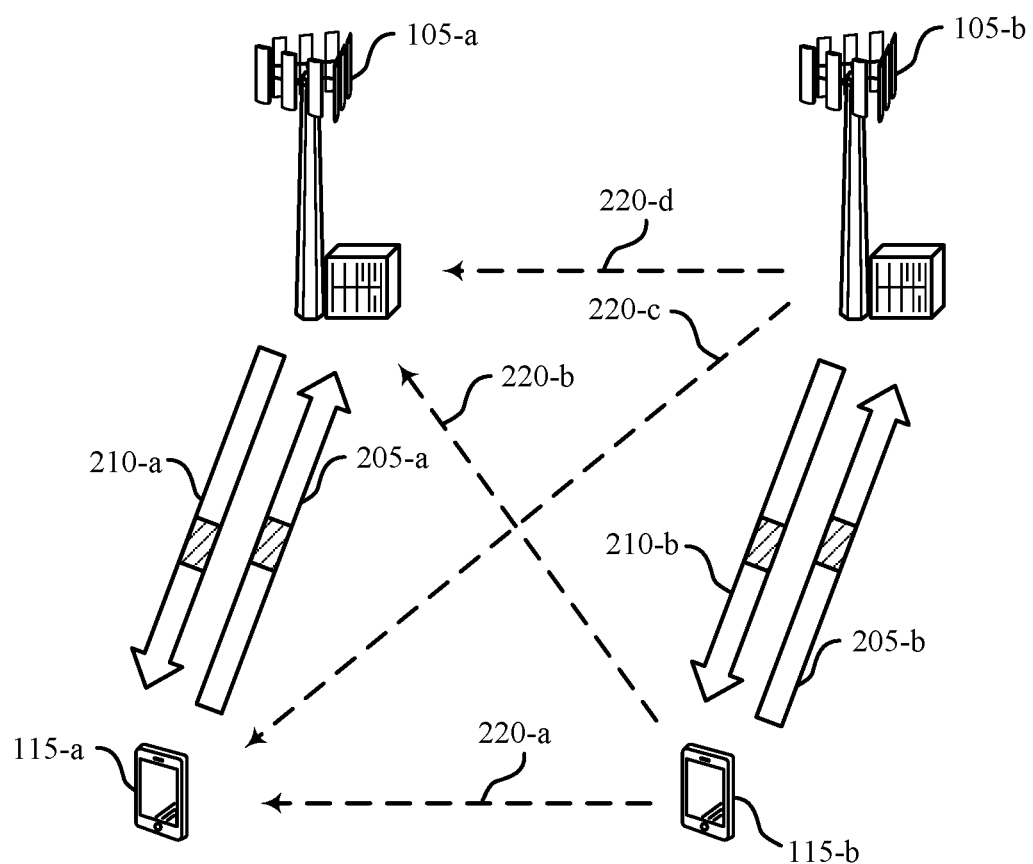
FIG. 2 illustrates an example of a wireless communications system that supports configurations for full-duplex communication systems in accordance with aspects of the present disclosure.

FIG. 2 illustrates an example of a wireless communications system 200 that supports configurations for full-duplex communication systems in accordance with aspects of the present disclosure. In some examples, the wireless communications system 200 may implement aspects of the wireless communications system 100. The wireless communications system 200 may include a UE 115-a, a UE 115-b, a base station 105-a, and a base station 105-b, which may be examples of the corresponding devices described with reference to FIG. 1. In some cases, the wireless communications system 200 (e.g., a 5G or an NR system) may support enhancements for full-duplex communications at both ends of a communication link (e.g., at both a UE 115 and a base station 105).

In some cases, the UE 115-a and the base station 105-a may support full-duplex communications over a communication link 205. While transmitting and receiving signals using full-duplex communications, the UE 115-a or the base station 105-a, or both, may experience self-interference due to transmitting and receiving signals via spatially proximate antenna arrays. For instance, the UE 115-a may transmit a signal to the base station 105-a on an uplink communication link 205-a via a transmit antenna array or panel while simultaneously receiving a signal from the base station 105-a on a downlink communication link 210-a via a receive antenna array or panel. In cases in which the transmit antenna array is spatially proximate to the receive antenna array, the UE 115-a may experience interference at the receive antenna array from transmissions via the transmit antenna array. In other words, the UE 115-a may experience interference on its receive antennas from its own uplink transmissions (e.g., while simultaneously transmitting in the uplink and receiving in the downlink). Additionally or alternatively, the UE 115-a may experience cross-link interference from the uplink transmissions of a nearby or neighboring UE 115 (e.g., uplink transmissions by UE 115-b over a communication link 205-b may cause interfering signals (such as over a communication link 220-a)). The base station 105-a may experience self-interference for similar reasons. For instance, the base station 105-a may experience self-interference when receiving uplink communications from one or more UEs 115 (e.g., including the UE 115-a or the UE 115-b, or both) while simultaneously communicating on the downlink to the UE 115-a, where the downlink signaling may generate the self-interference on the reception on the uplink at base station 105-a. Additionally, the base station 105-a may experience cross-link interference from the base station 105-b (e.g., over a communication link 220-d).

Additionally, similar conditions may apply to the UE 115-b and the base station 105-b over a communication link 210 based on simultaneously communicating via an uplink communication link 205-b and a downlink communication link 210-b. In some cases, increasing the spatial separation between the transmit antenna array and the receive antenna array may reduce self-interference. However, the achievable spatial separation between the transmit antenna array and the receive antenna array on a device may be limited based on the geometry or configuration of the device.

As described herein, the UE 115-a, the UE 115-b, the base stations 105-a, and the base station 105-b may implement methods that may reduce interference (e.g., self-interference) during full-duplex communications. Although examples are provided in the context of full-duplex communications between the UE 115-a and the base station 105-a over the communication link 205, the techniques described are equally applicable to the UE 115-b and the base station 105-b over the communication link 210. Further, the techniques described herein are not limited to communications between a UE 115 and a base station 105 and may apply to any two communicating devices that may support full-duplex communications.

In some examples, the UE 115-a may identify a full-duplex capability of the UE 115-a. For example, the UE 115-a may identify resources that may be used for full-duplex communications with the base station 105-a, where the UE 115-a may identify resources that include one or more RF spectrum bands. In the examples described herein, the one or more RF spectrum bands may be adjacent or may be separated in the frequency domain. The UE 115-a, based on identifying the full-duplex capability of the UE 115-a, may signal the capability of the UE 115-a to the base station 105-a, which may facilitate more seamless communication and greater throughput between the UE 115-a and the base station 105-a, as the base station 105-a may schedule full-duplex communication between the UE 115-a and the base station 105-a over the one or more RF spectrum bands over which the UE 115-a is capable of performing full-duplex communications.

The UE 115-a may identify resources to use for full-duplex communications based on a variety of reasons. In some cases, the resources may depend on the antenna arrays or panels of the UE 115-a. For example, the UE 115-a may be configured with a number of antenna arrays or panels that may be capable of transmitting or receiving, or both, via one or more different frequencies (e.g., depending on the antenna elements of the antenna array or panel). In such examples, the resources that the UE 115-a identifies for full-duplex communications may be based on the capability (e.g., the physical capability) of the number of antenna arrays or panels of the UE 115-a.

Additionally or alternatively, the resources that the UE 115-a may identify to use for full-duplex communications may be based on reducing interference at the UE 115-a. For example, the UE 115-a may receive transmissions from other devices (e.g., the UE 115-b or the base station 105-b) on a first set of resources. Thus, in such examples, the resources that the UE 115-a identifies for full-duplex communications may be based on a distinction from the first set of resources that may be used to receive transmissions from other devices. For example, the UE 115-a may receive transmissions over the communication link 220-a and the communication link 220-c from the UE 115-b and the base station 105-b, respectively, on the first set of resources and may identify resources for full-duplex communications that may have a threshold separation from the first set of resources (e.g., a separation in the frequency domain). In some examples, the UE 115-a may perform uplink or downlink, or both, transmission hopping to avoid interference from neighboring devices (e.g., to avoid cross-link interference over the communication link 220-a and the communication link 220-c).

Similarly, in the context of the UE 115-b, the UE 115-b may identify resources to use for full-duplex communications with the base station 105-b based on the resources having a threshold difference from a first set of frequencies that may be used for transmissions to other devices. For example, the UE 115-b may use a first set of resources for transmissions over the communication link 220-a and the communication link 220-b to the UE 115-a and the base station 105-*a*, respectively, and may identify resources for full-duplex communications that achieve a threshold difference (e.g., in the frequency domain) from the first set of resources.

In addition to the resources that the UE 115-*a* may identify to use for full-duplex communications, the full-duplex capability of the UE 115-*a* may further include an indication of one or more types of full-duplex communications that may be supported by the UE 115-*a*. For example, the UE 115-*a* may identify that the UE 115-*a* may support in-band full-duplex or sub-band full-duplex (e.g., flexible duplex), or both, over the communication link 205. In some examples, the UE 115-*a* may identify the one or more types of full-duplex communications that may be supported by the UE 115-*a* on a per-frequency band basis. As such, the UE 115-*a* may identify, at each frequency band of the resources identified by the UE 115-*a*, one or more types of full-duplex communications that may be supported by the UE 115-*a*. In one illustrative example, the UE 115-*a* may identify that it supports in-band full-duplex on a first number of frequency bands, sub-band full-duplex on a second number of frequency bands, and both in-band and sub-band full-duplex on a third number of frequency bands. Such identification by the UE 115-*a* of the RF spectrum bands over which the UE 115-*a* is capable of performing full-duplex communication and the type of full-duplex communication that the UE 115-*a* is capable of supporting on a per-RF spectrum band granularity may support more robust and seamless coverage while maintaining the greater throughput associated with full-duplex communications.

In some examples, the UE 115-*a* may signal its full-duplex capability in a message (e.g., in a full-duplex capability indication message 215) to the base station 105-*a* via the uplink communication link 205-*a*. In some cases, the UE 115-*a* may transmit the full-duplex capability indication message 215 via RRC messaging or RRC signaling. In some examples, the transmission of the full-duplex capability indication message 215 via RRC messaging or RRC signaling may use some signaling providing one or more other capabilities of the UE 115-*a*, thereby reducing signaling overhead in the system when indicating the full-duplex capabilities of the UE 115-*a* (e.g., by preventing additional or separate signaling for indicating the full-duplex capabilities). The base station 105-*a* may receive the full-duplex capability indication message 215 and may identify the one or more types of full-duplex communications for each frequency band of the resources over which the UE 115-*a* may support full-duplex communications. In some examples, the base station 105-*a* may identify its full-duplex capability for supporting the full-duplex capability of the UE 115-*a* (e.g., for supporting the types of full-duplex communications for each of the frequency bands supported by the UE 115-*a*).

The base station 105-*a* may likewise identify its full-duplex capability on a per frequency band basis or on a per frequency channel basis. In some examples, the base station 105-*a* may identify its full-duplex capability per frequency channel to enable the base station 105-*a* to enhance full-duplex communication at its end of communication link 205. For example, in a similar way that the UE 115-*a* may identify a full-duplex capability based on reducing self-interference at the UE 115-*a*, the base station 105-*a* may identify a full-duplex capability that may support the full-duplex capability of the UE 115-*a* and may additionally reduce self-interference at the base station 105-*a* (e.g., by enhancing the self-interference cancellation efficiency of the base station 105-*a*).

In some examples, the full-duplex capability of the base station 105-*a* may include a resource allocation or a resource configuration for the UE 115-*a* to use that may support (e.g., align with) the full-duplex capability of the UE 115-*a*. For example, the base station 105-*a* may identify that the UE 115-*a* may support a first type of full-duplex communication (e.g., in-band full-duplex or sub-band full-duplex) for each of a number of frequency bands within a first set resources identified by the UE 115-*a*. Accordingly, the base station 105-*a* may, according to its full-duplex capability, identify a resource configuration to be used by the UE 115-*a* and the base station 105-*a* for full-duplex communications. In this example, the base station 105-*a* may configure—according to the first type of full-duplex communication supported by the UE 115-*a*—the first set of resources such that at least one frequency band of the first set of resources may be used for uplink transmissions and at least one other frequency band of the first set of resources may be used for downlink transmissions. As such, the base station 105-*a* may allocate resources for full-duplex communications that the UE 115-*a* may be capable of using for full-duplex communications.

Additionally, in some examples, to enhance the full-duplex communications between the UE 115-*a* and the base station 105-*a* (e.g., to reduce self-interference or improve the reliability of transmissions), the base station 105-*a* may identify one or more configurations (e.g., transmission configurations) that may be employed by the UE 115-*a* and the base station 105-*a*. For example, the one or more configurations may include a guard band configuration, a transmission hopping configuration, or an antenna switching configuration.

The base station 105-*a* may transmit its full-duplex capability to the UE 115-*a* over the downlink communication link 210-*a* via another full-duplex capability indication message 215. In some examples, the base station 105-*a* may include the one or more configurations in its full-duplex capability indication. The UE 115-*a* may receive the full-duplex capability indication message 215 from the base station 105-*a* and the UE 115-*a* may modify its transmission parameters based on the full-duplex capability of the base station 105-*a* and the one or more configurations identified by the base station 105-*a*.

In some examples, the UE 115-*a* may modify its transmission parameters based on the full-duplex capability of the base station 105-*a* such that transmissions over the uplink communication link 205-*a* may be received by the base station 105-*a* in a way that enhances the self-interference cancellation efficiency of the base station 105-*a*. For example, the UE 115-*a* may receive the full-duplex capability indication message 215 from the base station 105-*a* and may modify a transmission power, a number of repetitions, an aggregation level (AL), or a combination thereof, based on the full-duplex capability of the base station 105-*a*.

Additionally or alternatively, the UE 115-*a* may modify a number of other transmission parameters based on the one or more configurations identified by the base station 105-*a*. In some examples, the modification of one or more communication parameters (e.g., based on full-duplex capabilities) may enable enhanced throughput and reliability for communications by the UE 115-*a*. In some examples, based on the configurations identified by the base station 105-*a*, the UE 115-*a* may modify a set of uplink resources or a set of downlink resources, or both, based on a guard band configuration or a transmission hopping pattern, or modify a number of antenna arrays or panels based on an antenna panel switching configuration.

Figure 3:
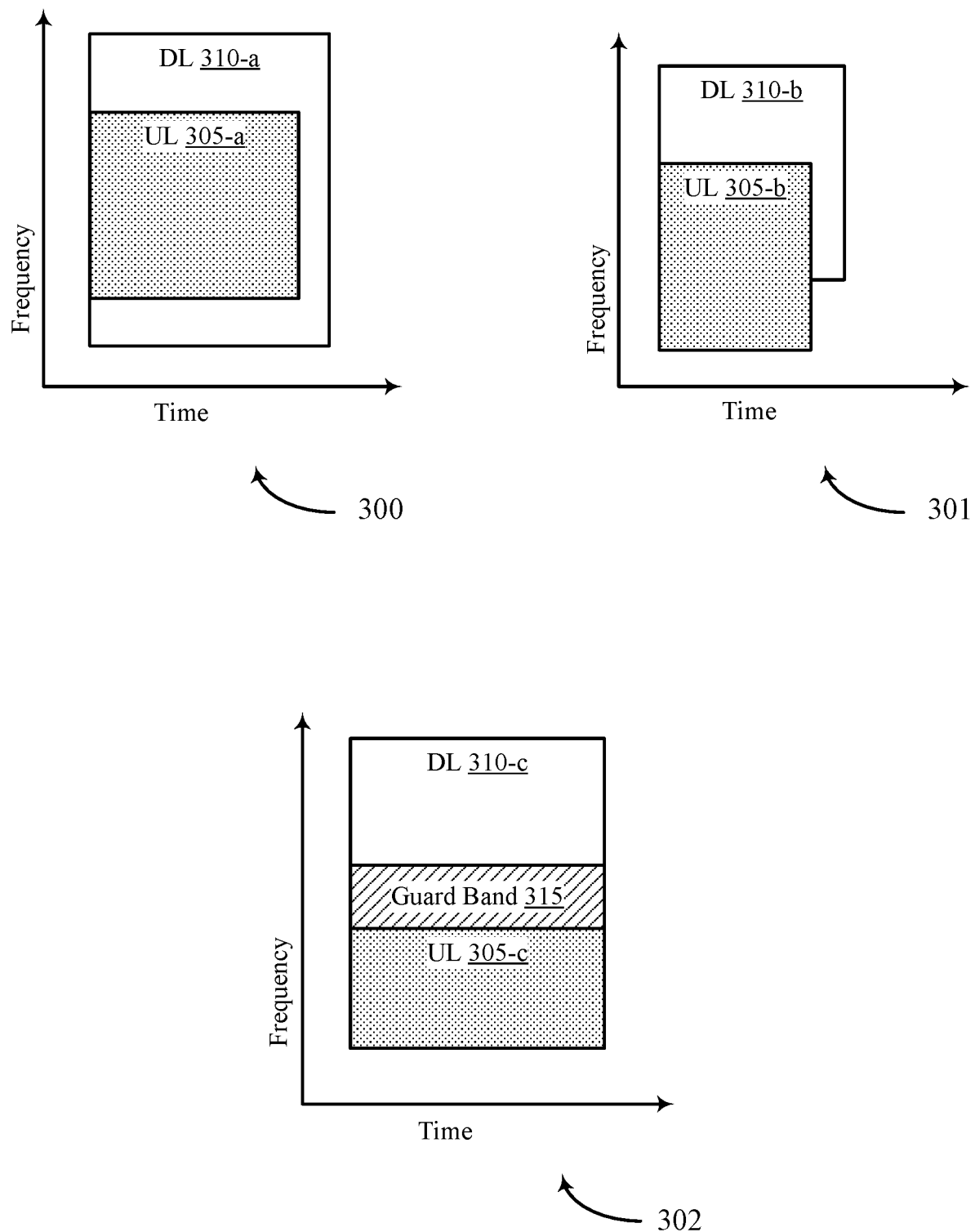
FIG. 3 illustrates example resource configurations that support configurations for full-duplex communication systems in accordance with aspects of the present disclosure.

FIG. 3 illustrates example resource configurations 300, 301, and 302 that support configurations for full-duplex communication systems in accordance with aspects of the present disclosure. In some examples, the resource configurations 300, 301, and 302 may be implemented to realize aspects of the wireless communications system 100 and the wireless communications system 200. For example, the resource configurations 300, 301, and 302 may be examples of the resource configurations configured by a base station 105 (e.g., the base station 105-*a* described with reference to FIG. 2) according to the full-duplex capability of a UE 115 (e.g., the UE 115-*a*, as described with reference to FIG. 2). In such examples, the resource configurations 300, 301, and 302 may each be an example of the resource configuration that the UE 115 and the base station 105 may use to support full-duplex communications, which may reduce or mitigate self-interference by one or more devices.

As described herein, the UE 115 and the base station 105 may support full-duplex communications using one or more types of full-duplex communications. For example, the UE 115 may identify one or more types of full-duplex communications for each frequency band within resources identified by the UE (e.g., resources over which the UE may support full-duplex communications). For instance, the UE 115 may identify resources for full-duplex communications with the base station 105. One or more frequency bands may be included within the resources identified by the UE 115, and each frequency band may be associated with a type of full-duplex communication that may be supported by the UE 115. In some examples, the full-duplex capability of the UE 115 includes this information and the UE 115 may transmit the full-duplex capability to the base station 105. The base station 105 may identify the full-duplex capability of the UE 115 and configure a resource configuration, such as the resource configuration 300, 301, or 302, based on the full-duplex capability of the UE 115. The UE 115 and the base station 105 may simultaneously transmit and receive uplink resources 305 and downlink resources 310, respectively, based on the resource configuration.

In some examples, the base station 105 may configure resource configuration 300 based on the full-duplex capability of the UE 115. In such examples, the UE 115 may support in-band full-duplex for the one or more frequency bands including uplink resources 305-*a* and downlink resources 310-*a*. Resource configuration 300 may illustrate that the UE 115 and the base station 105 communicate using fully overlapping resources for uplink resources 305-*a* and downlink resources 310-*a* (e.g., overlapping time and frequency resources are provided for both uplink resources 305-*a* and downlink resources 310-*a*).

Similarly, in another example where the UE 115 may support in-band full-duplex, the base station 105 may configure resource configuration 301 for simultaneous uplink resources 305-*b* and downlink resources 310-*b* transmissions. Resource configuration 301 may be an example in which the resources provided for uplink resources 305-*b* and downlink resources 310-*b* may at least partially overlap. In such examples, uplink resources 305-*b* and downlink resources 310-*b* may share a first portion of their frequency allocation and may exclusively use a second portion of their frequency allocations for uplink and downlink communications. In some aspects, the amount of overlap between the resources for uplink resources 305-*b* and the resources for downlink resources 310-*b* may be based on the full-duplex capability of the UE 115.

Alternatively, in some examples, the UE 115 may support sub-band full-duplex for each of a number of frequency bands included in the resources identified for full-duplex communications by the UE 115. In such examples, the base station 105 may configure a resource configuration 302. Resource configuration 302 may illustrate an example where uplink resources 305-*c* and downlink resources 310-*c* may be transmitted at the same time but may use different frequency resources. In some examples, the base station 105 may separate the frequency resources provided for each of uplink resources 305-*c* and downlink resources 310-*c* by a guard band 315 (e.g., uplink resources 305-*c* and downlink resources 310-*c* may be associated with different BWPs). In some examples, by identifying a frequency resource (e.g., one or more frequency bands) that supports sub-band full-duplex, the UE 115 may reduce self-interference by transmitting and receiving using two different frequencies.

The guard band 315 may be a frequency range that separates the frequencies used for uplink resources 305-*c* and downlink resources 310-*c* and may be included in the resource configuration 302 by the base station 105 based on identifying that the UE 115 supports sub-band full-duplex. The base station 105 may define (e.g., configure) the guard band 315 (e.g., may determine a guard band configuration) based on a number of different features, parameters, or configurations of the full-duplex communications. For example, the base station 105 may configure the guard band 315 based on the full-duplex capability of the UE 115, a frequency range over which the base station 105 and the UE 115 may communicate, a beam configuration (e.g., for transmitting or receiving directional communication) of the base station 105 or the UE 115, an antenna panel configuration of the base station 105 or the UE 115, or any combination thereof. Additionally or alternatively, the base station 105 may configure the guard band 315 based on a downlink numerology of downlink resources (e.g., downlink resources 310) and an uplink numerology of uplink resources (e.g., uplink resources 305) over which the base station 105 and the UE 115 may communicate.

In some examples, the base station 105 may configure the guard band 315 based on a subcarrier spacing value (e.g., a predetermined subcarrier spacing value), a frequency allocation of the guard band (e.g., over which frequency resources or how much frequency the guard band may span), or based on a frequency range for one or more RF spectrum bands over which the base station 105 and the UE 115 may communicate. In some cases, the guard band configuration may indicate a number of RBs (e.g., physical resource blocks (PRBs)) or a number of REs, or both, for the guard band. That is, the guard band 315 may be defined in terms of PRBs or REs, or both, via the guard band configuration.

In some examples, the base station 105 may configure the guard band 315 based on identifying an indication included in the full-duplex capability of the UE 115 that indicates that the UE 115 supports a set of guard band configurations. For example, the UE 115 may indicate the set of supported guard band configurations in the full-duplex capability of the UE 115 that is transmitted to the base station 105. As such, the base station 105 may identify one guard band configuration of the set of guard band configurations supported by the UE 115.

In some examples, the set of guard band configurations supported by the UE 115 may be based on the frequency range of the resources (e.g., including the one or more frequency bands) identified by the UE 115. For example, each frequency range may be associated with a set of guard band configurations that the base station 105 may use to configure the guard band 315. The base station 105 may identify the resources (i.e., the resources identified by the UE 115 in the full-duplex capability of the UE 115) and identify the frequency range of the resources. In some examples, the base station 105 may select a guard band configuration of the set of guard band configurations associated with the identified frequency range. In some cases, the base station 105 may select the guard band configuration based on comparing the set of guard band configurations associated with the identified frequency range to the set of guard bands supported by the UE 115 (e.g., in the case that the UE 115 supports a subset of the set of guard band configurations associated with the identified frequency range). The base station 105 may configure the guard band 315 based on the selected guard band configuration.

The guard band configuration may be based on the antenna array configuration of the UE 115 or the antenna array or panel configuration of the base station 105, or both. Similarly, the guard band configuration may be based on the beam configuration of the UE 115 or the beam configuration of the base station 105, or both. In some examples, the UE 115 or the base station 105 may operate an antenna array or panel associated with generating a beamformed transmission (e.g., with a narrow beam width), and the transmission may be more focused towards a receive antenna array or panel of the other device and may cause less self-interference at the transmitting device. Thus, in such examples, a smaller guard band 315 may be configured to reduce self-interference when an antenna array or panel and beam configuration generate a narrow beam width (e.g., as compared to cases in which an antenna array or panel and beam configuration that may generate a wider beam width). In some other examples, the base station 105 may configure the guard band 315 based on the peak transmit power of the transmissions between the UE 115 and the base station 105.

The base station 105 may configure the guard band 315 with a subcarrier spacing. For example, when configuring the guard band 315, the base station 105 may identify the numerology of the BWP of the uplink resources 305-$c$ and the BWP of the downlink resources 310-$c$. In some examples, the base station 105 may determine the subcarrier spacing of the guard band 315 based on the numerology of the uplink resources 305-$c$, the downlink resources 310-$c$, or a combination of the two numerologies. In such examples, a numerology may refer to the configuration of waveform parameters such as subcarrier spacing, symbol time, cyclic prefix length, or the like. The subcarrier spacing of the guard band 315 may be determined based on which BWP (e.g., which of the BWP of uplink resources 305-$c$ and the BWP of downlink resources 310-$c$) has the higher or the lower numerology. The base station 105 may select the higher or lower numerology and configure the subcarrier spacing of the guard band based on the selected numerology. Alternatively, the base station 105 may configure the guard band with a predetermined subcarrier spacing (e.g., 15 kilohertz (kHz), 60 kHz, etc.).

In other examples, the base station 105 may configure the guard band 315 based on the relative positions of the uplink resources 305-$c$ and the downlink resources 310-$c$, a reference point or an offset from a reference point (e.g., a reference point in the frequency domain), or the guard band 315 may be implicitly known based on the frequency gap between the uplink resources 305-$c$ and the downlink resources 310-$c$ (e.g., between the BWP of uplink resources 305-$c$ and the BWP of downlink resources 310-$c$). In some examples, the guard band 315 may be used in full-duplex communications or in half-duplex communications, and the guard band configuration may depend on if the UE 115 and the base station 105 are both communicating with full-duplex communications or if just one of the UE 115 and the base station 105-$c$ are communicating with full-duplex communications.

The guard band configuration may be based on the device or devices that are capable of full-duplex communications. For instance, in examples in which the base station 105 supports full-duplex communications, but various UEs 115 do not support full-duplex communications, the base station 105 may still communicate with multiple UEs 115 in the uplink while simultaneously transmitting in the downlink. As such, the guard band configuration (as well as the various configurations described herein) may be relevant to the base station 105 and its ability to communicate using full-duplex. Likewise, in examples in which a UE 115 is full-duplex capable but a base station 105 is not, the guard band configuration (and other configurations described herein) may be relevant to the full-duplex-capable UE 115.

Figure 4:
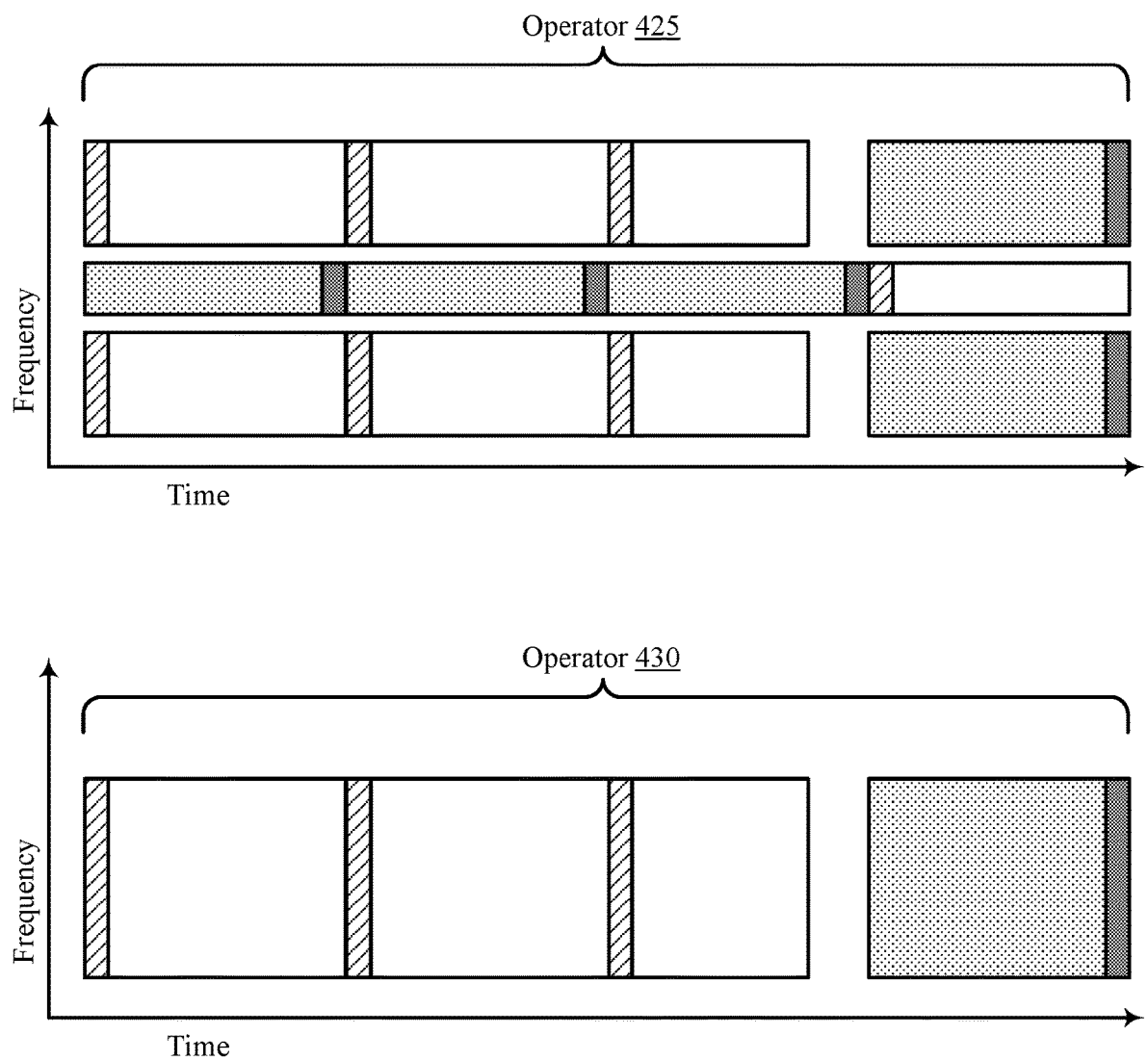
FIG. 4 illustrates an example of a resource allocation that supports configurations for full-duplex communication systems in accordance with aspects of the present disclosure.

FIG. 4 illustrates an example of a resource allocation 400 that supports configurations for full-duplex communication systems in accordance with aspects of the present disclosure. In some examples, the resource allocation 400 may be implemented to realize aspects of the wireless communications system 100 and the wireless communications system 200. The resource allocation 400 may be used to ensure fairness for, and reduce interference between, communications by two or more different operators at a base station 105 (e.g., that use similar or adjacent frequency resources in a system).

In some examples, a base station 105 may configure the resource allocation 400 for use in a system that supports full-duplex communications, where a base station 105 or a UE 115 (such as the UE 115-$a$ and base station 105-$a$ described with reference to FIG. 2) may communicate in accordance with the resource allocation 400. Resource allocation 400 may include an example of a transmission schedule for an operator 425 and a transmission schedule for an operator 430 (e.g., a different operator). In some cases, the operator 425 and the operator 430 may be scheduled for both uplink data 405 and downlink data 410, which may be supported by uplink control information 415 and DCI 420, respectively. In some examples, the operator 425 may be an example of an operator implementing some of the techniques for configuring full-duplex communications systems of the present disclosure and the operator 430 may be an operator implementing non-full-duplex communications schemes (e.g., a legacy operator).

In some examples, the operator 425 and the operator 430 may communicate synchronously (e.g., the scheduled transmissions for the operator 425 and the operator 430 may occur at the same time). Additionally, in some cases, the antennas or antenna arrays or panels associated with each of the operator 425 and the operator 430 may be spatially proximate, such that a transmission from a transmit antenna array or panel of operator 430 may cause interference at a receive antenna array or panel of the operator 425. Accordingly, to reduce the amount of interference the operator 430 may cause at the operator 425, and vice versa, a base station 105 may configure resource configurations used by the operator 425 for full-duplex communication (e.g., such as the resource configurations 300, 301, and 302 as described with reference to FIG. 3) to separate the resources provided for uplink data 405 and downlink data 410.

In some examples, the base station 105 may identify that the operator 430 may be transmitting downlink data 410 in a first time period. The base station 105, which may be receiving uplink data 405 for operator 425 and transmitting downlink data 410 in a full-duplex communication mode, may determine to configure its resource configurations to place a set of resources provided for uplink data 405 away from a set of resources provided for downlink data 410.

In some cases, the base station 105 may configure a frequency pattern for separating the resources for uplink data 405 associated with the operator 425 and the resources for downlink data 410 associated with the operator 430. For example, the base station may transmit downlink data 410 for operator 430 at each adjacent component carrier and the base station may determine to place the set of resources for uplink data 405 for operator 425 in a mid-band (e.g., between two frequency bands for downlink data 410). In some aspects, the frequency pattern may be referred to as a frequency allocation pattern, and the base station 105 may allocate resources for uplink data 405 and downlink data 410 across both the operator 425 and the operator 430 to separate uplink data 405 and downlink data 410 over the one or more frequency bands used for full-duplex communications at the base station 105.

Additionally or alternatively, the base station 105 may determine to increase the guard band between the uplink data 405 and the downlink data 410 to reduce the effect of interference between the operator 425 and the operator 430. For example, the base station 105 may identify a set of resources for uplink data 405 associated with the operator 425 and a set of resources for downlink data 410 associated with the operator 430, and the base station 105 may adjust a guard band between the two sets of resources based on supporting full-duplex communications. In such cases, the guard band may be configured via a guard band configuration, such as described with reference to FIG. 3. In some examples, the base station 105 may configure or adjust the guard band to separate the two sets of resources over the one or more frequency bands used for full-duplex communications at the base station 105.

At some point, the base station 105 may switch from transmitting downlink data 410 for the operator 430 to receiving uplink data 405. At that point, the base station 105 may determine to modify the resource configurations for uplink data 405 and downlink data 410 (e.g., modify the frequency pattern) for the operator 425. For example, the base station 105 may reconfigure the resources that were previously configured for downlink data 410 to be configured for uplink data 405. Accordingly, downlink data 410 may be reconfigured with the resource configuration that was previously configured for uplink data 405. In this manner of inter-operator coordination, inter-operator interference between the operator 425 and the operator 430 may be reduced.

Figure 5:
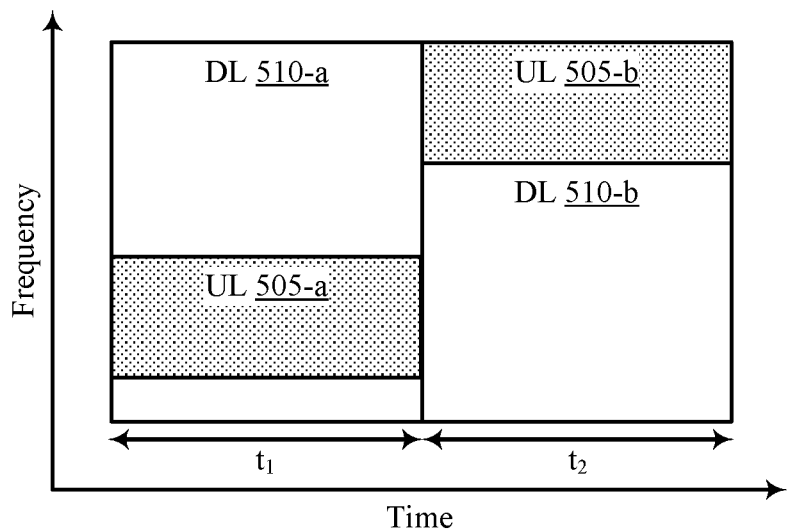
FIG. 5 illustrates example transmission hopping resource allocations that support configurations for full-duplex communication systems in accordance with aspects of the present disclosure.
Figure 5:
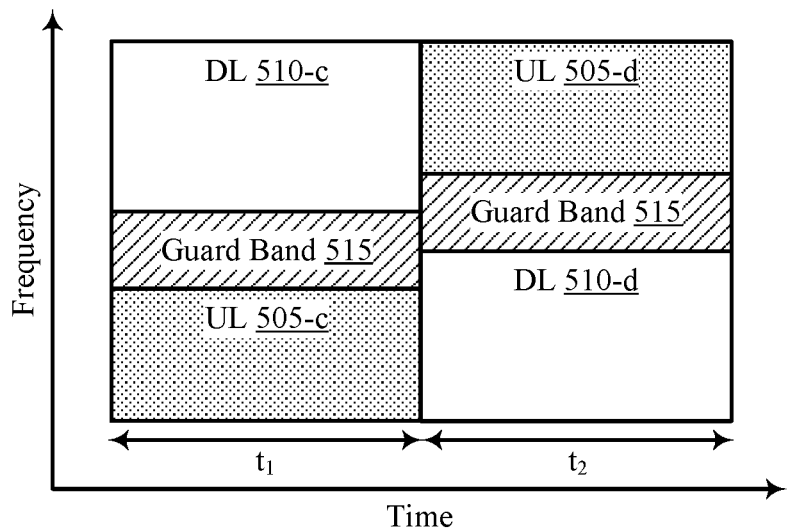

FIG. 5 illustrates example transmission hopping resource allocations 500 and 501 that support configurations for full-duplex communication systems in accordance with aspects of the present disclosure. In some examples, the resource allocations 500 and 501 may be implemented to realize aspects of wireless communications system 100 and the wireless communications system 200. The resource allocations 500 and 501 may be used by a UE 115 and a base station 105 to provide for transmission diversity for full-duplex communications, which may mitigate interference (self-interference in addition to other types of interference, such as cross link interference, and noise) and provide other advantages.

For example, in some cases, the UE 115 may implement resource allocations 500 and 501 to avoid interference from neighboring devices. In some examples, the UE 115 may experience cross link interference over communication links with neighboring devices (e.g., as described with reference to UE 115-a and communication links 220-a and 220-c in FIG. 2). In such examples, the UE 115 may employ a transmission hopping pattern to achieve a threshold separation from the resources (e.g., the frequency resources) used for transmissions by the neighboring devices.

In some examples, the UE 115 may identify a transmission hopping configuration (e.g., a configuration for frequency spectrum switching or for a transmission hopping pattern). In some cases, the transmission hopping configuration (e.g., the transmission hopping pattern) may be indicated to the UE 115 by the base station 105 via the full-duplex capability indication message of the base station 105, as described with reference to FIG. 2. In some other cases, the base station 105 may transmit the configuration independently of the full-duplex capability indication message. In some examples, the base station 105 may transmit an indication of the transmission hopping configuration to the UE 115 using RRC signaling, a MAC-CE, a DCI message, or a combination thereof. The transmission hopping configuration may indicate frequency allocations (e.g., frequency locations or sub-band size) for uplink resources 505, downlink resources 510, and a guard band 515 over time (e.g., in multiple TTIs), where the frequency allocations for the uplink resources 505, the downlink resources 510, and the guard band 515 may change (e.g., hop) over time. Such a transmission hopping pattern (e.g., the frequency allocations that change over time based on the indication in the transmission hopping configuration) may provide more reliable communication via diversification of resources, as some resources may be more or less influenced by interference than some other resources.

In some examples, the UE 115 may receive the full-duplex capability of the base station 105, identify the transmission hopping pattern, and determine that its resource configuration may change over time according to the transmission hopping pattern. The resource configuration may be based on the one or more types of full-duplex communications that may be supported by the UE 115 for the frequency resource used for the full-duplex communications. For example, the resource allocation 500 may illustrate an example resource allocation where the UE 115 may support in-band full-duplex while the resource allocation 501 may illustrate an example resource allocation where the UE 115 may support sub-band full-duplex. In some cases, transmission hopping may be possible within the initially allocated frequency resources of uplink resources 505 and the downlink resources 510. The present disclosure discusses a method for supporting frequency band switching for in-band full-duplex and sub-band full-duplex.

In some examples, the UE 115 may support in-band full-duplex and may identify an initial resource configuration for uplink resources 505-a and downlink resources 510-a. Based on the UE 115 supporting in-band full-duplex (e.g., based on the capability of the UE 115), the frequency location of uplink resources 505-a may partially or fully overlap with the frequency location of downlink resources 510-a. According to the transmission hopping pattern, the UE 115 may use the initial resource configuration during a first time interval, $t_1$. During a second time period, $t_2$, the UE 115 may adjust the frequency location of uplink resources 505-b. In some examples, according to the transmission hopping pattern, the UE 115 may adjust the size of the uplink resources 505-b (e.g., such that uplink resources 505-a and uplink resources 505-b have differently sized frequency allocations or ranges). For example, the bandwidth of the frequency resource of uplink resources 505-b may be different than the bandwidth of the frequency resource of uplink resources 505-a.

In some other examples, the UE 115 may support subband full-duplex and may identify an initial resource configuration for uplink resources 505-c and downlink resources 510-c. Uplink resources 505-c and downlink resources 510-c may be separated by a guard band 515, which may be an example of a guard band 315 as described with reference to FIG. 3. According to the transmission hopping pattern for the resource allocation 501, the UE 115 may identify a frequency location of the sub-band of uplink resources 505-c, the sub-band of downlink resources 510-c, and guard band 515 during a first time period, $t_1$. During a second time period, $t_2$, the UE 115 may adjust the frequency locations of the sub-band of uplink resources 505-d, the sub-band of downlink resources 510-d, and the guard band 515, or a combination thereof, based on the transmission hopping pattern. In some examples, according to the transmission hopping pattern, the UE 115 may adjust the size of the uplink resources 505-d (e.g., such that uplink resources 505-c and uplink resources 505-d have differently sized frequency allocations or ranges). For example, the bandwidth of the frequency resource of uplink resources 505-c may be different than the bandwidth of the frequency resource of uplink resources 505-d. Similarly, the UE 115 may adjust the size of the downlink resources 510-d such that the frequency range of downlink resources 510-d may be different than the frequency range of downlink resources 510-c. In some examples, only the frequency location of uplink resources 505 may be hopped (e.g., to support the use of DCI). In some examples, the first and second time periods may be defined by a symbol, multiple symbols, a mini slot (which may include fewer symbols than a slot, such as 2, 4, or 7 symbols), a slot, or a subframe.

Figure 6:
FIG. 6 illustrates examples of antenna panel schedules that support configurations for full-duplex communication systems in accordance with aspects of the present disclosure.
Figure 6:
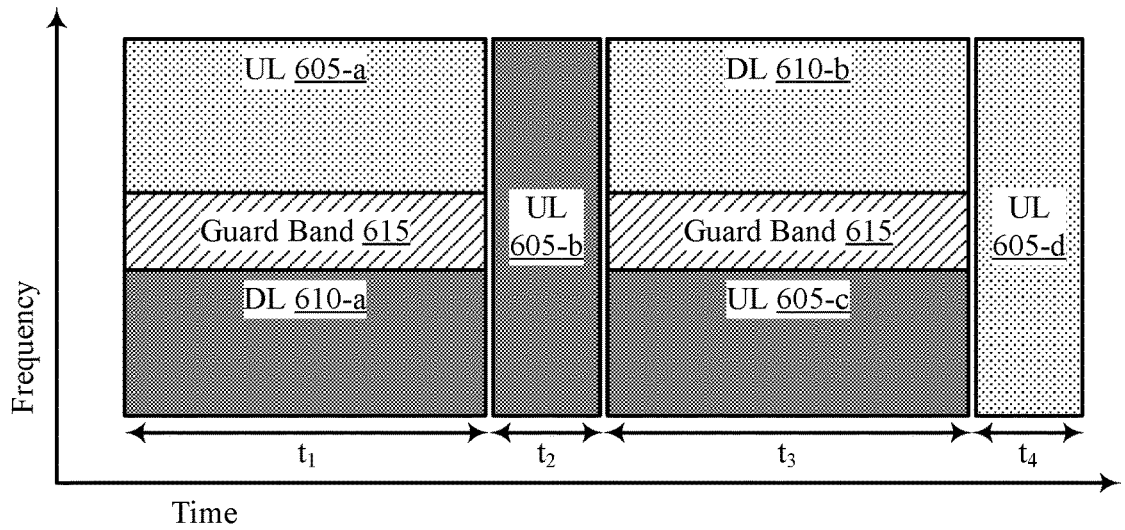
Figure 6:
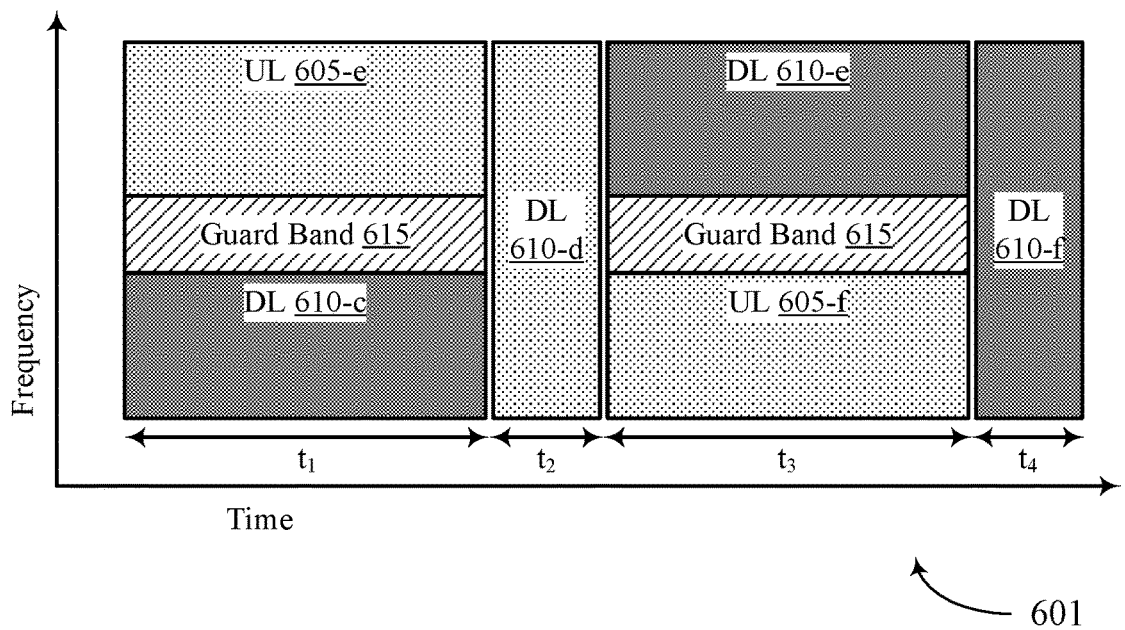

FIG. 6 illustrates examples of antenna panel schedules 600 and 601 that support configurations for full-duplex communication systems in accordance with aspects of the present disclosure. In some examples, the antenna panel schedules 600 and 601 may be implemented to realize aspects of the wireless communications system 100 and the wireless communications system 200. The antenna panel schedules 600 and 601 may be used by a UE 115 or a base station 105 to provide for transmission diversity for full-duplex communications, which may mitigate interference (self-interference in addition to other types of interference and noise) and provide other advantages.

In some examples, the UE 115 or the base station 105 may identify an antenna switching configuration for full-duplex communications using the frequency resource identified by the UE 115. For example, the UE 115 may identify a frequency resource including one or more frequency bands to use for full-duplex communications and the base station 105 may configure resources for full-duplex communication based on the frequency resource identified by the UE 115. In some examples, the base station 105 may configure the resource configurations with an antenna switching configuration and may transmit an indication of the antenna switching configuration to the UE 115.

In some examples, the UE 115 or the base station 105 may identify an antenna switching configuration based on selecting an antenna switching pattern from a set of antenna switching patterns (e.g., a set of predefined antenna switching patterns). For example, the UE 115 may support a set of antenna switching patterns, and the base station 105 may transmit an indication of which antenna switching pattern of the set of antenna switching patterns that may be used for full-duplex communications (e.g., configured via the antenna switching configuration). An antenna switching pattern may refer to a schedule of uplink or downlink communication over a set of resources per antenna panel over time (e.g., in multiple TTIs). In some examples, the antenna switching pattern may indicate that an antenna panel is scheduled for uplink communication in a first time interval and downlink communication in a second time interval or scheduled for communication over a first set of resources in a first time interval and over a second set of resources in a second time interval, or a combination thereof. Additionally, in some cases, the base station 105 may transmit an indication of one or more spatial filters or a transmission configuration indicator (TCI) (e.g., a TCI state, which may be provided via DCI and include one or more configurations of sets of reference signals and/or antenna ports) for uplink transmissions to the UE 115. In some examples, the base station 105 may transmit an indication of one common spatial filter for all of a number of antenna panels that may be used by the UE 115. In other examples, the base station 105 may transmit a spatial filter for each of the number of antenna panels that may be used by the UE 115.

In some examples, the UE 115 or the base station 105 may identify an antenna panel 620 and an antenna panel 625 that may be used for transmitting or receiving, or both, according to the full-duplex communications between the UE 115 and the base station 105 based on the selected antenna switching pattern (e.g., the antenna panel schedule 600 and the antenna panel schedule 601 may illustrate antenna panel schedules based on different antenna switching patterns). During a first time interval $t_1$ of the antenna panel schedule 600, uplink resources 605-a may use the antenna panel 620 while downlink resources 610-a may use the antenna panel 625. As such, from the perspective of the UE 115, the UE 115 may transmit using the antenna panel 620 over a first RF spectrum band (e.g., antenna panel 620 may be operated as a transmit antenna panel during the first time interval) and the UE 115 may receive over a second RF spectrum band using the antenna panel 625 (e.g., antenna panel 625 may be operated as a receive antenna panel during the first time interval).

During a second time interval $t_2$, uplink resources 605-b may use the antenna panel 625 and antenna panel 620 may be unused, or vice versa (e.g., the UE 115 or the base station 105 may operate using half-duplex communications during the second time interval). In some cases, an unused antenna panel may be used in combination with another antenna panel for either uplink resources 605 or downlink resources 610 depending on if either or both of uplink resources 605 and downlink resources 610 have an active BWP during the time interval. For example, during the second time interval, uplink resources 605-b may use both the antenna panel 620 and the antenna panel 625 in combination. From the perspective of the UE 115, the UE 115 may use one or both of the antenna panel 620 or the antenna panel 625 to transmit over a combination of the first RF spectrum band and the second RF spectrum band.

During a third time interval $t_3$, downlink resources 610-b may use the antenna panel 620 and uplink resources 605-c may use the antenna panel 625. As such, the antenna panel used for downlink resources 610-b (e.g., antenna panel 620) may have switched from the antenna panel used for downlink resources 610-a (e.g., antenna panel 625). In some cases, the antenna panel used for uplink resources 605 or downlink resources 610 may be based on the frequency location of uplink resources 605 or downlink resources 610. For example, if either of uplink resources 605 or downlink resources 610 switch from one frequency location to another (e.g., from the first RF spectrum band to the second RF spectrum band, or vice versa), the antenna panel used for either of uplink resources 605 or downlink resources 610 may switch accordingly. For instance, a first antenna panel (e.g., including a first number of antenna elements) of a UE 115 or a base station 105 may be suited for a first frequency range while a second antenna panel (e.g., including a second number of antenna elements) may be suited for a second frequency range that is different than the first frequency range. In such instances, the UE 115 or the base station 105 may enhance full-duplex communications by matching a transmission (uplink resources 605 or downlink resources 610) to an antenna panel that is suited for the frequency location of the transmission, as opposed to designating one antenna panel exclusively for uplink resources 605 and designating another antenna panel for exclusively for downlink resources 610. As shown in the antenna panel schedule 600, from the perspective of the UE 115, the UE 115 may receive over the first RF spectrum band using the antenna panel 620 and may transmit over the second RF spectrum band using the antenna panel 625. In one example implementation, the UE 115 or the base station 105 may switch antenna panels by increasing or decreasing a number of operating antenna elements.

During a fourth time interval $t_4$, the antenna panel 620 may be used for uplink resources 605-$d$ and the antenna panel 625 may be unused. In some cases, both antenna panel 620 and antenna panel 625 may be used for uplink resources 605-$d$. As such, from the perspective of the UE 115, the UE 115 may transmit over a combination of the first RF spectrum and the second RF spectrum band using one or both of the antenna panel 620 or the antenna panel 625.

The antenna panel schedule 601 illustrates another example of how antenna panel switching may be implemented (e.g., another permutation of an antenna panel schedule for uplink resources 605 and downlink resources 610) according to an antenna switching pattern. For example, uplink resources 605-$e$ may use the antenna panel 620 and downlink resources 610-$c$ may use the antenna panel 625 during the first time interval $t_1$. As such, from the perspective of the UE 115, the UE 115 may transmit over a first RF spectrum band using the antenna panel 620 and may receive over a second RF spectrum band using the antenna panel 625. During a second time interval, $t_2$, downlink 610-$d$ may use antenna panel 620. During the second time interval, antenna panel 625 may be unused or may be used in addition to antenna panel 620 for downlink resources 610-$d$. For example, from the perspective of the UE 115, the UE 115 may receive over a combination of the first RF spectrum and the second RF spectrum band using one or both of the antenna panel 620 or the antenna panel 625.

During a third time interval $t_3$, uplink resources 605-$f$ may use antenna panel 620 and downlink resources 610-$e$ may use antenna panel 625. As such, from the perspective of the UE 115, the UE 115 may receive over the first RF spectrum band using the antenna panel 625 and may transmit over the second RF spectrum band using the antenna panel 620. During a fourth time period $t_4$, downlink resources 610-$f$ may use antenna panel 625 and antenna panel 620 may be unused or may be used in addition to antenna panel 625 for downlink resources 610-$f$. For example, from the perspective of the UE 115, the UE 115 may receive over a combination of the first RF spectrum and the second RF spectrum band using one or both of the antenna panel 620 or the antenna panel 625. In some aspects, the UE 115 may implement the antenna panel schedule 601 in examples in which one antenna panel is suited for uplink resources 605 (such as the antenna panel 620) and another is suited for downlink resources 610 (such as the antenna panel 625).

Each of the time intervals ($t_1$, $t_2$, $t_3$, $t_4$, and so forth) may be defined by or may be examples of a symbol, multiple symbols, a mini slot, a slot, or a subframe. Further, antenna panel schedules 600 and 601 may illustrate examples of a transmission hopping pattern, as described with reference to FIG. 5, in combination with antenna panel switching. However, in some examples of the present disclosure, antenna panel switching may be implemented independently of a transmission hopping pattern. For example, uplink resources 605 and downlink resources 610 may not switch frequencies in the time domain, but may still switch antenna panels in some implementations. In some examples, the UE 115 and the base station 105 may switch between antenna panels based on changing resource configurations, identifying one or more TCI states (e.g., a configuration or set of parameters associated with a quasi-colocation relationship between downlink reference signals), or a variety of other reasons. Further, the antenna panel schedules 600 and 601 are described in the context of two example implementations and, as such, the described techniques may be applicable to any communication schedule including antenna panel switching without exceeding the scope of the present disclosure, including schedules for antenna panel switching between more than two antenna panels.

Figure 7:
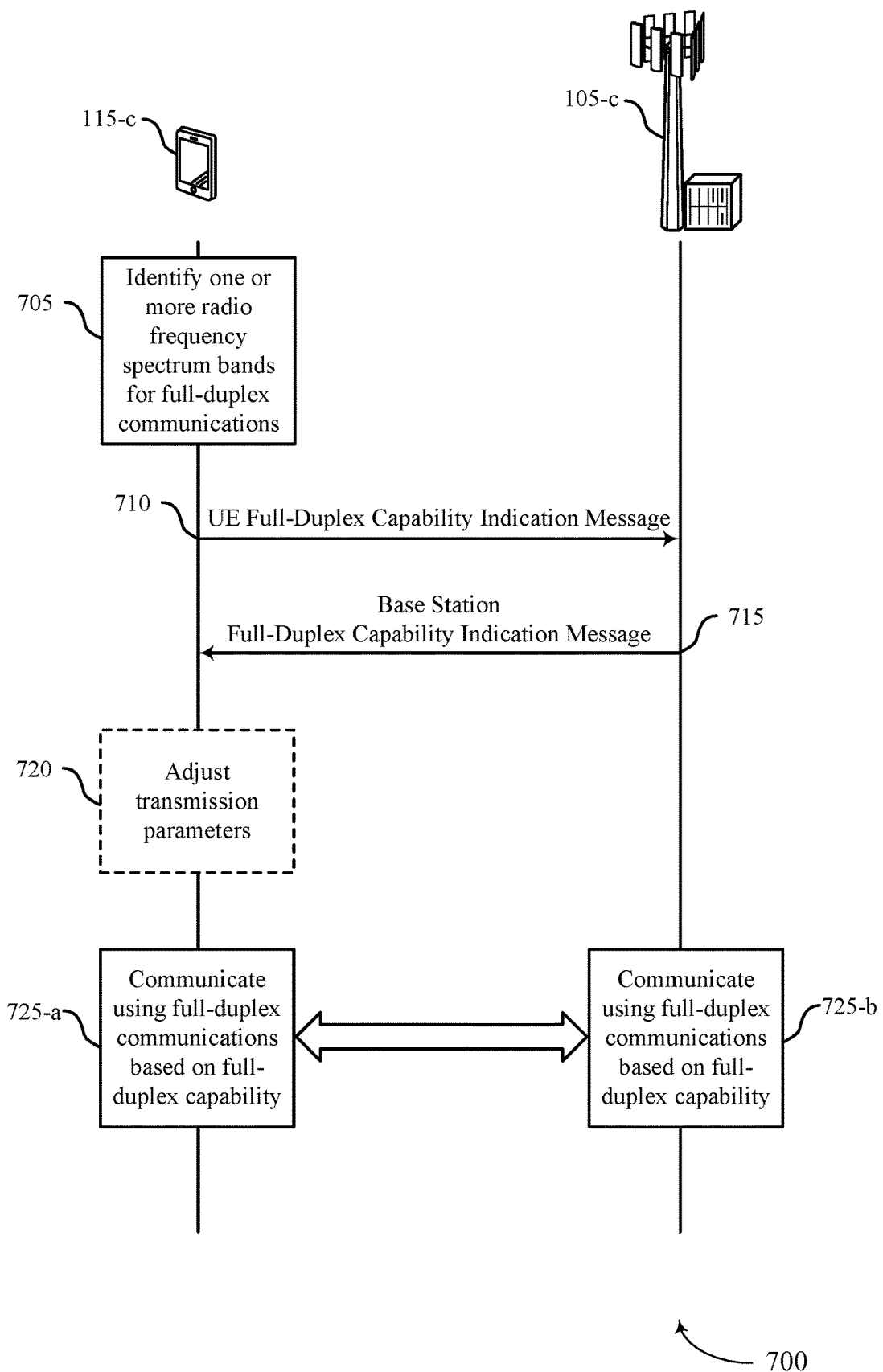
FIGS. 7 and 8 illustrate examples of process flows in a system that supports configurations for full-duplex communication systems in accordance with aspects of the present disclosure.

FIG. 7 illustrates an example of a process flow 700 in a system that supports configurations for full-duplex communication systems in accordance with aspects of the present disclosure. In some examples, the process flow 700 may implement aspects of the wireless communications system 100 and the wireless communications system 200. The process flow 700 may illustrate the signaling of full-duplex capabilities between wireless devices in a system, such as between a UE 115-$c$ and a base station 105-$c$, which may be examples of corresponding devices described herein.

At 705, the UE 115-$c$ may identify one or more RF spectrum bands for full-duplex communications with the base station 105-$c$. In some examples, the UE 115-$c$ may identify resources that includes that one or more RF spectrum bands. The UE 115-$c$ may identify the one or more RF spectrum bands based on the frequency bands the UE 115-$c$ may use for full-duplex communications. For example, the UE 115-$c$ may receive or transmit on a number of frequencies and the UE 115-$c$ may identify the one or more RF spectrum bands based on identifying the one or more RF spectrum bands have a threshold separation (e.g., in the frequency domain) from the number of frequencies (e.g., to reduce interference at the UE 115-$c$). In some examples, the UE 115-$c$ may identify the one or more RF spectrum bands and may identify that the UE 115-$c$ may support one or more types of full-duplex communications (e.g., in-band full-duplex or sub-band full-duplex) for each RF spectrum band.

At 710, the UE 115-$c$ may transmit a UE full-duplex capability indication message to the base station 105-$c$. The UE full-duplex capability indication message may include the one or more RF spectrum bands and an indication of the one or more types of full-duplex communications that the UE 115-$c$ may support for each RF spectrum band. In some examples, the UE 115-$c$ may transmit the UE full-duplex capability indication message via RRC messaging (e.g., within an RRC information element).

At 715, the base station 105-$c$ may transmit a base station full-duplex capability indication message to the UE 115-$c$. The base station full-duplex capability indication message may indicate that the base station 105-$c$ supports the one or more types of full-duplex communications for each RF spectrum band of the one or more RF spectrum bands indicated by the UE 115-c at 710. In some examples, the base station full-duplex capability indication message may include a resource configuration for supporting the one or more types of full-duplex communications for each RF spectrum band. In some examples, the resource configuration may include a type of full-duplex communication that may be used for full-duplex communications, frequency locations for uplink and downlink transmissions, a guard band configuration, a transmission hopping configuration, an antenna or antenna panel switching configuration, or a combination thereof. The base station full-duplex capability indication message sent by the base station 105-c may also include transmission parameters that may be used for full-duplex communications, including a transmission power, a number of repetitions, an AL, or a combination thereof. In some examples, the base station 105-c may transmit the base station full-duplex capability indication message via RRC messaging.

At 720, the UE 115-c may optionally adjust its transmission parameters based on the resource configuration transmitted by the base station 105-c at 715. The transmission parameters may include a transmission power, a number of repetitions, an AL, or a combination thereof.

At 725, the UE 115-c and the base station 105-c may communicate using full-duplex communications based on the identified full-duplex capabilities of the UE 115-c and the base station 105-c. For example, at 725-a, the UE 115-c may, based on the transmission parameters and resource configuration indicated by the base station 105-c, transmit, while simultaneously receiving, one or more messages to the base station 105-c over the one or more RF spectrum bands in accordance with the one or more types of full-duplex communications.

Likewise, at 725-b, the base station 105-c may receive, while simultaneously transmitting, one or more messages from the UE 115-c over the one or more RF spectrum bands in accordance with the one or more types of full-duplex communications. In some examples, the RF spectrum bands and the one or more types of full-duplex communications are those that may be identified by the UE 115-c at 705 and transmitted to the base station at 710.

Figure 8:
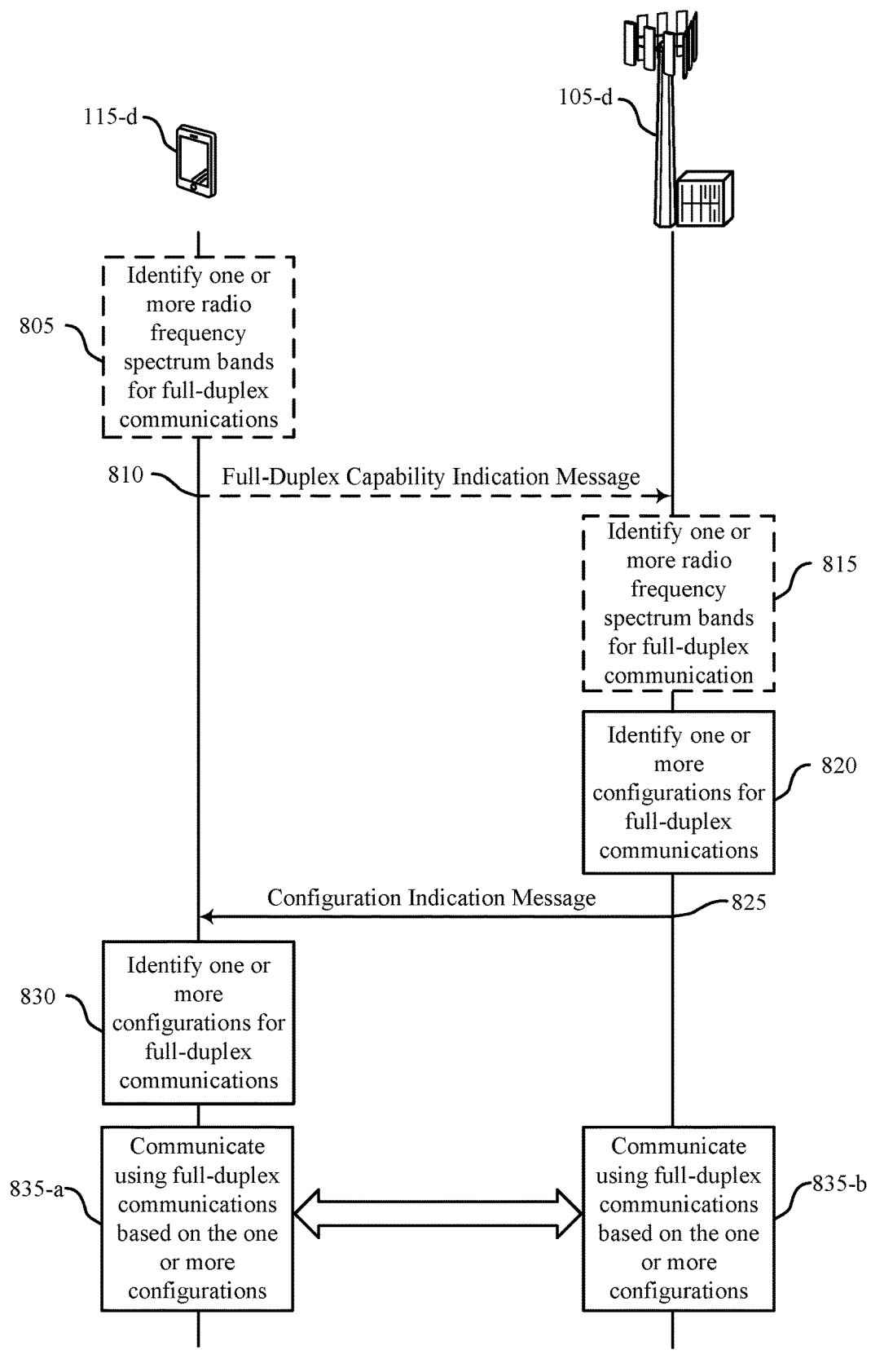

FIG. 8 illustrates an example of a process flow 800 in a system that supports configurations for full-duplex communication in accordance with aspects of the present disclosure. In some examples, the process flow 800 may implement aspects of the wireless communications system 100 and the wireless communications system 200. For example, the process flow 800 may illustrate techniques for establishing and using full-duplex communications between a UE 115-d and a base station 105-d, which may be examples of corresponding devices described herein, according to the implementations of the present disclosure.

At 805, the UE 115-d may optionally identify one or more RF spectrum bands for full-duplex communications. In some examples, the UE 115-d may identify resources that include the one or more RF spectrum bands. The UE 115-d may identify the one or more RF spectrum bands based on the frequency bands the UE 115-d may use for full-duplex communications.

At 810, the UE 115-d may optionally transmit a full-duplex capability indication message to the base station 105-d. The full-duplex capability indication message may include the one or more RF spectrum bands and an indication of the one or more types of full-duplex communications that the UE 115-d may support for each RF spectrum band. In some examples, the UE 115-d may transmit the full-duplex capability indication message via RRC messaging.

At 815, the base station 105-d may optionally identify one or more RF spectrum bands for full-duplex communications. In some examples, the base station 105-d may identify the one or more RF spectrum bands based on the full-duplex capability indication message received at 810. For example, the base station 105-d may identify one or more RF spectrum bands based on the one or more RF spectrum bands that the UE 115-d is capable of using for full-duplex communications.

At 820, the base station 105-d may identify one or more configurations for full-duplex communications. In some examples, the base station 105-d may identify a guard band configuration, a transmission hopping configuration, an antenna switching configuration, or a combination thereof. In some cases, the base station 105 may identify the guard band configuration based on the frequency range of the one or more RF spectrum bands, a beam configuration, an antenna array or panel of the UE 115-d, a subcarrier spacing based on the numerology of an active BWP of either or both of the uplink resources or the downlink resources, or a predetermined subcarrier spacing, or a combination thereof.

At 825, the base station 105-d may transmit a configuration indication message. In some examples, the configuration indication message may indicate the one or more configurations for full-duplex communications identified at 820 to the UE 115-d. For example, the UE 115-d may receive an indication of a guard band configuration, a transmission hopping pattern, an antenna or antenna panel switching pattern, or a combination thereof. In some examples, configured signaling may be used to transmit the configuration indication message. For example, the UE 115-d may receive an indication of a transmission hopping pattern via RRC messaging, a MAC CE, DCI, or a combination thereof.

In some cases, the configuration indication message may be included in the full-duplex capability indication message sent at 715, as described with reference to FIG. 7. In other cases, the configuration indication message may be transmitted separately of the full-duplex capability indication message. In some examples, the configuration indication message may include information that may enable the UE 115-d to identify a configuration from a set of configurations. For example, the UE 115-d may be capable of a set of different configurations (e.g., a set of different antenna switching patterns), and the configuration indication message may indicate the UE 115-d to use one configuration of the set of configurations (e.g., may indicate one antenna switching pattern of the set of antenna switching patterns).

At 830, the UE 115-d may identify one or more configurations for full-duplex communications. The one or more configurations may include a guard band configuration, a transmission hopping configuration, an antenna switching configuration, or a combination thereof. In some examples, the UE 115-d may identify the one or more configurations based on the configuration indication control message received at 825. For example, the UE 115-d may be capable of a set of configurations and may identify the one or more configurations based on the configuration indication message indicating the UE 115 to use the one or more configurations of the set of configurations that the UE 115 is capable of. In some cases, the UE 115-d may adjust its transmission parameters or otherwise configure itself (e.g., configure a schedule for frequency hopping or antenna switching) according to the identified one or more configurations.

At 835, the UE 115-*d* and the base station 105-*d* may communicate using full-duplex communications based on the one or more configurations. For example, at 835-*a*, the UE 115-*d* may transmit, while simultaneously receiving, one or more messages to the base station 105-*d* over the one or more RF spectrum bands based on the one or more configurations. Likewise, at 835-*a*, the base station 105-*d* may transmit, while simultaneously receiving, one or more messages to the UE 115-*d* over the one or more RF spectrum bands based on the one or more configurations. For example, the UE 115-*d* and the base station 105-*d* may communicate with full-duplex communications according to a guard band configuration, a transmission pattern configuration, an antenna switching configuration, or a combination thereof.

Figure 9:
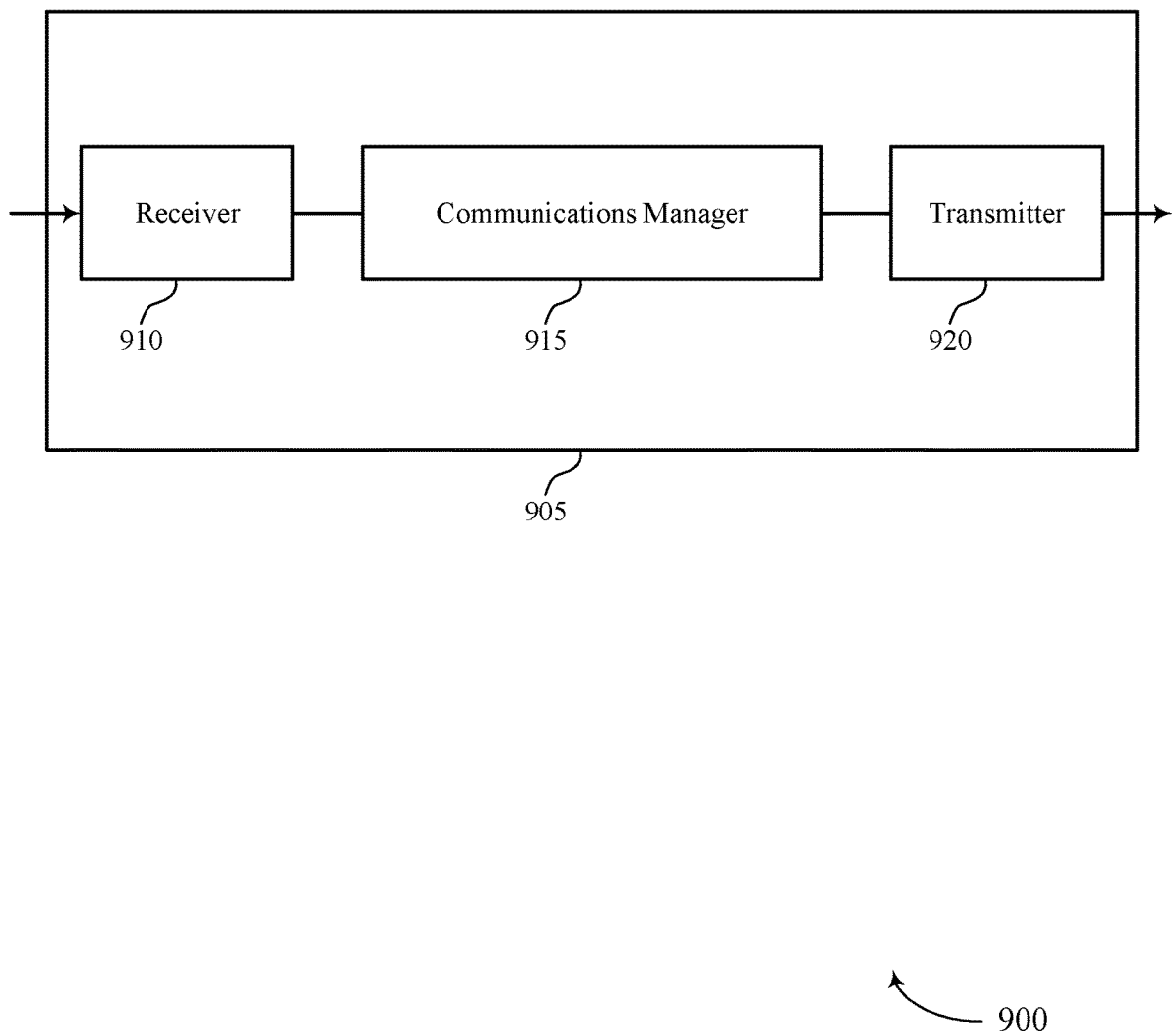
FIGS. 9 and 10 show diagrams of devices that support configurations for full-duplex communication systems in accordance with aspects of the present disclosure.

FIG. 9 shows a diagram 900 of a device 905 that supports configurations for full-duplex communication systems in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to configurations for full-duplex communication systems, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify one or more RF spectrum bands for full-duplex communications with a base station, transmit an indication of a full-duplex capability to the base station, the full-duplex capability indicating that the UE supports one or more types of the full-duplex communications for each RF spectrum band of the one or more RF spectrum bands, and transmit, while simultaneously receiving, one or more messages to the base station using the one or more RF spectrum bands in accordance with the one or more types of full-duplex communications.

The communications manager 915 may also identify, by the UE, support for full-duplex communications using one or more RF spectrum bands, the full-duplex communications being associated with uplink resources that overlap in time with downlink resources and separated from the downlink resources by a guard band, identify a guard band configuration based on the support for the full-duplex communications, and transmit, while simultaneously receiving, one or more messages to a base station using the one or more RF spectrum bands based on the guard band configuration.

For example, the communications manager 915 may identify support for full-duplex communications using one or more RF spectrum bands, the full-duplex communications being associated with uplink resources that overlap in time with downlink resources and separated from the downlink resources by a guard band, identify a guard band configuration for separating first control signaling and first data signaling over the uplink resources from second control signaling and second data signaling over the downlink resources based on the support for the full-duplex communications, where the guard band configuration indicates a variable guard band configuration based on one or more communication parameters, one or more configurations, or a combination thereof, and transmit, while simultaneously receiving, one or more messages to a base station using the one or more RF spectrum bands based on the guard band configuration.

The communications manager 915 may also identify a transmission hopping configuration for full-duplex communications using one or more RF spectrum bands and transmit, while simultaneously receiving, one or more messages using the one or more RF spectrum bands based on the transmission hopping configuration.

The communications manager 915 may also identify an antenna switching configuration for full-duplex communications using one or more RF spectrum bands and transmit, while simultaneously receiving, one or more messages using the one or more RF spectrum bands based on the antenna switching configuration. The communications manager 915 may be an example of aspects of the communications manager 1210 described herein.

For example, the communications manager 915 may identify an antenna switching configuration for full-duplex communications using one or more RF spectrum bands, the antenna switching configuration associated with switching between at least a first antenna panel and a second antenna panel, identify, based on the antenna switching configuration, a first RF spectrum band and a second RF spectrum band of the one or more RF spectrum bands, transmit a first message over the first RF spectrum band using the first antenna panel during a first TTI based on the antenna switching configuration, and receive a second message over the second RF spectrum band using the second antenna panel during the first TTI based on the antenna switching configuration.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

In some examples, the communications manager 915 may be implemented as an integrated circuit or chipset for a mobile device modem, and the receiver 910 and the transmitter 920 may be implemented as analog components (for example, amplifiers, filters, antennas) coupled to the mobile device modem to enable wireless transmission and reception over one or more bands.

The communications manager 915 may be implemented to realize one or more potential advantages. In some implementations, the communications manager 915 may determine resource configurations for full-duplex communications that sufficiently separate resources used for uplink transmissions from resources used for downlink transmissions or otherwise provide techniques for minimizing the interference experienced at the antennas of the receiver 910 and the antennas of the transmitter 920. As such, the communications manager 915 may reduce the self-interference experienced while simultaneously transmitting and receiving, which may provide for greater likelihoods for successful communication as well as increased throughput, improved spectral efficiency, and greater system capacity. As a result of such potential greater likelihood for successful communication and increased throughput, the communications manager 915 may transmit or receive more data within a given TTI and may also avoid a number of retransmissions, which may enable the communications manager 915, or one or more processing components of the communications manager 915, to enter into a sleep mode more frequently or for longer durations, which may result in improved power savings and longer battery life at the device 905.

Figure 10:
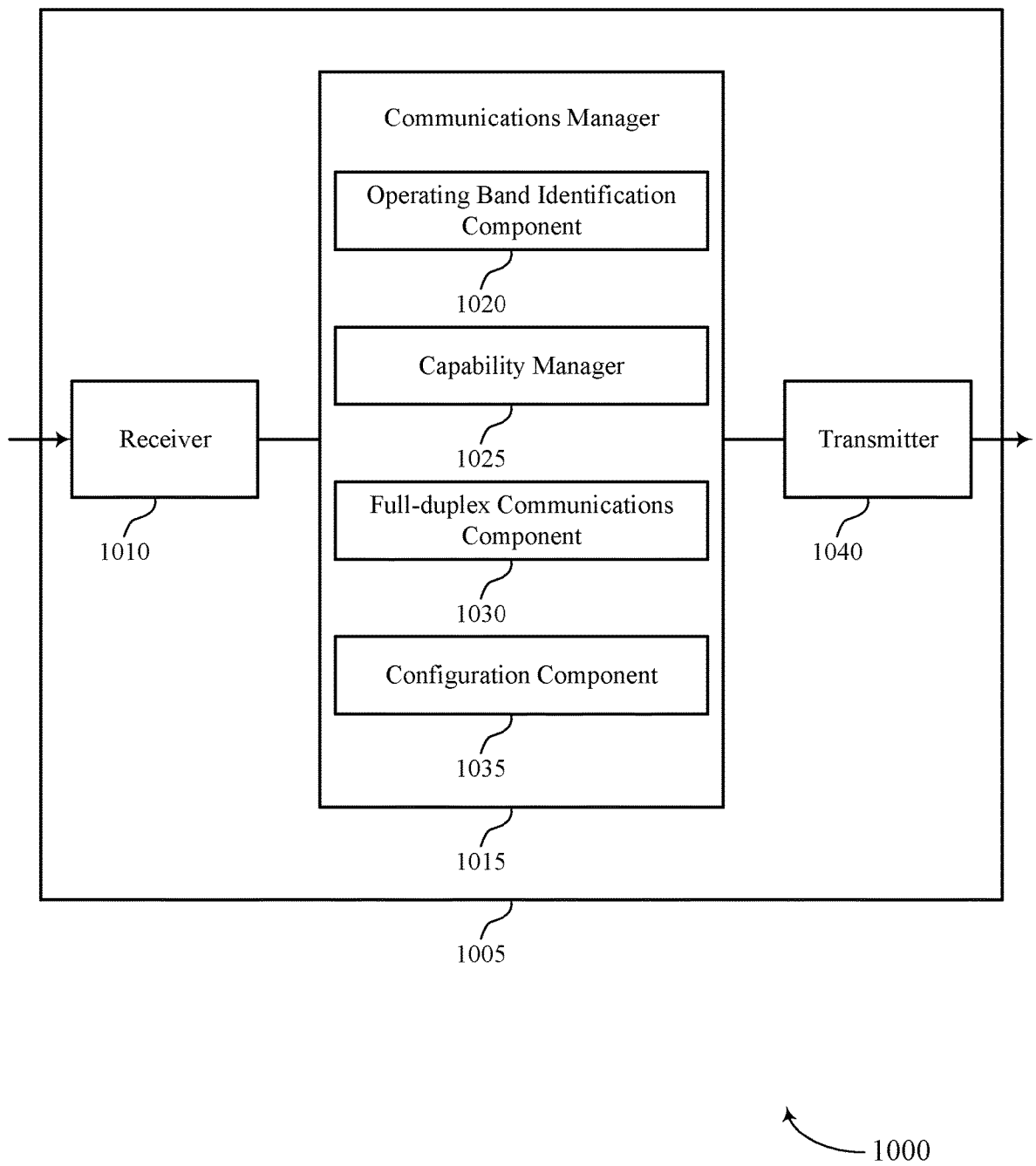

FIG. 10 shows a diagram 1000 of a device 1005 that supports configurations for full-duplex communication systems in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to configurations for full-duplex communication systems, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an operating band identification component 1020, a capability manager 1025, a full-duplex communications component 1030, and a configuration component 1035. The communications manager 1015 may be an example of aspects of the communications manager 1210 described herein.

The operating band identification component 1020 may identify one or more RF spectrum bands for full-duplex communications with a base station.

The capability manager 1025 may transmit an indication of a full-duplex capability to the base station, the full-duplex capability indicating that the UE supports one or more types of the full-duplex communications for each RF spectrum band of the one or more RF spectrum bands.

The capability manager 1025 may identify support for full-duplex communications using one or more RF spectrum bands, the full-duplex communications being associated with uplink resources that overlap in time with downlink resources and separated from the downlink resources by a guard band.

The configuration component 1035 may identify a guard band configuration based on the support for the full-duplex communications. In some aspects, the configuration component 1035 may identify a transmission hopping configuration for full-duplex communications using one or more RF spectrum bands. In some cases, the configuration component 1035 may identify an antenna switching configuration for full-duplex communications using one or more RF spectrum bands.

The full-duplex communications component 1030 may transmit, while simultaneously receiving, one or more messages to the base station using the one or more RF spectrum bands in accordance with the one or more types of full-duplex communications. In some cases, the full-duplex communications component 1030 may transmit, while simultaneously receiving, the one or more messages to a base station using the one or more RF spectrum bands based on the guard band configuration.

In some examples, the full-duplex communications component 1030 may transmit, while simultaneously receiving, the one or more messages using the one or more RF spectrum bands based on the transmission hopping configuration. Additionally or alternatively, the full-duplex communications component 1030 may transmit, while simultaneously receiving, the one or more messages using the one or more RF spectrum bands based on the antenna switching configuration.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
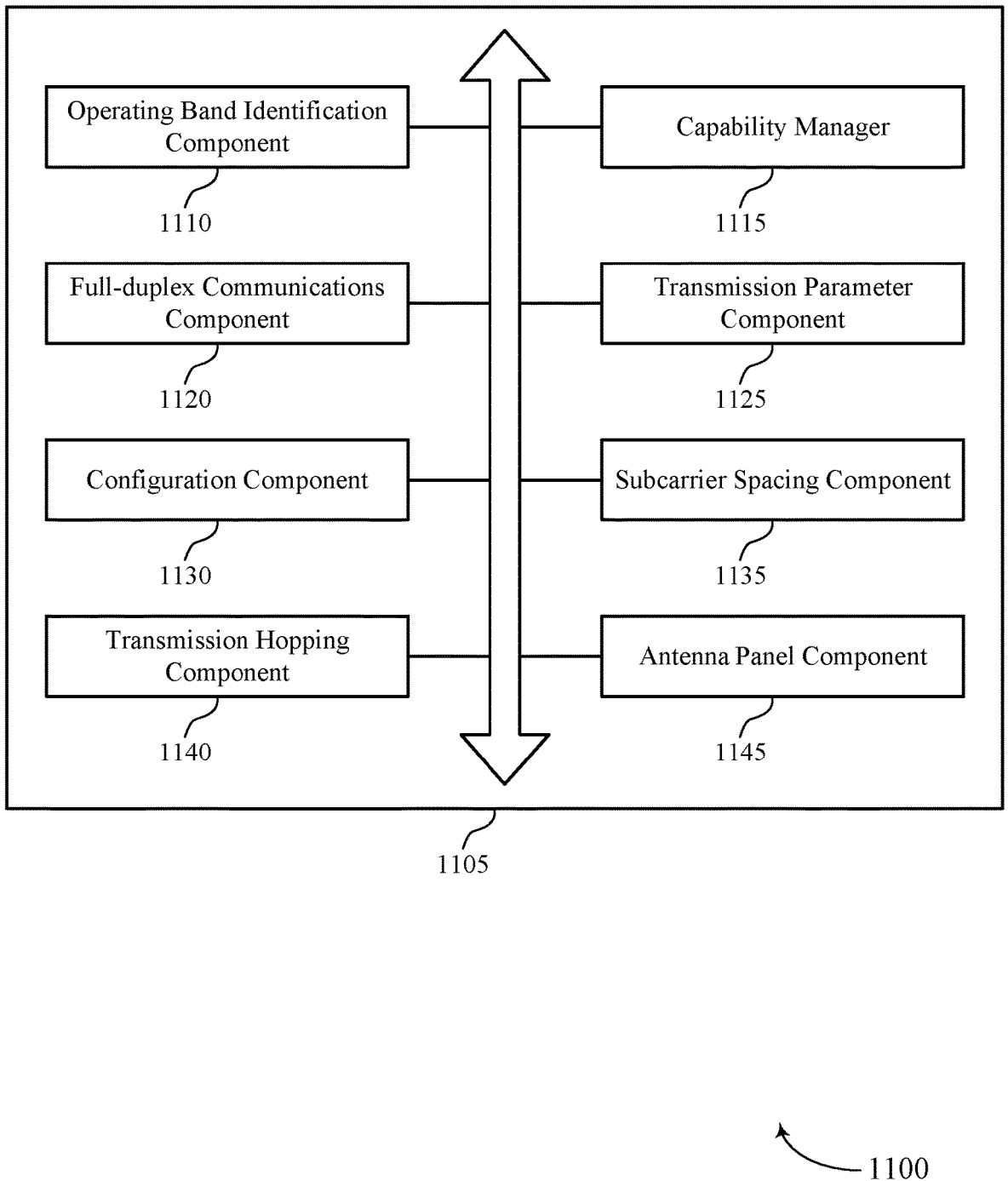
FIG. 11 shows a diagram of a communications manager that supports configurations for full-duplex communication systems in accordance with aspects of the present disclosure.

FIG. 11 shows a diagram 1100 of a communications manager 1105 that supports configurations for full-duplex communication systems in accordance with aspects of the present disclosure. The communications manager 1105 may be an example of aspects of a communications manager 915, a communications manager 1015, or a communications manager 1210 described herein. The communications manager 1105 may include an operating band identification component 1110, a capability manager 1115, a full-duplex communications component 1120, a transmission parameter component 1125, a configuration component 1130, a subcarrier spacing component 1135, a transmission hopping component 1140, and an antenna panel component 1145. Each of these modules may communicate, directly or indirectly, with one another (e.g., via one or more buses).

The operating band identification component 1110 may identify one or more RF spectrum bands for full-duplex communications with a base station. In some examples, the operating band identification component 1110 may identify a frequency range for the one or more RF spectrum bands. For instance, the operating band identification component 1110 may identify a first frequency range for the one or more RF spectrum bands.

In some examples, the operating band identification component 1110 may identify an uplink sub-band, a downlink sub-band, and a guard band for the full-duplex communications. In some examples, the operating band identification component 1110 may identify respective frequency locations of the uplink sub-band, the downlink sub-band, and the guard band, during a first TTI.

In some examples, the operating band identification component 1110 may identify uplink resources and downlink resources for the full-duplex communications, where the uplink resources at least partially overlap with the downlink resources in time and frequency. In some examples, the operating band identification component 1110 may identify a frequency location of the uplink resources during a first TTI.

The capability manager 1115 may transmit an indication of a full-duplex capability to the base station, the full-duplex capability indicating that the UE supports one or more types of the full-duplex communications for each RF spectrum band of the one or more RF spectrum bands. In some examples, the capability manager 1115 may identify, by the UE, support for full-duplex communications using one or more RF spectrum bands, the full-duplex communications being associated with uplink resources that overlap in time with downlink resources and separated from the downlink resources by a guard band.

In some examples, the capability manager 1115 may receive, from the base station, an indication of a base station full-duplex capability, the base station full-duplex capability indicating that the base station supports the one or more types of full-duplex communications for each RF spectrum band of the one or more RF spectrum bands. In some examples, the capability manager 1115 may transmit the indication to the base station using RRC messaging. In some examples, the capability manager 1115 may transmit, to the base station, an indication of a full-duplex capability, the full-duplex capability indicating that the UE supports the full-duplex communications using the one or more RF spectrum bands.

In some examples, the capability manager 1115 may receive, from the base station, an indication of the guard band configuration, where the guard band configuration is based on the full-duplex capability. In some cases, the one or more types of full-duplex communications includes at least a first type associated with uplink resources that at least partially overlap in time and frequency with downlink resources or a second type associated with the uplink resources overlapping in time with the downlink resources and separated from the downlink resources by a guard band.

The full-duplex communications component 1120 may transmit, while simultaneously receiving, one or more messages to the base station using the one or more RF spectrum bands in accordance with the one or more types of full-duplex communications. In some examples, the full-duplex communications component 1120 may transmit, while simultaneously receiving, one or more messages to a base station using the one or more RF spectrum bands based on the guard band configuration. In some examples, the full-duplex communications component 1120 may transmit, while simultaneously receiving, one or more messages using the one or more RF spectrum bands based on the transmission hopping configuration.

In some examples, the full-duplex communications component 1120 may transmit, while simultaneously receiving, one or more messages using the one or more RF spectrum bands based on the antenna switching configuration. In some examples, the full-duplex communications component 1120 may transmit using the first antenna array while receiving using the second antenna array during a first TTI.

In some examples, the full-duplex communications component 1120 may receive using the first antenna array while transmitting using the second antenna array during a second TTI based on the antenna switching configuration. In some examples, the full-duplex communications component 1120 may transmit using the first antenna array, or the second antenna array, or a combination thereof, during a third TTI. In some examples, the full-duplex communications component 1120 may receive using the first antenna array, or the second antenna array, or a combination thereof, during a fourth TTI. In some cases, the first TTI and the second TTI include a symbol, a set of symbols, a mini slot, a slot, or a subframe.

In some examples, the full-duplex communications component 1120 may transmit a first message over the first RF spectrum band using the first antenna panel during a first TTI based on the antenna switching configuration. In some examples, the full-duplex communications component 1120 may receive a second message over the second RF spectrum band using the second antenna panel during the first TTI based on the antenna switching configuration.

In some examples, the full-duplex communications component 1120 may receive a third message over the first RF spectrum band using the first antenna panel during a second TTI based on the antenna switching configuration. In some examples, the full-duplex communications component 1120 may transmit a fourth message over the second RF spectrum band using the second antenna panel during the second TTI based on the antenna switching configuration.

In some examples, the full-duplex communications component 1120 may transmit a third message over the second RF spectrum band using the first antenna panel during a second TTI based on the antenna switching configuration. In some examples, the full-duplex communications component 1120 may receive a fourth message over the first RF spectrum band using the second antenna panel during the second TTI based on the antenna switching configuration.

The transmission parameter component 1125 may adjust transmission parameters based on the base station full-duplex capability, where the one or more messages are transmitted to the base station based on the adjusted transmission parameters. In some cases, the transmission parameters include a transmission power, a number of repetitions, an aggregation level, or a combination thereof.

The configuration component 1130 may identify a guard band configuration based on the support for the full-duplex communications. In some examples, the configuration component 1130 may identify a transmission hopping configuration for full-duplex communications using one or more RF spectrum bands.

In some examples, the configuration component 1130 may identify a first guard band configuration corresponding to the first frequency range, the first guard band configuration being different from a second guard band configuration corresponding to a second frequency range. In some examples, the configuration component 1130 may identify a beam configuration for communicating with the base station, where the guard band configuration is based on the beam configuration. In some examples, the configuration component 1130 may identify an antenna array configuration for communicating with the base station, where the guard band configuration is based on the antenna array configuration.

In some examples, the configuration component 1130 may identify a downlink numerology for the downlink resources and an uplink numerology for the uplink resources. In some examples, the configuration component 1130 may identify a frequency allocation for the guard band, where the frequency allocation is based on an allocation of the uplink resources, an allocation of the downlink resources, a frequency location, an offset from the frequency location, an uplink BWP, a downlink BWP, a separation of the uplink BWP and the downlink BWP, or a combination thereof.

In some examples, the configuration component 1130 may select the guard band configuration from a set of guard band configurations associated with the identified frequency range. In some examples, the configuration component 1130 may receive an indication of the transmission hopping configuration, where the indication is received via RRC messaging, a MAC-CE, DCI, or a combination thereof.

In some cases, the first guard band configuration includes a first guard band size different from a second guard band size associated with the second guard band configuration. In some cases, the guard band configuration indicates a number of RBs, a number of resource elements, or a combination thereof.

The configuration component 1130 may identify an antenna switching configuration for full-duplex communications using one or more RF spectrum bands. In some examples, the configuration component 1130 may identify one or more transmission configuration indicator states.

The subcarrier spacing component 1135 may identify a guard band subcarrier spacing based on the downlink numerology, the uplink numerology, or a combination thereof. In some examples, the subcarrier spacing component 1135 may identify a predetermined subcarrier spacing value. In some examples, the subcarrier spacing component 1135 may identify a guard band subcarrier spacing based on the predetermined subcarrier spacing value.

The transmission hopping component 1140 may adjust, during a second TTI, the respective frequency location of the uplink sub-band, the downlink sub-band, the guard band, or a combination thereof, based on the transmission hopping configuration. In some examples, the transmission hopping component 1140 may adjust a first size of the uplink sub-band in the first TTI to a second size of the uplink sub-band in the second TTI based on the transmission hopping configuration, the first size being different from the second size.

In some examples, the transmission hopping component 1140 may adjust a first size of the downlink sub-band in the first TTI to a second size of the downlink sub-band in the second TTI based on the transmission hopping configuration, the first size being different from the second size. In some examples, the transmission hopping component 1140 may adjust, during a second TTI, the frequency location of the uplink resources based on the transmission hopping configuration.

In some examples, the transmission hopping component 1140 may adjust a first size of the uplink resources in the first TTI to a second size of the uplink resources in the second TTI based on the transmission hopping configuration, the first size being different from the second size. In some examples, the transmission hopping component 1140 may adjust a first size of the downlink resources in the first TTI to a second size of the downlink resources in the second TTI based on the transmission hopping configuration, the first size being different from the second size. In some cases, the first TTI and the second TTI include a symbol, a set of symbols, a mini slot, a slot, or a subframe.

The antenna panel component 1145 may identify a first antenna array and a second antenna array. In some examples, the antenna panel component 1145 may select an antenna switching pattern from a set of antenna switching patterns. In some examples, the antenna panel component 1145 may receive an indication of one or more spatial filters or a TCI for uplink transmissions, where transmitting the first message using the first antenna panel is based on the one or more spatial filters or the TCI. In some cases, a spatial filter of the one or more spatial filters includes a common spatial filter for a set of antenna arrays. In some cases, each spatial filter of the one or more spatial filters are associated with a respective antenna array.

In some examples, the antenna panel component 1145 may select respective antenna arrays for receiving downlink transmissions based on the one or more TCI states. In some examples, the antenna panel component 1145 may receive, from a base station, an indication of the antenna switching configuration.

Figure 12:
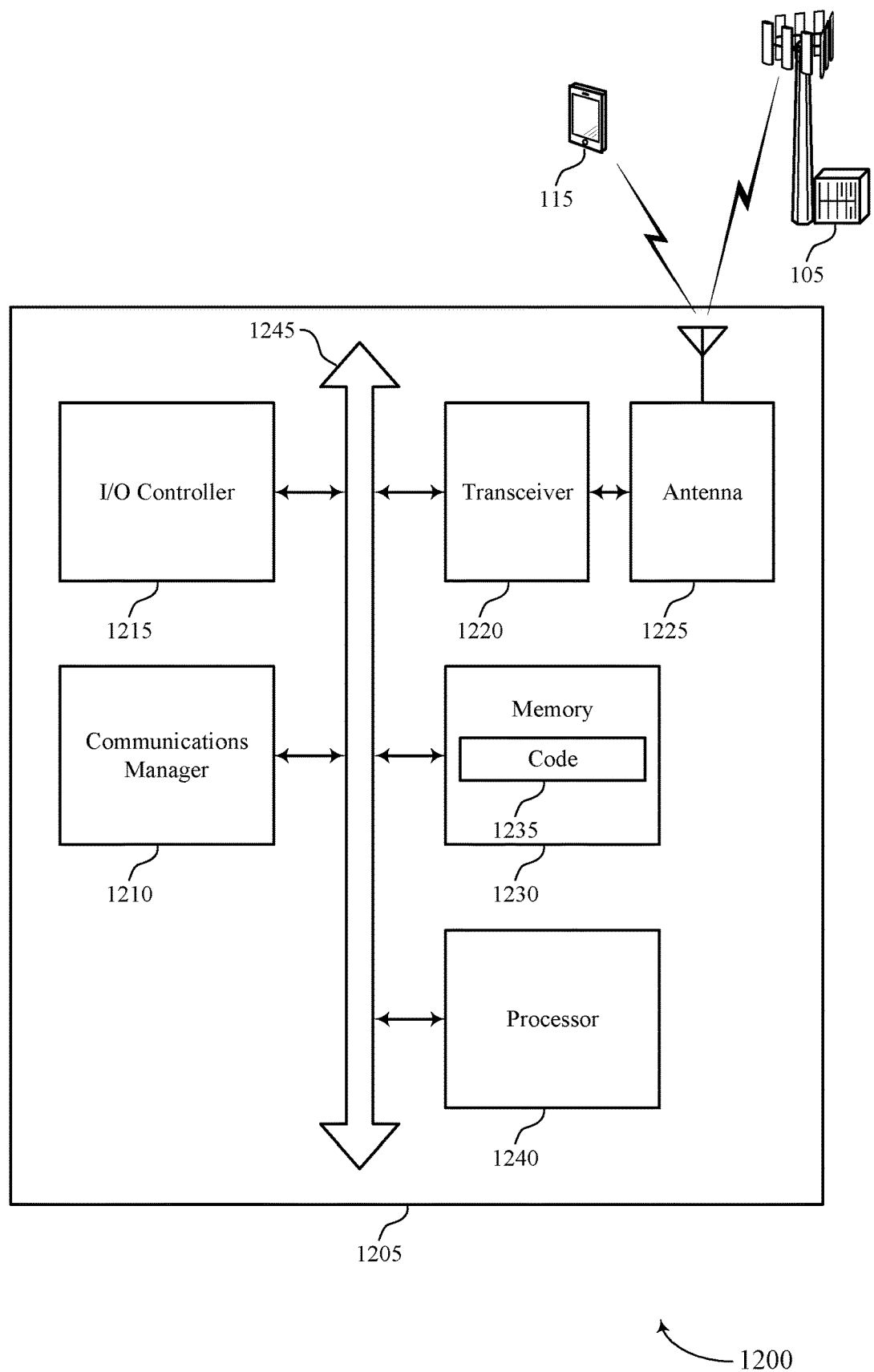
FIG. 12 shows a diagram of a system including a device that supports configurations for full-duplex communication systems in accordance with aspects of the present disclosure.

FIG. 12 shows a diagram of a system 1200 including a device 1205 that supports configurations for full-duplex communication systems in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in communication (e.g., electronic communication) via one or more buses (e.g., bus 1245).

The communications manager 1210 may identify one or more RF spectrum bands for full-duplex communications with a base station, transmit an indication of a full-duplex capability to the base station, the full-duplex capability indicating that the UE supports one or more types of the full-duplex communications for each RF spectrum band of the one or more RF spectrum bands, and transmit, while simultaneously receiving, one or more messages to the base station using the one or more RF spectrum bands in accordance with the one or more types of full-duplex communications.

The communications manager 1210 may also identify, by the UE, support for full-duplex communications using one or more RF spectrum bands, the full-duplex communications being associated with uplink resources that overlap in time with downlink resources and separated from the downlink resources by a guard band, identify a guard band configuration based on the support for the full-duplex communications, and transmit, while simultaneously receiving, one or more messages to a base station using the one or more RF spectrum bands based on the guard band configuration. The communications manager 1210 may also identify a transmission hopping configuration for full-duplex communications using one or more RF spectrum bands and transmit, while simultaneously receiving, one or more messages using the one or more RF spectrum bands based on the transmission hopping configuration.

In some examples, the communications manager 1210 may identify an antenna switching configuration for full-duplex communications using one or more RF spectrum bands and transmit, while simultaneously receiving, one or more messages using the one or more RF spectrum bands based on the antenna switching configuration.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting configurations for full-duplex communication systems).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
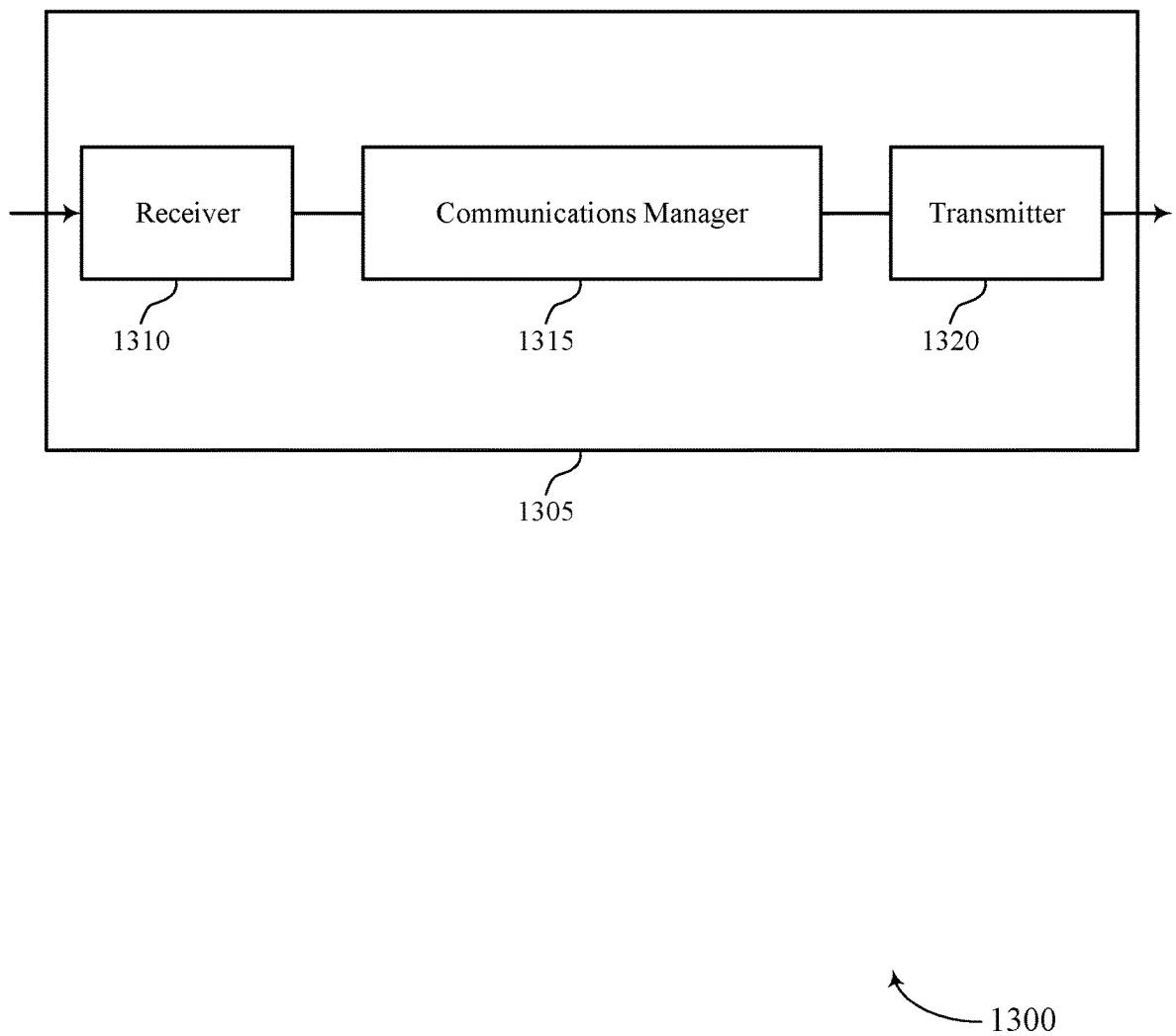
FIGS. 13 and 14 show diagrams of devices that support configurations for full-duplex communication systems in accordance with aspects of the present disclosure.

FIG. 13 shows a diagram 1300 of a device 1305 that supports configurations for full-duplex communication systems in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to configurations for full-duplex communication systems, etc.). Information may be passed on to other components of the device 1305. The receiver 1310 may be an example of aspects of the transceiver 1620 described with reference to FIG. 16. The receiver 1310 may utilize a single antenna or a set of antennas.

In some examples, the communications manager 1315 may receive, from a UE, an indication of a full-duplex capability, the full-duplex capability indicating that the UE supports one or more types of full-duplex communications for each RF spectrum band of one or more RF spectrum bands and receive, while simultaneously transmitting, one or more messages from the UE over the one or more RF spectrum bands in accordance with the one or more types of full-duplex communications.

In some examples, the communications manager 1315 may identify one or more RF spectrum bands for full-duplex communications, the full-duplex communications being associated with uplink resources that overlap in time with downlink resources and separated from the downlink resources by a guard band, identify a guard band configuration based on the full-duplex communications, and receive, while simultaneously transmitting, messages to one or more UEs using the one or more RF spectrum bands based on the guard band configuration.

In some examples, the communications manager 1315 may identify an antenna switching configuration for full-duplex communications using one or more RF spectrum bands and transmit, while simultaneously receiving, one or more messages using the one or more RF spectrum bands based on the antenna switching configuration. The communications manager 1315 may be an example of aspects of the communications manager 1610 described herein.

For example, the communications manager 1315 may identify an antenna switching configuration for full-duplex communications using one or more RF spectrum bands, the antenna switching configuration associated with switching between at least a first antenna panel and a second antenna panel, identify, based on the antenna switching configuration, a first RF spectrum band and a second RF spectrum band of the one or more RF spectrum bands, transmit a first message over the first RF spectrum band using the first antenna panel during a first TTI based on the antenna switching configuration, and receive a second message over the second RF spectrum band using the second antenna panel during the first TTI based on the antenna switching configuration.

In some examples, the communications manager 1315 may identify one or more RF spectrum bands for full-duplex communications, the full-duplex communications being associated with uplink resources that overlap in time with downlink resources and separated from the downlink resources by a guard band, identify that a downlink transmission associated with a first operator and an uplink transmission associated with a second operator overlap in time, the downlink transmission associated with a set of downlink resources, configure a frequency allocation pattern for separating a set of uplink resources associated with the uplink transmission from the set of downlink resources associated with the downlink transmission based on the set of downlink resources and identifying that the downlink transmission associated with the first operator and the uplink transmission associated with the second operator overlap in time, and receive the uplink transmission over the set of uplink resources while simultaneously transmitting the downlink transmission over the set of downlink resources using the one or more RF spectrum bands based on the frequency allocation pattern.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

The communications manager 1315 may be implemented to realize one or more potential advantages. In some implementations, the communications manager 1315 may determine or provide resource configurations for full-duplex communications that sufficiently separate resources used for uplink transmissions from resources used for downlink transmissions or otherwise provide techniques for minimizing self-interference at the antennas of the receiver 1310, which may result in a greater likelihood for successful communication for the communications manager 1315. Further, based on achieving a greater likelihood for successful communication in a full-duplex communications mode, the communications manager 1315 may provide for higher data rates and greater system throughput and capacity. As such, the communications manager 1315, or one or more processing components of the communications manager 1315, may operate less frequently, which may improve power savings at the device 1305, or may serve more UEs within the system associated with the device 1305.

Figure 14:
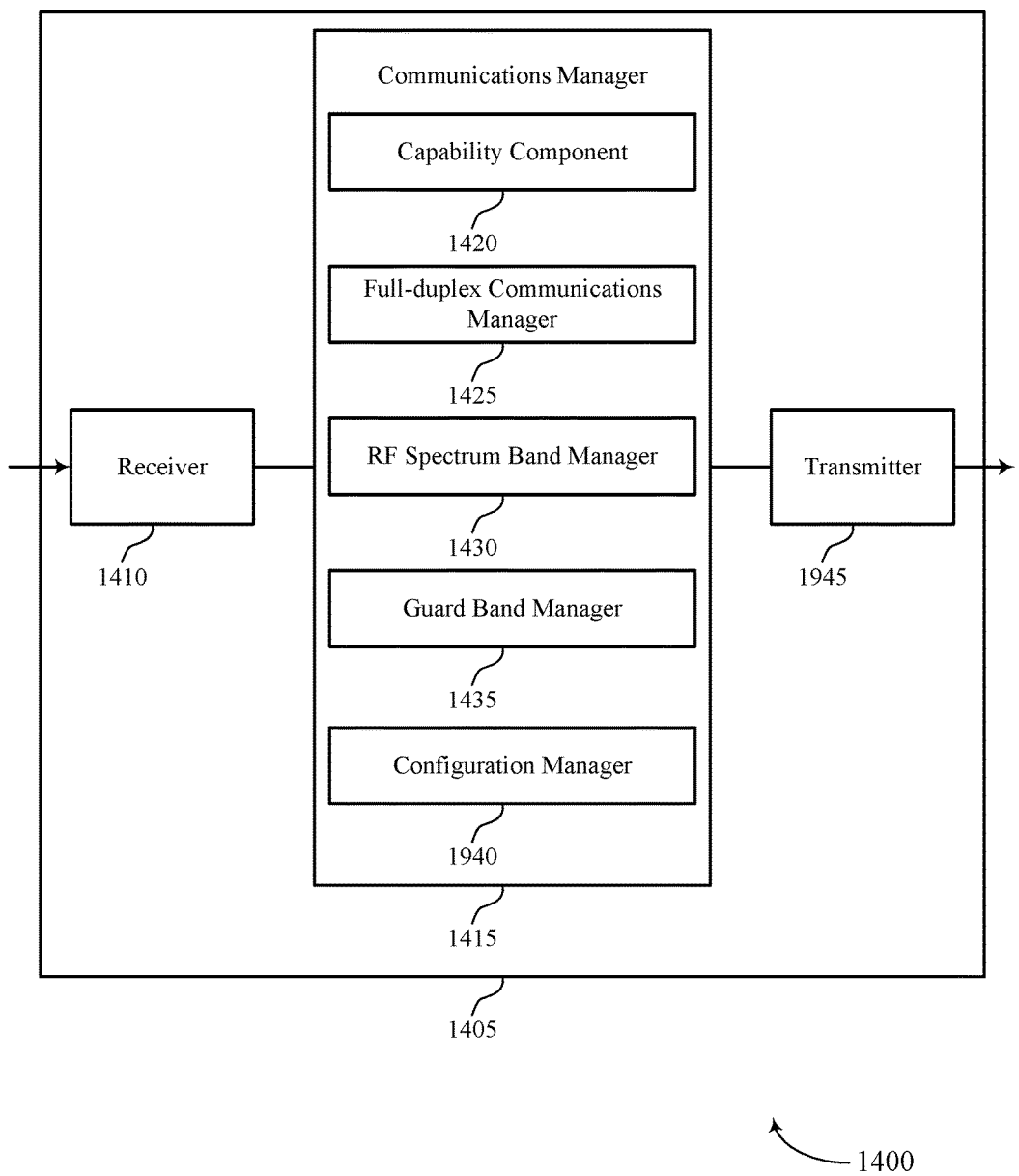

FIG. 14 shows a diagram 1400 of a device 1405 that supports configurations for full-duplex communication systems in accordance with aspects of the present disclosure. The device 1405 may be an example of aspects of a device 1305, or a base station 105 as described herein. The device 1405 may include a receiver 1410, a communications manager 1415, and a transmitter 1445. The device 1405 may also include a processor. Each of these components may be in communication with one another (e.g., via one or more buses).

The receiver 1410 may receive information such as packets, user data, or control information associated with various information channels (e.g., control channels, data channels, and information related to configurations for full-duplex communication systems, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a capability component 1420, a full-duplex communications manager 1425, an RF spectrum band manager 1430, a guard band manager 1435, and a configuration manager 1440. The communications manager 1415 may be an example of aspects of the communications manager 1610 described herein.

The capability component 1420 may receive, from a UE, an indication of a full-duplex capability, the full-duplex capability indicating that the UE supports one or more types of full-duplex communications for each RF spectrum band of one or more RF spectrum bands.

The full-duplex communications manager 1425 may receive, while simultaneously transmitting, one or more messages from the UE over the one or more RF spectrum bands in accordance with the one or more types of full-duplex communications. In some cases, the full-duplex communications manager 1425 may receive, while simultaneously transmitting, the messages to one or more UEs using the one or more RF spectrum bands based on the guard band configuration.

The full-duplex communications component 1425 may also transmit, while simultaneously receiving, one or more messages using the one or more RF spectrum bands based on the antenna switching configuration. In some examples, the full-duplex communications component 1425 may identify that a downlink transmission associated with a first operator and an uplink transmission associated with a second operator overlap in time, the downlink transmission associated with a set of downlink resources. In some examples, the full-duplex communications component 1425 may receive the uplink transmission over the set of uplink resources while simultaneously transmitting the downlink transmission over the set of downlink resources using the one or more RF spectrum bands based on the frequency allocation pattern.

The RF spectrum band manager 1430 may identify one or more RF spectrum bands for full-duplex communications, the full-duplex communications being associated with uplink resources that overlap in time with downlink resources and separated from the downlink resources by a guard band. In some examples, the RF spectrum band manager 1430 may configure a frequency allocation pattern for separating a set of uplink resources associated with the uplink transmission from the set of downlink resources associated with the downlink transmission based on the set of downlink resources and identifying that the downlink transmission associated with the first operator and the uplink transmission associated with the second operator overlap in time.

The guard band manager 1435 may identify a guard band configuration based on the full-duplex communications. The configuration component 1440 may identify an antenna switching configuration for full-duplex communications using one or more RF spectrum bands.

The transmitter 1445 may transmit signals generated by other components of the device 1405. In some examples, the transmitter 1445 may be collocated with a receiver 1410 in a transceiver module. For example, the transmitter 1445 may be an example of aspects of the transceiver 1620 described with reference to FIG. 16. The transmitter 1445 may utilize a single antenna or a set of antennas.

Figure 15:
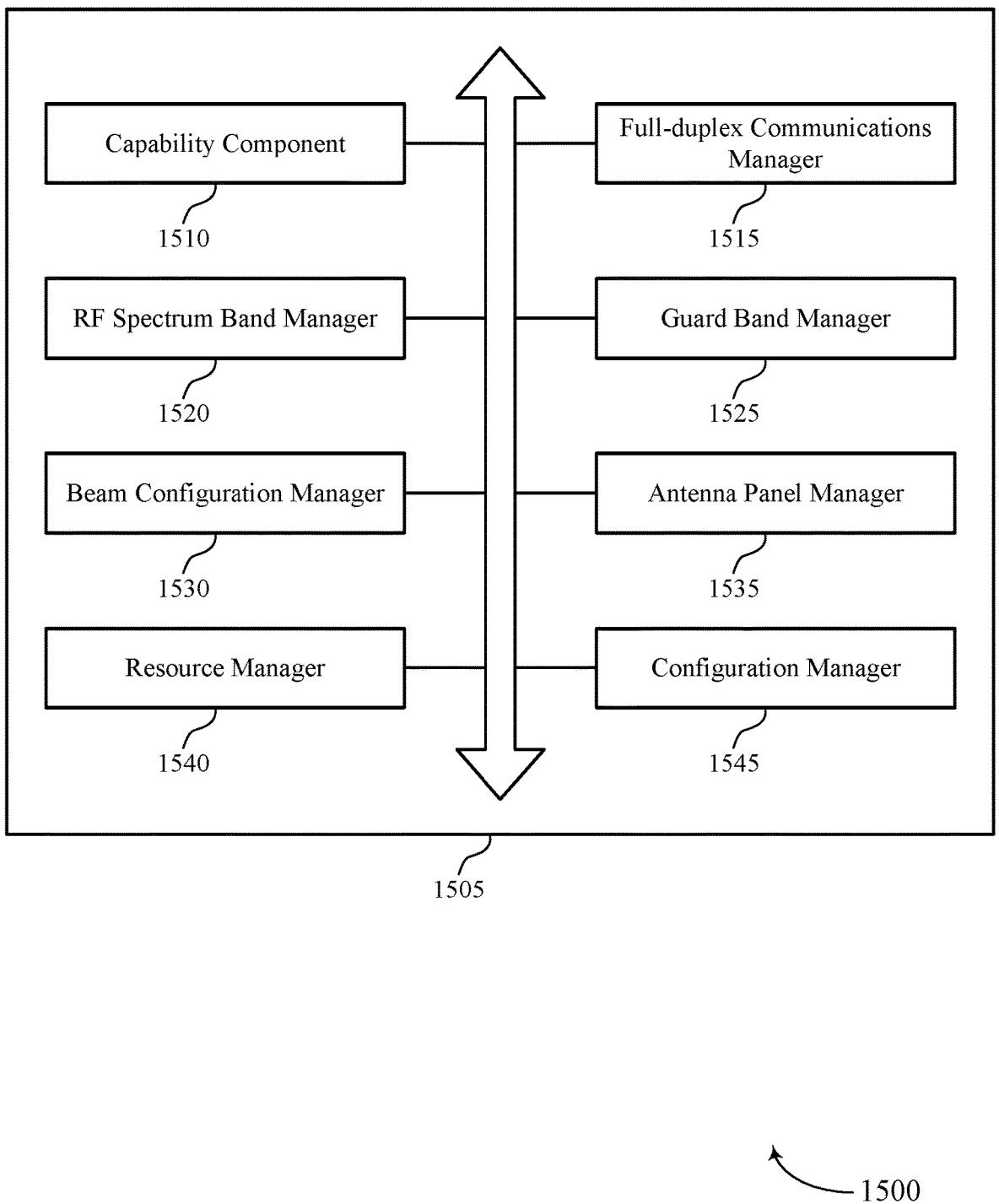
FIG. 15 shows a diagram of a communications manager that supports configurations for full-duplex communication systems in accordance with aspects of the present disclosure.

FIG. 15 shows a diagram 1500 of a communications manager 1505 that supports configurations for full-duplex communication systems in accordance with aspects of the present disclosure. The communications manager 1505 may be an example of aspects of a communications manager 1315, a communications manager 1415, or a communications manager 1610 described herein. The communications manager 1505 may include a capability component 1510, a full-duplex communications manager 1515, an RF spectrum band manager 1520, a guard band manager 1525, a beam configuration manager 1530, an antenna panel manager 1535, a resource manager 1540, and a configuration manager 1545. Each of these modules may communicate, directly or indirectly, with one another (e.g., via one or more buses).

The capability component 1510 may receive, from a UE, an indication of a full-duplex capability, the full-duplex capability indicating that the UE supports one or more types of full-duplex communications for each RF spectrum band of one or more RF spectrum bands. In some examples, the capability component 1510 may receive the indication from the UE via RRC messaging.

In some examples, the capability component 1510 may identify a base station full-duplex capability for supporting the one or more types of full-duplex communications for each RF spectrum band of the one or more RF spectrum bands. In some examples, the capability component 1510 may transmit, to the UE, an indication of the base station full-duplex capability. In some cases, the one or more types of full-duplex communications includes at least a first type associated with uplink resources that at least partially overlap in time and frequency with downlink resources or a second type associated with uplink resources that overlap in time with the downlink resources and separated from the downlink resources by a guard band.

The full-duplex communications manager 1515 may receive, while simultaneously transmitting, one or more messages from the UE over the one or more RF spectrum bands in accordance with the one or more types of full-duplex communications. In some cases, the received one or more messages have transmission parameters that are based on a base station full-duplex capability, and the transmission parameters may include a transmission power, a number of repetitions, an aggregation level, or a combination thereof. In some examples, the full-duplex communications manager 1515 may receive, while simultaneously transmitting, messages to one or more UEs using the one or more RF spectrum bands based on the guard band configuration.

The full-duplex communications manager 1515 may transmit, while simultaneously receiving, one or more messages using the one or more RF spectrum bands based on the antenna switching configuration. In some examples, the full-duplex communications manager 1515 may transmit using the first antenna array while receiving using the second antenna array during a first TTI.

In some examples, the full-duplex communications manager 1515 may receive using the first antenna array while transmitting using the second antenna array during a second TTI based on the antenna switching configuration. In some examples, the full-duplex communications manager 1515 may transmit using the first antenna array, or the second antenna array, or a combination thereof, during a third TTI. In some examples, the full-duplex communications manager 1515 may receive using the first antenna array, or the second antenna array, or a combination thereof, during a fourth TTI. In some cases, the first TTI and the second TTI include a symbol, a set of symbols, a mini slot, a slot, or a subframe.

In some examples, the full-duplex communications manager 1515 may receive a third message over the first RF spectrum band using the first antenna panel during a second TTI based on the antenna switching configuration. In some examples, the full-duplex communications manager 1515 may transmit a fourth message over the second RF spectrum band using the second antenna panel during the second TTI based on the antenna switching configuration.

In some examples, the full-duplex communications manager 1515 may transmit a third message over the second RF spectrum band using the first antenna panel during a second TTI based on the antenna switching configuration. In some examples, the full-duplex communications manager 1515 may receive a fourth message over the first RF spectrum band using the second antenna panel during the second TTI based on the antenna switching configuration.

In some examples, the full-duplex communications manager 1515 may transmit a third message over the first RF spectrum band, or the second RF spectrum band, or a combination thereof, using the first antenna panel, or the second antenna panel, or a combination thereof, during a second TTI. In some examples, the full-duplex communications manager 1515 may receive a fourth message over the first RF spectrum band, or the second RF spectrum band, or a combination thereof, using the first antenna panel, or the second antenna panel, or a combination thereof, during a third TTI.

The RF spectrum band manager 1520 may identify one or more RF spectrum bands for full-duplex communications, the full-duplex communications being associated with uplink resources that overlap in time with downlink resources and separated from the downlink resources by a guard band. In some examples, the RF spectrum band manager 1520 may identify a first frequency range for the one or more RF spectrum bands. In some examples, the RF spectrum band manager 1520 may identify a frequency range for the one or more RF spectrum bands.

In some examples, the RF spectrum band manager 1520 may separate the set of uplink resources from the set of downlink resources over the one or more RF spectrum bands. In some examples, the RF spectrum band manager 1520 may adjust the guard band between the set of downlink resources and the set of uplink resources based on interference arising at a first antenna panel associated with the second operator from a second antenna panel associated with the first operator.

The guard band manager 1525 may identify a guard band configuration based on the full-duplex communications. In some examples, the guard band manager 1525 may identify a first guard band configuration corresponding to the first frequency range, the first guard band configuration being different from a second guard band configuration corresponding to a second frequency range.

In some examples, the guard band manager 1525 may identify a guard band subcarrier spacing based on the downlink numerology, the uplink numerology, or a combination thereof. In some examples, the guard band manager 1525 may identify a guard band subcarrier spacing based on the predetermined subcarrier spacing value.

In some examples, the guard band manager 1525 may identify a frequency allocation for the guard band, where the frequency allocation is based on an allocation of the uplink resources, an allocation of the downlink resources, a frequency location, an offset from the frequency location, an uplink BWP, a downlink BWP, a separation of the uplink BWP and the downlink BWP, or a combination thereof.

In some examples, the guard band manager 1525 may select the guard band configuration from a set of guard band configurations associated with the identified frequency range. In some examples, the guard band manager 1525 may adjust the guard band between the set of downlink resources and the set of uplink resources based on the full-duplex communications.

In some examples, the guard band manager 1525 may transmit, to the UE, an indication of the guard band configuration, where the guard band configuration is based on the full-duplex capability. In some cases, the first guard band configuration includes a first guard band size different from a second guard band size associated with the second guard band configuration. In some cases, the guard band configuration indicates a number of RBs, a number of resource elements, or a combination thereof.

The beam configuration manager 1530 may identify a beam configuration for communicating with the UE, where the guard band configuration is based on the beam configuration.

The antenna panel manager 1535 may identify an antenna array configuration for communicating with the UE, where the guard band configuration is based on the antenna array configuration. In some examples, the antenna panel manager 1535 may identify a first antenna array and a second antenna array. In some examples, the antenna panel manager 1535 may select an antenna switching pattern from a set of antenna switching patterns. In some examples, the antenna panel manager 1535 may receive an indication of one or more spatial filters or a TCI for uplink transmissions, where transmitting the one or more messages is based on the one or more spatial filters or the TCI.

In some examples, the antenna panel manager 1535 may select respective antenna arrays for receiving downlink transmissions based on the one or more transmission configuration indicator states. In some cases, a spatial filter of the one or more spatial filters includes a common spatial filter for a set of antenna arrays. In some cases, each spatial filter of the one or more spatial filters are associated with a respective antenna array. In some examples, the antenna panel manager 1535 may receive, from a base station, an indication of the antenna switching configuration.

The resource manager 1540 may identify a downlink numerology for the downlink resources and an uplink numerology for the uplink resources. In some examples, the resource manager 1540 may identify a predetermined sub-carrier spacing value. In some examples, the resource manager 1540 may identify a set of downlink resources associated with a first operator and a set of uplink resources associated with a second operator. In some examples, the resource manager 1540 may configure a frequency pattern for separating the set of downlink resources and the set of uplink resources based on the full-duplex communications.

The configuration manager 1545 may identify an antenna switching configuration for full-duplex communications using one or more RF spectrum bands. In some examples, the configuration manager 1545 may identify one or more transmission configuration indicator states. In some examples, the configuration manager 1545 may configure a transmission hopping configuration for full-duplex communications using one or more RF spectrum bands. In some examples, the configuration manager 1545 may transmit an indication of the transmission hopping configuration, where the indication is transmitted via RRC messaging, a MAC-CE, DCI, or a combination thereof. In some cases, the configuration manager 1545 may adjust a frequency location of uplink resources, or downlink resources, or both, based on the transmission hopping configuration. In some cases, the configuration manager 1545 may adjust a first size of the uplink resources, the downlink resources, or both, in a first TTI to a second size of the uplink resources, downlink resources, or both, in a second TTI based on the transmission hopping configuration. In some cases, the first size is different from the second size.

Figure 16:
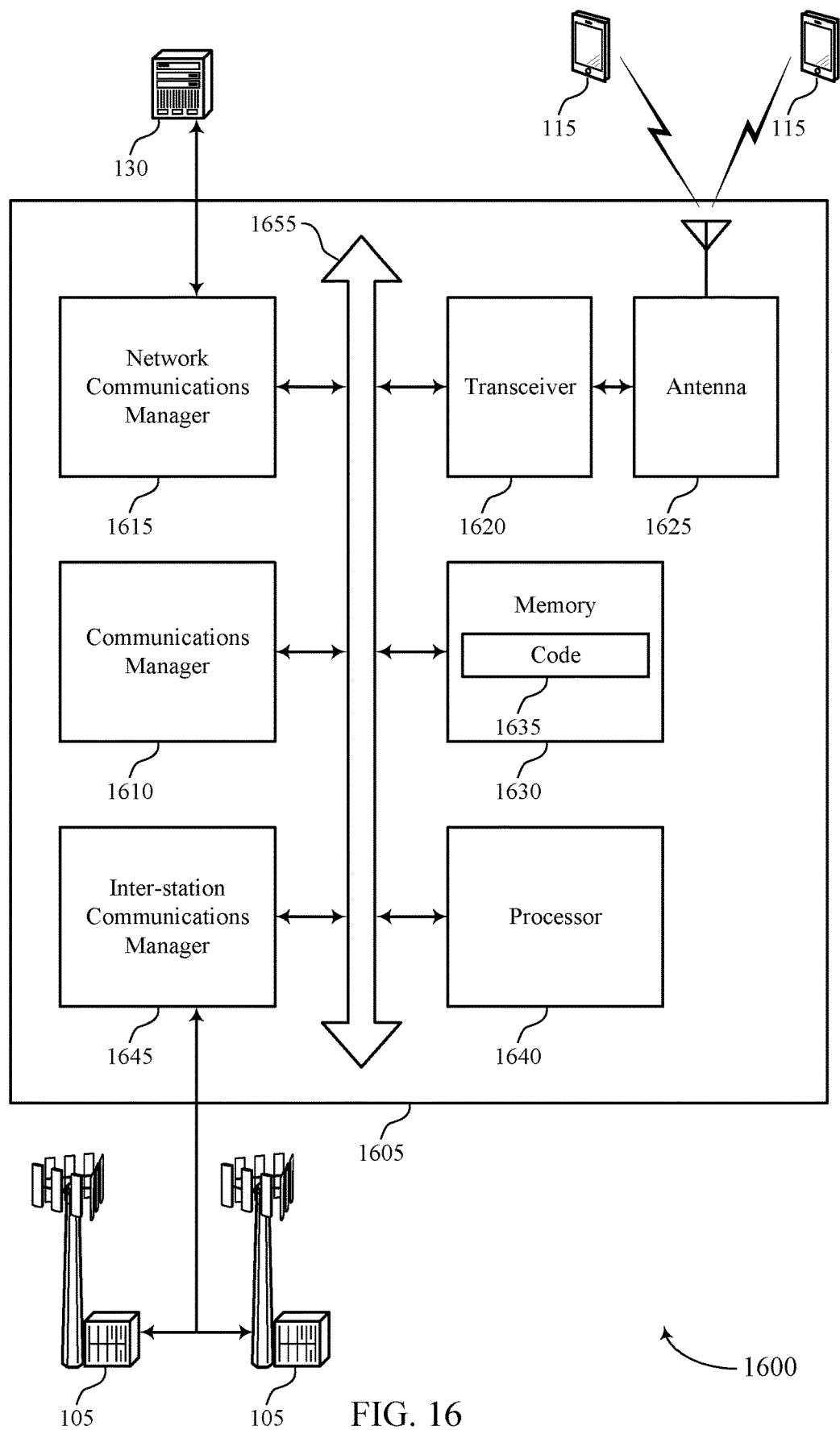
FIG. 16 shows a diagram of a system including a device that supports configurations for full-duplex communication systems in accordance with aspects of the present disclosure.

FIG. 16 shows a diagram of a system 1600 including a device 1605 that supports configurations for full-duplex communication systems in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in communication (e.g., electronic communication) via one or more buses (e.g., bus 1655).

The communications manager 1610 may receive, from a UE, an indication of a full-duplex capability, the full-duplex capability indicating that the UE supports one or more types of full-duplex communications for each RF spectrum band of one or more RF spectrum bands and receive, while simultaneously transmitting, one or more messages from the UE over the one or more RF spectrum bands in accordance with the one or more types of full-duplex communications.

The communications manager 1610 may also identify one or more RF spectrum bands for full-duplex communications, the full-duplex communications being associated with uplink resources that overlap in time with downlink resources and separated from the downlink resources by a guard band, identify a guard band configuration based on the full-duplex communications, and receive, while simultaneously transmitting, messages to one or more UEs using the one or more RF spectrum bands based on the guard band configuration.

In some cases, the communications manager 1610 may identify an antenna switching configuration for full-duplex communications using one or more RF spectrum bands and transmit, while simultaneously receiving, one or more messages using the one or more RF spectrum bands based on the antenna switching configuration.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described herein. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting configurations for full-duplex communication systems).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
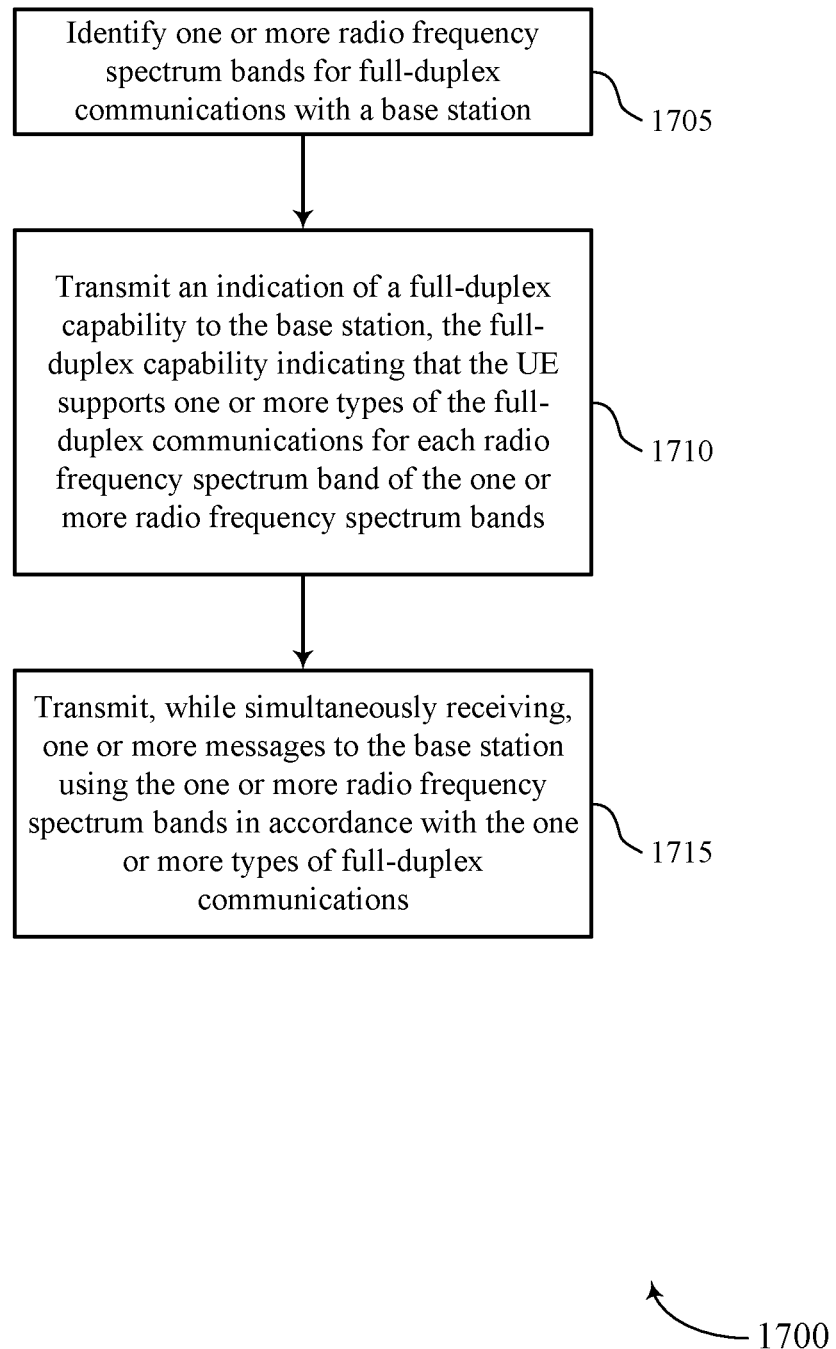
FIGS. 17 through 25 show flowcharts illustrating methods that support configurations for full-duplex communication systems in accordance with aspects of the present disclosure.

FIG. 17 shows a flowchart illustrating a method 1700 that supports configurations for full-duplex communication systems in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1705, the UE may identify one or more RF spectrum bands for full-duplex communications with a base station. The operations of 1705 may be performed according to the methods described herein. In some examples, aspects of the operations of 1705 may be performed by an operating band identification component as described with reference to FIGS. 9 through 12.

At 1710, the UE may transmit an indication of a full-duplex capability to the base station, the full-duplex capability indicating that the UE supports one or more types of the full-duplex communications for each RF spectrum band of the one or more RF spectrum bands. The operations of 1710 may be performed according to the methods described herein. In some examples, aspects of the operations of 1710 may be performed by a capability manager as described with reference to FIGS. 9 through 12.

At 1715, the UE may transmit, while simultaneously receiving, one or more messages to the base station using the one or more RF spectrum bands in accordance with the one or more types of full-duplex communications. The operations of 1715 may be performed according to the methods described herein. In some examples, aspects of the operations of 1715 may be performed by a full-duplex communications component as described with reference to FIGS. 9 through 12.

Figure 18:
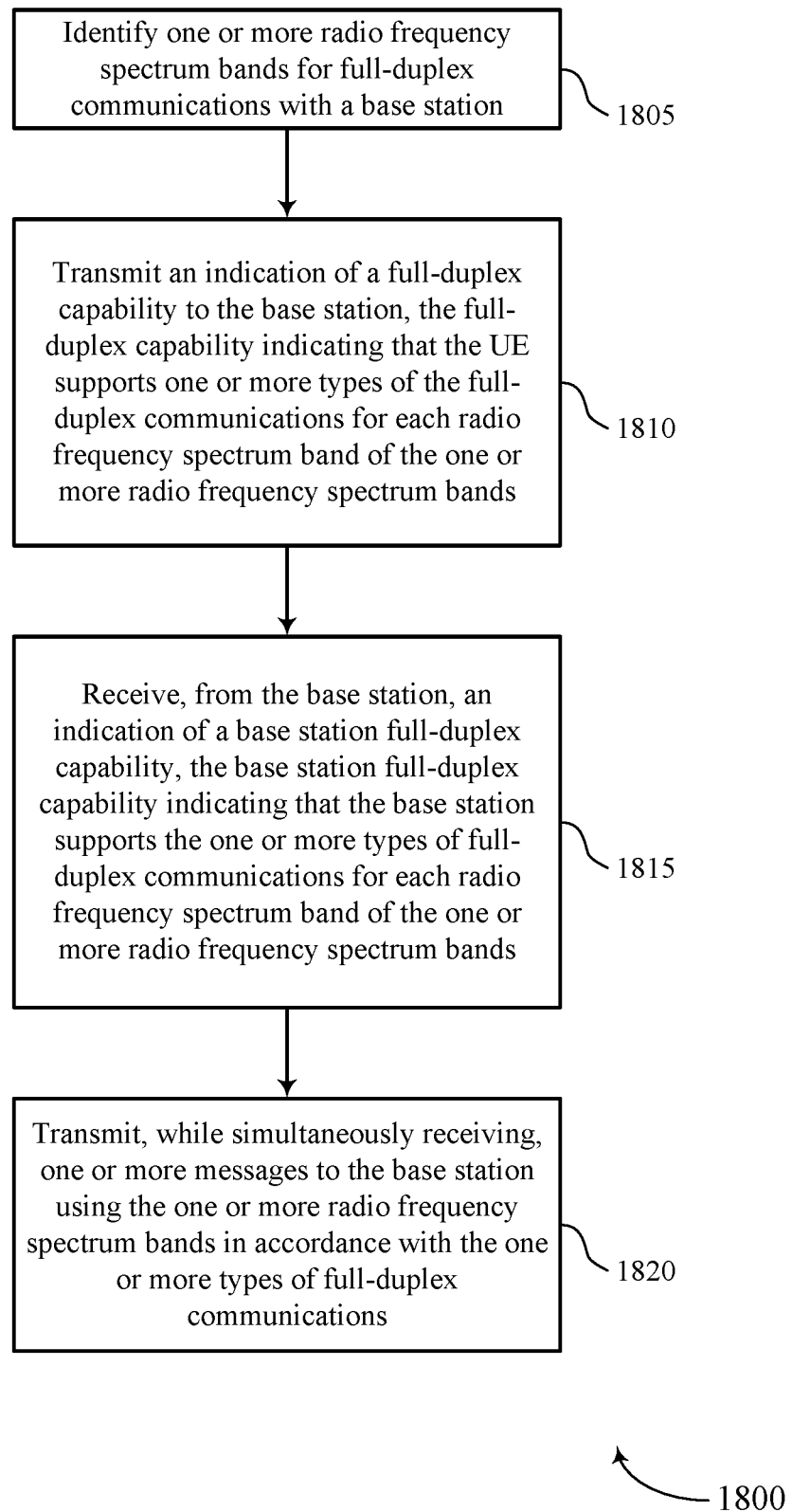

FIG. 18 shows a flowchart illustrating a method 1800 that supports configurations for full-duplex communication systems in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1805, the UE may identify one or more RF spectrum bands for full-duplex communications with a base station. The operations of 1805 may be performed according to the methods described herein. In some examples, aspects of the operations of 1805 may be performed by an operating band identification component as described with reference to FIGS. 9 through 12.

At 1810, the UE may transmit an indication of a full-duplex capability to the base station, the full-duplex capability indicating that the UE supports one or more types of the full-duplex communications for each RF spectrum band of the one or more RF spectrum bands. The operations of 1810 may be performed according to the methods described herein. In some examples, aspects of the operations of 1810 may be performed by a capability manager as described with reference to FIGS. 9 through 12.

At 1815, the UE may receive, from the base station, an indication of a base station full-duplex capability, the base station full-duplex capability indicating that the base station supports the one or more types of full-duplex communications for each RF spectrum band of the one or more RF spectrum bands. The operations of 1815 may be performed according to the methods described herein. In some examples, aspects of the operations of 1815 may be performed by a capability manager as described with reference to FIGS. 9 through 12.

At 1820, the UE may transmit, while simultaneously receiving, one or more messages to the base station using the one or more RF spectrum bands in accordance with the one or more types of full-duplex communications. The operations of 1820 may be performed according to the methods described herein. In some examples, aspects of the operations of 1820 may be performed by a full-duplex communications component as described with reference to FIGS. 9 through 12.

Figure 19:
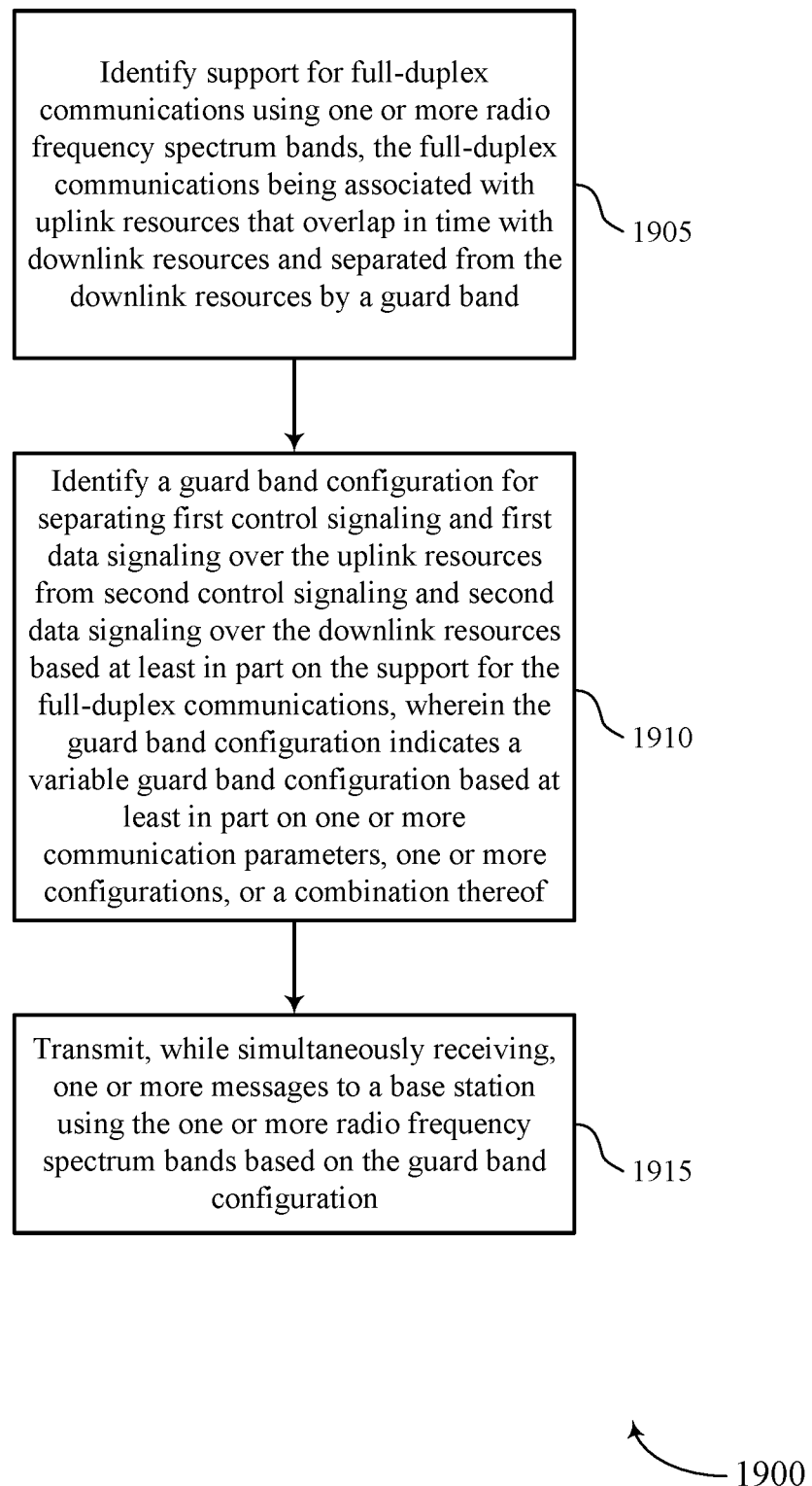

FIG. 19 shows a flowchart illustrating a method 1900 that supports configurations for full-duplex communication systems in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 1905, the UE may identify support for full-duplex communications using one or more RF spectrum bands, the full-duplex communications being associated with uplink resources that overlap in time with downlink resources and separated from the downlink resources by a guard band. The operations of 1905 may be performed according to the methods described herein. In some examples, aspects of the operations of 1905 may be performed by a capability manager as described with reference to FIGS. 9 through 12.

At 1910, the UE may identify a guard band configuration for separating first control signaling and first data signaling over the uplink resources from second control signaling and second data signaling over the downlink resources based on the support for the full-duplex communications, where the guard band configuration indicates a variable guard band configuration based on one or more communication parameters, one or more configurations, or a combination thereof. The operations of 1910 may be performed according to the methods described herein. In some examples, aspects of the operations of 1910 may be performed by a configuration component as described with reference to FIGS. 9 through 12.

At 1915, the UE may transmit, while simultaneously receiving, one or more messages to a base station using the one or more RF spectrum bands based on the guard band configuration. The operations of 1915 may be performed according to the methods described herein. In some examples, aspects of the operations of 1915 may be performed by a full-duplex communications component as described with reference to FIGS. 9 through 12.

Figure 20:
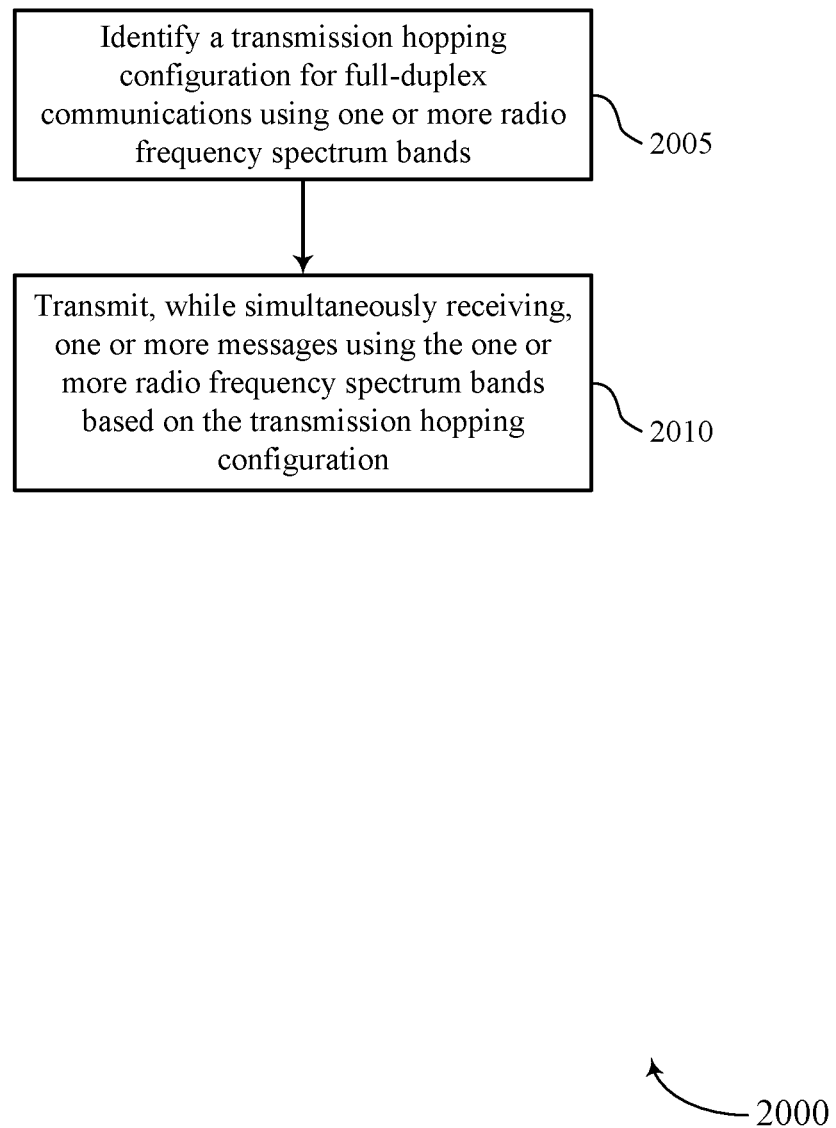

FIG. 20 shows a flowchart illustrating a method 2000 that supports configurations for full-duplex communication systems in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described herein. Additionally or alternatively, a UE may perform aspects of the functions described herein using special-purpose hardware.

At 2005, the UE may identify a transmission hopping configuration for full-duplex communications using one or more RF spectrum bands. The operations of 2005 may be performed according to the methods described herein. In some examples, aspects of the operations of 2005 may be performed by a configuration component as described with reference to FIGS. 9 through 12.

At 2010, the UE may transmit, while simultaneously receiving, one or more messages using the one or more RF spectrum bands based on the transmission hopping configuration. The operations of 2010 may be performed according to the methods described herein. In some examples, aspects of the operations of 2010 may be performed by a full-duplex communications component as described with reference to FIGS. 9 through 12.

Figure 21:
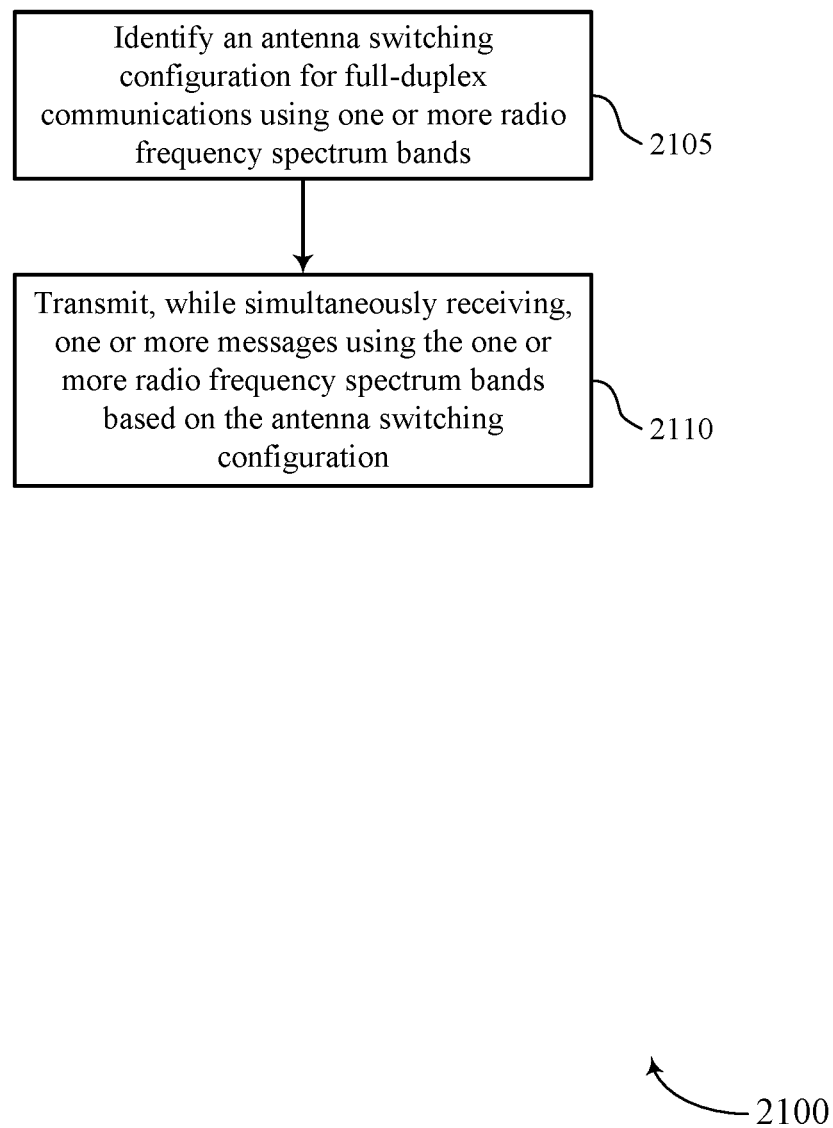

FIG. 21 shows a flowchart illustrating a method 2100 that supports configurations for full-duplex communication systems in accordance with aspects of the present disclosure. The operations of method 2100 may be implemented by a UE 115 or base station 105 or its components as described herein. For example, the operations of method 2100 may be performed by a communications manager as described with reference to FIGS. 9 through 12 and FIGS. 13 through 16. In some examples, a UE or base station may execute a set of instructions to control the functional elements of the UE or base station to perform the functions described herein. Additionally or alternatively, a UE or base station may perform aspects of the functions described herein using special-purpose hardware.

At 2105, the UE or base station may identify an antenna switching configuration for full-duplex communications using one or more RF spectrum bands. The operations of 2105 may be performed according to the methods described herein. In some examples, aspects of the operations of 2105 may be performed by a configuration component as described with reference to FIGS. 9 through 12 and FIGS. 13 through 16.

At 2110, the UE or base station may transmit, while simultaneously receiving, one or more messages using the one or more RF spectrum bands based on the antenna switching configuration. The operations of 2110 may be performed according to the methods described herein. In some examples, aspects of the operations of 2110 may be performed by a full-duplex communications component as described with reference to FIGS. 9 through 12 and FIGS. 13 through 16.

Figure 22:
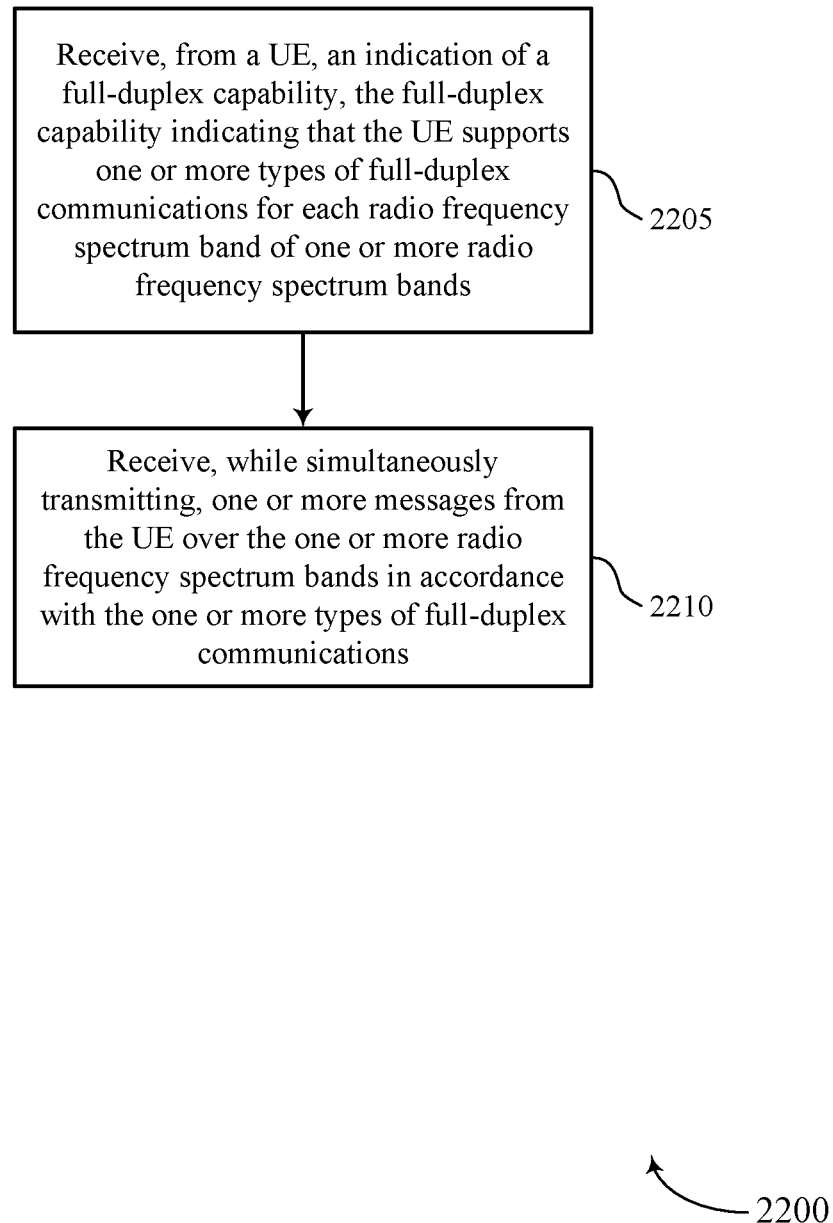

FIG. 22 shows a flowchart illustrating a method 2200 that supports configurations for full-duplex communication systems in accordance with aspects of the present disclosure. The operations of method 2200 may be implemented by a base station 105 or its components as described herein. For example, the operations of method 2200 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2205, the base station may receive, from a UE, an indication of a full-duplex capability, the full-duplex capability indicating that the UE supports one or more types of full-duplex communications for each RF spectrum band of one or more RF spectrum bands. The operations of 2205 may be performed according to the methods described herein. In some examples, aspects of the operations of 2205 may be performed by a capability component as described with reference to FIGS. 13 through 16.

At 2210, the base station may receive, while simultaneously transmitting, one or more messages from the UE over the one or more RF spectrum bands in accordance with the one or more types of full-duplex communications. The operations of 2210 may be performed according to the methods described herein. In some examples, aspects of the operations of 2210 may be performed by a full-duplex communications manager as described with reference to FIGS. 13 through 16.

Figure 23:
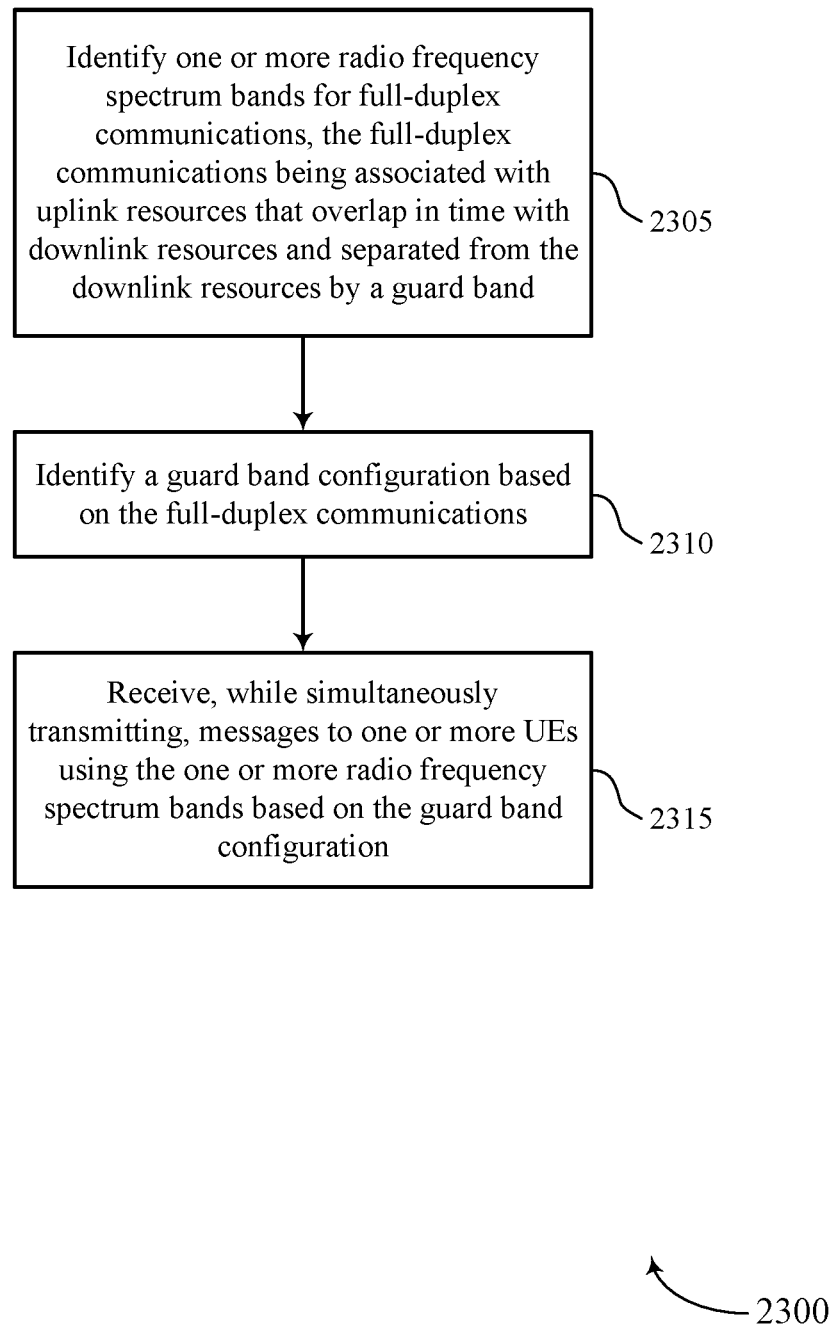

FIG. 23 shows a flowchart illustrating a method 2300 that supports configurations for full-duplex communication systems in accordance with aspects of the present disclosure. The operations of method 2300 may be implemented by a base station 105 or its components as described herein. For example, the operations of method 2300 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2305, the base station may identify one or more RF spectrum bands for full-duplex communications, the full-duplex communications being associated with uplink resources that overlap in time with downlink resources and separated from the downlink resources by a guard band. The operations of 2305 may be performed according to the methods described herein. In some examples, aspects of the operations of 2305 may be performed by an RF spectrum band manager as described with reference to FIGS. 13 through 16.

At 2310, the base station may identify a guard band configuration based on the full-duplex communications. The operations of 2310 may be performed according to the methods described herein. In some examples, aspects of the operations of 2310 may be performed by a guard band manager as described with reference to FIGS. 13 through 16.

At 2315, the base station may receive, while simultaneously transmitting, messages to one or more UEs using the one or more RF spectrum bands based on the guard band configuration. The operations of 2315 may be performed according to the methods described herein. In some examples, aspects of the operations of 2315 may be performed by a full-duplex communications manager as described with reference to FIGS. 13 through 16.

Figure 24:
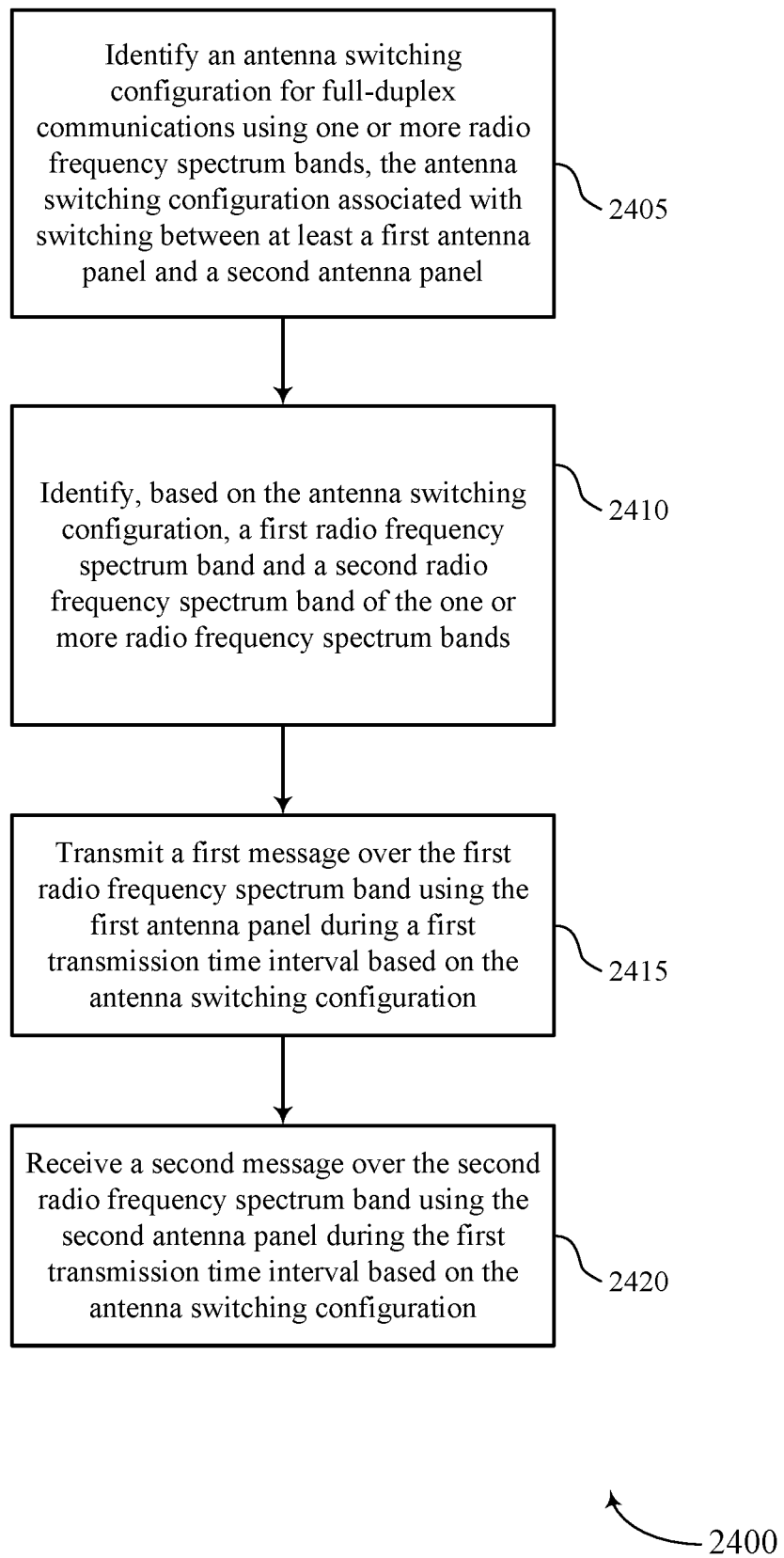

FIG. 24 shows a flowchart illustrating a method 2400 that supports configurations for full-duplex communication systems in accordance with aspects of the present disclosure. The operations of method 2400 may be implemented by a UE 115 or a base station 105, or their components as described herein. For example, the operations of method 2400 may be performed by a communications manager as described with reference to FIGS. 9 through 12 or FIGS. 13 through 16. In some examples, a UE or a base station may execute a set of instructions to control the functional elements of the UE or the base station to perform the functions described herein. Additionally or alternatively, a UE or a base station may perform aspects of the functions described herein using special-purpose hardware.

At 2405, the UE or the base station may identify an antenna switching configuration for full-duplex communications using one or more RF spectrum bands, the antenna switching configuration associated with switching between at least a first antenna panel and a second antenna panel. The operations of 2405 may be performed according to the methods described herein. In some examples, aspects of the operations of 2405 may be performed by an antenna panel component as described with reference to FIGS. 9 through 12 or an antenna panel manager as described with reference to FIGS. 13 through 16.

At 2410, the UE or the base station may identify, based on the antenna switching configuration, a first RF spectrum band and a second RF spectrum band of the one or more RF spectrum bands. The operations of 2410 may be performed according to the methods described herein. In some examples, aspects of the operations of 2410 may be performed by an antenna panel component as described with reference to FIGS. 9 through 12 or an antenna panel manager as described with reference to FIGS. 13 through 16.

At 2415, the UE or the base station may transmit a first message over the first RF spectrum band using the first antenna panel during a first TTI based on the antenna switching configuration. The operations of 2415 may be performed according to the methods described herein. In some examples, aspects of the operations of 2415 may be performed by a full-duplex communications component as described with reference to FIGS. 9 through 12 or a full-duplex communications manager as described with reference to FIGS. 13 through 16.

At 2420, the UE or the base station may receive a second message over the second RF spectrum band using the second antenna panel during the first TTI based on the antenna switching configuration. The operations of 2420 may be performed according to the methods described herein. In some examples, aspects of the operations of 2420 may be performed by a full-duplex communications component as described with reference to FIGS. 9 through 12 or a full-duplex communications manager as described with reference to FIGS. 13 through 16.

Figure 25:
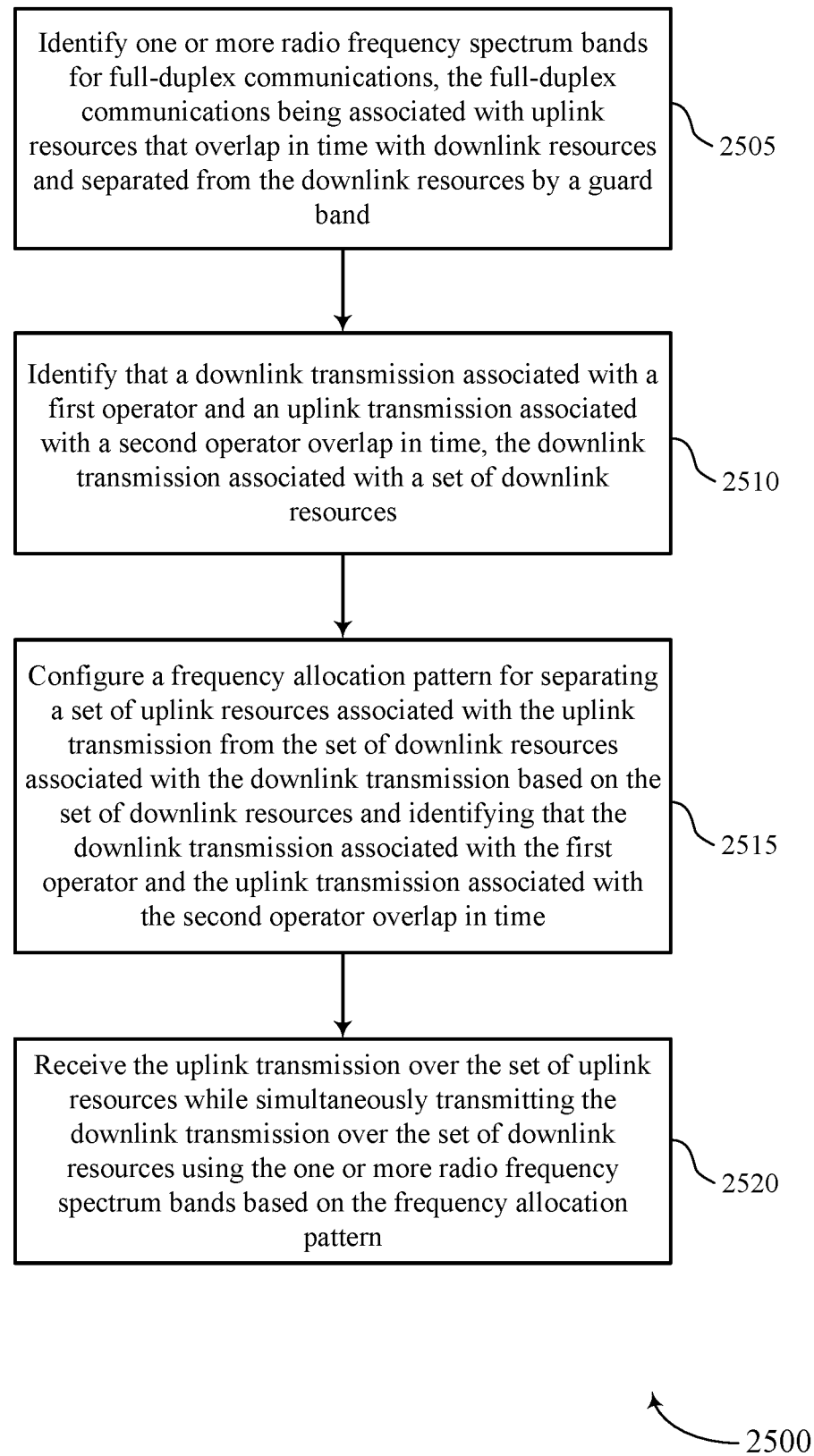

FIG. 25 shows a flowchart illustrating a method 2500 that supports configurations for full-duplex communication systems in accordance with aspects of the present disclosure. The operations of method 2500 may be implemented by a base station 105 or its components as described herein. For example, the operations of method 2500 may be performed by a communications manager as described with reference to FIGS. 13 through 16. In some examples, a base station may execute a set of instructions to control the functional elements of the base station to perform the functions described herein. Additionally or alternatively, a base station may perform aspects of the functions described herein using special-purpose hardware.

At 2505, the base station may identify one or more RF spectrum bands for full-duplex communications, the full-duplex communications being associated with uplink resources that overlap in time with downlink resources and separated from the downlink resources by a guard band. The operations of 2505 may be performed according to the methods described herein. In some examples, aspects of the operations of 2505 may be performed by a full-duplex communications manager as described with reference to FIGS. 13 through 16.

At 2510, the base station may identify that a downlink transmission associated with a first operator and an uplink transmission associated with a second operator overlap in time, the downlink transmission associated with a set of downlink resources. The operations of 2510 may be performed according to the methods described herein. In some examples, aspects of the operations of 2510 may be performed by a full-duplex communications manager as described with reference to FIGS. 13 through 16.

At 2515, the base station may configure a frequency allocation pattern for separating a set of uplink resources associated with the uplink transmission from the set of downlink resources associated with the downlink transmission based on the set of downlink resources and identifying that the downlink transmission associated with the first operator and the uplink transmission associated with the second operator overlap in time. The operations of 2515 may be performed according to the methods described herein. In some examples, aspects of the operations of 2515 may be performed by an RF spectrum band manager as described with reference to FIGS. 13 through 16.

At 2520, the base station may receive the uplink transmission over the set of uplink resources while simultaneously transmitting the downlink transmission over the set of downlink resources using the one or more RF spectrum bands based on the frequency allocation pattern. The operations of 2520 may be performed according to the methods described herein. In some examples, aspects of the operations of 2520 may be performed by a full-duplex communications manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Example 1: A method for wireless communication, comprising: identifying an antenna switching configuration for full-duplex communications using one or more RF spectrum bands, the antenna switching configuration associated with switching between at least a first antenna panel and a second antenna panel; identifying, based at least in part on the antenna switching configuration, a first RF spectrum band and a second RF spectrum band of the one or more RF spectrum bands; transmitting a first message over the first RF spectrum band using the first antenna panel during a first TTI based at least in part on the antenna switching configuration; and receiving a second message over the second RF spectrum band using the second antenna panel during the first TTI based at least in part on the antenna switching configuration.

Example 2: The method of example 1, further comprising: receiving a third message over the first RF spectrum band using the first antenna panel during a second TTI based at least in part on the antenna switching configuration; and transmitting a fourth message over the second RF spectrum band using the second antenna panel during the second TTI based at least in part on the antenna switching configuration.

Example 3: The method of example 1, further comprising: transmitting a third message over the second RF spectrum band using the first antenna panel during a second TTI based at least in part on the antenna switching configuration; and receiving a fourth message over the first RF spectrum band using the second antenna panel during the second TTI based at least in part on the antenna switching configuration.

Example 4: The method of any one of examples 1-3, further comprising: transmitting a third message over the first RF spectrum band, or the second RF spectrum band, or a combination thereof, using the first antenna panel, or the second antenna panel, or a combination thereof, during a second TTI; and receiving a fourth message over the first RF spectrum band, or the second RF spectrum band, or a combination thereof, using the first antenna panel, or the second antenna panel, or a combination thereof, during a third TTI.

Example 5: The method of any one of examples 1-4, wherein the first TTI comprises a symbol, a plurality of symbols, a mini slot, a slot, or a subframe.

Example 6: The method of any one of examples 1-5, wherein identifying the antenna switching configuration comprises: selecting an antenna switching pattern from a set of antenna switching patterns.

Example 7: The method of any one of examples 1-6, further comprising: receiving an indication of one or more spatial filters or a TCI for uplink transmissions, wherein transmitting the first message using the first antenna panel is based at least in part on the one or more spatial filters or the TCI.

Example 8: The method of any one of examples 1-7, further comprising: identifying one or more TCI states; and selecting respective antenna panels for receiving downlink transmissions based at least in part on the one or more TCI states.

Example 9: The method of any one of examples 1-8, further comprising: receiving, from a base station, an indication of the antenna switching configuration.

Example 10: The method of any one of examples 1-8, further comprising: transmitting, to a UE, an indication of the antenna switching configuration.

Example 11: A method or wireless communication at a UE, comprising: identifying, by the UE, support for full-duplex communications using one or more RF spectrum bands, the full-duplex communications being associated with uplink resources that overlap in time with downlink resources and separated from the downlink resources by a guard band; identifying a guard band configuration for separating first control signaling and first data signaling over the uplink resources from second control signaling and second data signaling over the downlink resources based at least in part on the support for the full-duplex communications, wherein the guard band configuration indicates a variable guard band configuration based at least in part on one or more communication parameters, one or more configurations, or a combination thereof; and transmitting, while simultaneously receiving, one or more messages to a base station using the one or more RF spectrum bands based at least in part on the guard band configuration.

Example 12: The method of example 11, further comprising: transmitting, to the base station, an indication of a full-duplex capability of the UE, the full-duplex capability indicating that the UE supports one or more types of full-duplex communications using the one or more RF spectrum bands; and receiving, from the base station, an indication of the guard band configuration, wherein the guard band configuration is based at least in part on the full-duplex capability.

Example 13: The method of any one of examples 11 or 12, wherein identifying the guard band configuration comprises: identifying a first frequency range for the one or more RF spectrum bands; and identifying a first guard band configuration corresponding to the first frequency range, the first guard band configuration comprising a first guard band size different than a second guard band size associated with a second guard band configuration corresponding to a second frequency range.

Example 14: The method of any one of examples 11-13, wherein identifying the guard band configuration comprises: identifying a beam configuration for communicating with the base station, wherein the guard band configuration is based at least in part on the beam configuration.

Example 15: The method of any one of examples 11-14, wherein identifying the guard band configuration comprises: identifying an antenna panel configuration for communicating with the base station, wherein the guard band configuration is based at least in part on the antenna panel configuration.

Example 16: The method of any one of examples 11-15, wherein identifying the guard band configuration comprises: identifying a downlink numerology for the downlink resources and an uplink numerology for the uplink resources; and identifying a guard band subcarrier spacing based at least in part on the downlink numerology, the uplink numerology, or a combination thereof.

Example 17: The method of any one of examples 11-16, wherein identifying the guard band configuration comprises: identifying a predetermined subcarrier spacing value; and identifying a guard band subcarrier spacing based at least in part on the predetermined subcarrier spacing value.

Example 18: The method of any one of examples 11-17, wherein identifying the guard band configuration comprises: identifying a frequency allocation for the guard band, wherein the frequency allocation is based at least in part on an allocation of the uplink resources, an allocation of the downlink resources, a frequency location, an offset from the frequency location, an uplink BWP, a downlink BWP, a separation of the uplink BWP and the downlink BWP, or a combination thereof.

Example 19: The method of any one of examples 11-18, wherein identifying the guard band configuration comprises: identifying a frequency range for the one or more RF spectrum bands; and selecting the guard band configuration from a set of guard band configurations associated with the identified frequency range.

Example 20: A method for wireless communication at a base station, comprising: identifying one or more RF spectrum bands for full-duplex communications, the full-duplex communications being associated with uplink resources that overlap in time with downlink resources and separated from the downlink resources by a guard band; identifying that a downlink transmission associated with a first operator and an uplink transmission associated with a second operator overlap in time, the downlink transmission associated with a set of downlink resources; configuring a frequency allocation pattern for separating a set of uplink resources associated with the uplink transmission from the set of downlink resources associated with the downlink transmission based at least in part on the set of downlink resources and identifying that the downlink transmission associated with the first operator and the uplink transmission associated with the second operator overlap in time; and receiving the uplink transmission over the set of uplink resources while simultaneously transmitting the downlink transmission over the set of downlink resources using the one or more RF spectrum bands based at least in part on the frequency allocation pattern.

Example 21: The method of example 20, wherein configuring the frequency allocation pattern for separating the set of uplink resources associated with the uplink transmission from the set of downlink resources associated with the downlink transmission comprises: separating the set of uplink resources from the set of downlink resources over the one or more RF spectrum bands.

Example 22: The method of any one of examples 20 or 21, wherein configuring the frequency allocation pattern for separating the set of uplink resources associated with the uplink transmission from the set of downlink resources associated with the downlink transmission comprises: adjusting the guard band between the set of downlink resources and the set of uplink resources based at least in part on interference arising at a first antenna panel associated with the second operator from a second antenna panel associated with the first operator.

Example 23: A method for wireless communication at a UE, comprising: identifying a transmission hopping configuration for full-duplex communications using one or more RF spectrum bands; and transmitting, while simultaneously receiving, one or more messages using the one or more RF spectrum bands based at least in part on the transmission hopping configuration.

Example 24: The method of example 23, wherein identifying the transmission hopping configuration comprises: identifying an uplink sub-band, a downlink sub-band, and a guard band for the full-duplex communications; identifying respective frequency locations of the uplink sub-band, the downlink sub-band, and the guard band, during a first TTI; and adjusting, during a second TTI, the respective frequency location of the uplink sub-band, the downlink sub-band, the guard band, or a combination thereof, based at least in part on the transmission hopping configuration.

Example 25: The method of example 24, further comprising: adjusting a first size of the uplink sub-band in the first TTI to a second size of the uplink sub-band in the second TTI based at least in part on the transmission hopping configuration, the first size being different from the second size.

Example 26: The method of any one of examples 24 or 25, further comprising: adjusting a first size of the downlink sub-band in the first TTI to a second size of the downlink sub-band in the second TTI based at least in part on the transmission hopping configuration, the first size being different from the second size.

Example 27: The method of example 23, wherein identifying the transmission hopping configuration comprises: identifying uplink resources and downlink resources for the full-duplex communications, wherein the uplink resources at least partially overlap with the downlink resources in time and frequency, and wherein the uplink resources at least partially overlapping with the downlink resources is based at least in part on a capability of the UE; identifying a frequency location of the uplink resources during a first TTI; and adjusting, during a second TTI, the frequency location of the uplink resources based at least in part on the transmission hopping configuration.

Example 28: The method of example 27, further comprising: adjusting a first size of the uplink resources in the first TTI to a second size of the uplink resources in the second TTI based at least in part on the transmission hopping configuration, the first size being different from the second size.

Example 29: The method of any one of examples 27 or 28, further comprising: adjusting a first size of the downlink resources in the first TTI to a second size of the downlink resources in the second TTI based at least in part on the transmission hopping configuration, the first size being different from the second size.

Example 30: The method of any one of examples 23-29, further comprising: receiving an indication of the transmission hopping configuration, wherein the indication is received via RRC messaging, a MAC-CE, DCI, or a combination thereof.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication implemented by a user equipment (UE), comprising:
   transmitting, to a network device, an indication of a full-duplex capability of the UE based at least in part on support for full-duplex communications using one or more radio frequency spectrum bands, the full-duplex communications being associated with uplink resources that overlap in time with downlink resources and separated from the downlink resources by a guard band;
   identifying, based at least in part on transmitting the indication of the full-duplex capability of the UE, a guard band configuration for separating first control signaling and first data signaling sent from the UE over the uplink resources from second control signaling and second data signaling sent to the UE over the downlink resources based at least in part on the support for the full-duplex communications, wherein the guard band configuration indicates a variable guard band configuration that is associated with a variable guard band size, and wherein the variable guard band size varies based at least in part on one or more communication parameters, one or more configurations, or a combination thereof; and
   transmitting, while simultaneously receiving, one or more messages to the network device using the one or more radio frequency spectrum bands based at least in part on the guard band configuration.

2. The method of claim 1, further comprising:
   receiving, from the network device, an indication of the guard band configuration, wherein the guard band configuration is based at least in part on the full-duplex capability, and wherein the full-duplex capability indicates that the UE supports one or more full-duplex communications types using the one or more radio frequency spectrum bands.

3. The method of claim 1, wherein identifying the guard band configuration comprises:

identifying a first frequency range for the one or more radio frequency spectrum bands; and identifying a first guard band configuration corresponding to the first frequency range, the first guard band configuration being associated with a first guard band size different than a second guard band size that is associated with a second guard band configuration corresponding to a second frequency range.

4. The method of claim 1, wherein identifying the guard band configuration comprises:

identifying a beam configuration for communicating with the network device, wherein the guard band configuration is based at least in part on the beam configuration.

5. The method of claim 1, wherein identifying the guard band configuration comprises:

identifying an antenna panel configuration for communicating with the network device, wherein the guard band configuration is based at least in part on the antenna panel configuration.

6. The method of claim 1, wherein identifying the guard band configuration comprises:

identifying a downlink numerology for the downlink resources and an uplink numerology for the uplink resources; and identifying a guard band subcarrier spacing based at least in part on the downlink numerology, the uplink numerology, or a combination thereof.

7. The method of claim 1, wherein identifying the guard band configuration comprises:

identifying a predetermined subcarrier spacing value; and
identifying a guard band subcarrier spacing based at least in part on the predetermined subcarrier spacing value.

8. The method of claim 1, wherein identifying the guard band configuration comprises:

identifying a frequency allocation for the guard band, wherein the frequency allocation is based at least in part on an allocation of the uplink resources, an allocation of the downlink resources, a frequency location, an offset from the frequency location, an uplink bandwidth part, a downlink bandwidth part, a separation of the uplink bandwidth part and the downlink bandwidth part, or a combination thereof.

9. The method of claim 1, wherein identifying the guard band configuration comprises:

identifying a frequency range for the one or more radio frequency spectrum bands; and
selecting the guard band configuration from a set of guard band configurations associated with the identified frequency range.

10. A method for wireless communication implemented by a network device, comprising:

identifying one or more radio frequency spectrum bands for full-duplex communications, the full-duplex communications being associated with uplink resources that overlap in time with downlink resources and separated from the downlink resources by a guard band;

identifying that a downlink transmission associated with a first operator and an uplink transmission associated with a second operator overlap in time, the downlink transmission associated with a set of downlink resources;

configuring a frequency allocation pattern for separating a set of uplink resources associated with the uplink transmission from the set of downlink resources associated with the downlink transmission based at least in part on interference at a first antenna panel of the network device, the set of downlink resources, and identifying that the downlink transmission associated with the first operator and the uplink transmission associated with the second operator overlap in time, wherein the first antenna panel of the network device is associated with the second operator, and wherein the interference at the first antenna panel is from a second antenna panel of the network device that is different from the first antenna panel, the second antenna panel being associated with the first operator; and receiving the uplink transmission over the set of uplink resources while simultaneously transmitting the downlink transmission over the set of downlink resources using the one or more radio frequency spectrum bands based at least in part on the frequency allocation pattern.

11. The method of claim 10, wherein configuring the frequency allocation pattern for separating the set of uplink resources associated with the uplink transmission from the set of downlink resources associated with the downlink transmission comprises:

separating the set of uplink resources from the set of downlink resources over the one or more radio frequency spectrum bands.

12. The method of claim 10, wherein configuring the frequency allocation pattern for separating the set of uplink resources associated with the uplink transmission from the set of downlink resources associated with the downlink transmission comprises:

adjusting the guard band between the set of downlink resources and the set of uplink resources based at least in part on the interference arising at the first antenna panel associated with the second operator from the second antenna panel associated with the first operator.

13. A method for wireless communication implemented by a user equipment (UE), comprising:

receiving an indication of a transmission hopping configuration for full-duplex communications between the UE and a network device using one or more radio frequency spectrum bands, wherein the transmission hopping configuration is associated with first respective frequency locations of uplink resources and downlink resources for the full-duplex communications between the UE and the network device during a first transmission time interval and second respective frequency locations of the uplink resources and the downlink resources for the full-duplex communications between the UE and the network device during a second transmission time interval; and transmitting, while simultaneously receiving, one or more messages using the first respective frequency locations of the uplink resources and the downlink resources during the first transmission time interval and the second respective frequency locations of the uplink resources and the downlink resources during the second transmission time interval.

14. The method of claim 13, further comprising:

identifying an uplink sub-band, a downlink sub-band, and a guard band for the full-duplex communications, wherein the uplink sub-band is associated with the uplink resources and the downlink sub-band is associated with the downlink resources;

identifying the first respective frequency locations of the uplink sub-band and the downlink sub-band and a first frequency location of a guard band during the first transmission time interval; and adjusting, during the second transmission time interval, a respective frequency location of the uplink sub-band, the downlink sub-band, the guard band, or a combination thereof, based at least in part on the transmission hopping configuration.

15. The method of claim 14, further comprising:
adjusting a first size of the uplink sub-band in the first transmission time interval to a second size of the uplink sub-band in the second transmission time interval based at least in part on the transmission hopping configuration, the first size being different from the second size.

16. The method of claim 14, further comprising:
adjusting a first size of the downlink sub-band in the first transmission time interval to a second size of the downlink sub-band in the second transmission time interval based at least in part on the transmission hopping configuration, the first size being different from the second size.

17. The method of claim 13, further comprising:
identifying the uplink resources and the downlink resources for the full-duplex communications, wherein the uplink resources at least partially overlap with the downlink resources in time and frequency, and wherein the uplink resources at least partially overlapping with the downlink resources is based at least in part on a capability of the UE;
identifying a frequency location of the uplink resources during the first transmission time interval; and
adjusting, during the second transmission time interval, the frequency location of the uplink resources based at least in part on the transmission hopping configuration.

18. The method of claim 17, further comprising:
adjusting a first size of the uplink resources in the first transmission time interval to a second size of the uplink resources in the second transmission time interval based at least in part on the transmission hopping configuration, the first size being different from the second size.

19. The method of claim 17, further comprising:
adjusting a first size of the downlink resources in the first transmission time interval to a second size of the downlink resources in the second transmission time interval based at least in part on the transmission hopping configuration, the first size being different from the second size.

20. The method of claim 13,
wherein the indication of the transmission hopping configuration is received via radio resource control messaging, a medium access control (MAC) control element, downlink control information, or a combination thereof.

21. An apparatus for wireless communication at a user equipment (UE), comprising:
a processor; and
memory coupled with the processor, wherein the memory comprises instructions executable by the processor to cause the apparatus to:
transmit, to a network device, an indication of a full-duplex capability of the UE based at least in part on support for full-duplex communications using one or more radio frequency spectrum bands, the full-duplex communications being associated with uplink resources that overlap in time with downlink resources and separated from the downlink resources by a guard band;
identify, based at least in part on transmitting the indication of the full-duplex capability of the UE, a guard band configuration for separating first control signaling and first data signaling sent from the UE over the uplink resources from second control signaling and second data signaling sent to the UE over the downlink resources based at least in part on the support for the full-duplex communications, wherein the guard band configuration indicates a variable guard band configuration that is associated with a variable guard band size, and wherein the variable guard band size varies based at least in part on one or more communication parameters, one or more configurations, or a combination thereof; and
transmit, while simultaneously receiving, one or more messages to the network device using the one or more radio frequency spectrum bands based at least in part on the guard band configuration.

22. The apparatus of claim 21, wherein the instructions are further executable by the processor to cause the apparatus to:
receive, from the network device, an indication of the guard band configuration, wherein the guard band configuration is based at least in part on the full-duplex capability, and wherein the full-duplex capability indicates that the UE supports one or more full-duplex communications types using the one or more radio frequency spectrum bands.

23. The apparatus of claim 21, wherein the instructions to identify the guard band configuration are executable by the processor to cause the apparatus to:
identify a first frequency range for the one or more radio frequency spectrum bands; and
identify a first guard band configuration corresponding to the first frequency range, the first guard band configuration being associated with a first guard band size different than a second guard band size that is associated with a second guard band configuration corresponding to a second frequency range.

24. The apparatus of claim 21, wherein the instructions to identify the guard band configuration are executable by the processor to cause the apparatus to:
identify a beam configuration for communicating with the network device, wherein the guard band configuration is based at least in part on the beam configuration.

25. The apparatus of claim 21, wherein the instructions to identify the guard band configuration are executable by the processor to cause the apparatus to:
identify an antenna panel configuration for communicating with the network device, wherein the guard band configuration is based at least in part on the antenna panel configuration.

26. The apparatus of claim 21, wherein the instructions to identify the guard band configuration are executable by the processor to cause the apparatus to:
identify a downlink numerology for the downlink resources and an uplink numerology for the uplink resources; and
identify a guard band subcarrier spacing based at least in part on the downlink numerology, the uplink numerology, or a combination thereof.

27. The apparatus of claim 21, wherein the instructions to identify the guard band configuration are executable by the processor to cause the apparatus to:
identify a predetermined subcarrier spacing value; and
identify a guard band subcarrier spacing based at least in part on the predetermined subcarrier spacing value.

28. The apparatus of claim 21, wherein the instructions to identify the guard band configuration are executable by the processor to cause the apparatus to:

identify a frequency allocation for the guard band, wherein the frequency allocation is based at least in part on an allocation of the uplink resources, an allocation of the downlink resources, a frequency location, an offset from the frequency location, an uplink bandwidth part, a downlink bandwidth part, a separation of the uplink bandwidth part and the downlink bandwidth part, or a combination thereof.

29. The apparatus of claim 21, wherein the instructions to identify the guard band configuration are executable by the processor to cause the apparatus to:

identify a frequency range for the one or more radio frequency spectrum bands; and select the guard band configuration from a set of guard band configurations associated with the identified frequency range.

* * * * *